(12) United States Patent
Fujikura et al.

(10) Patent No.: US 9,823,452 B2
(45) Date of Patent: Nov. 21, 2017

(54) ZOOM LENS AND IMAGE PICKUP APPARATUS USING THE SAME

(71) Applicant: OLYMPUS CORPORATION, Tokyo (JP)

(72) Inventors: Takashi Fujikura, Tokyo (JP); Keisuke Takada, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 34 days.

(21) Appl. No.: 14/879,536

(22) Filed: Oct. 9, 2015

(65) Prior Publication Data

US 2016/0033749 A1 Feb. 4, 2016

Related U.S. Application Data

(63) Continuation of application No. PCT/JP2014/063561, filed on May 22, 2014.

(30) Foreign Application Priority Data

May 30, 2013 (JP) ................................ 2013-114622

(51) Int. Cl.
*G02B 15/14* (2006.01)
*G02B 15/177* (2006.01)
(Continued)

(52) U.S. Cl.
CPC ........... *G02B 15/177* (2013.01); *G02B 15/20* (2013.01); *G02B 3/14* (2013.01); *G02B 5/005* (2013.01);
(Continued)

(58) Field of Classification Search
CPC .............. G02B 27/0025; G02B 13/004; G02B 15/177; G02B 13/18; G02B 15/20;
(Continued)

(56) References Cited

U.S. PATENT DOCUMENTS 5,365,376 A  11/1994  Itoh
5,691,851 A  11/1997  Nishio et al.
(Continued)

FOREIGN PATENT DOCUMENTS

JP  05-060977  3/1993
JP  07-151971  6/1995
(Continued)

OTHER PUBLICATIONS

International Preliminary Report on Patentability, dated Dec. 10, 2015, issued in corresponding International Application No. PCT/JP2014/063561.
(Continued)

*Primary Examiner* — Evelyn A Lester
(74) *Attorney, Agent, or Firm* — Andrews Kurth Kenyon LLP

(57) ABSTRACT

A zoom lens comprising in order from an object side, a first lens unit having a negative refractive power, a second lens unit having a negative refractive power, a lens unit having a positive refractive power, and a rearmost lens unit having a negative refractive power, and the rearmost lens unit is positioned nearest to an image in the plurality of lens units, and at the time of zooming, distances between the lens units in the plurality of lens units change. Moreover, an image pickup apparatus includes the zoom lens, and an image pickup element having an image pickup surface.

18 Claims, 48 Drawing Sheets

(51) Int. Cl.
*G02B 15/20* (2006.01)
*G02B 13/04* (2006.01)
*G02B 15/15* (2006.01)
*G02B 9/34* (2006.01)
*G02B 13/00* (2006.01)
*G02B 7/04* (2006.01)
*G02B 15/22* (2006.01)
*G02B 15/16* (2006.01)
*G02B 5/00* (2006.01)
*G02B 3/14* (2006.01)
*G02B 15/00* (2006.01)
*G02B 7/10* (2006.01)
*G03B 5/00* (2006.01)
*G02B 13/18* (2006.01)
*G02B 27/00* (2006.01)

(52) U.S. Cl.
CPC ............... *G02B 7/04* (2013.01); *G02B 7/10* (2013.01); *G02B 9/34* (2013.01); *G02B 13/004* (2013.01); *G02B 13/009* (2013.01); *G02B 13/0015* (2013.01); *G02B 13/0045* (2013.01); *G02B 13/04* (2013.01); *G02B 13/18* (2013.01); *G02B 15/00* (2013.01); *G02B 15/14* (2013.01); *G02B 15/15* (2013.01); *G02B 15/16* (2013.01); *G02B 15/22* (2013.01); *G02B 27/0025* (2013.01); *G03B 5/00* (2013.01); *G03B 2205/0046* (2013.01)

(58) Field of Classification Search
CPC .... G02B 13/009; G02B 9/34; G02B 13/0045; G02B 15/14; G02B 13/04; G02B 15/16; G02B 5/005; G02B 13/0015; G02B 7/10; G02B 15/00; G02B 15/15; G02B 15/22; G02B 3/14; G02B 7/04; G03B 2205/0046; G03B 5/00

USPC ....... 359/676, 680, 682–686, 715, 740, 749, 359/753, 781
See application file for complete search history.

(56) References Cited

U.S. PATENT DOCUMENTS

| | | |
|---|---|---|
| 5,793,532 A | 8/1998 | Kawamura |
| 7,248,418 B2 | 7/2007 | Nishio et al. |
| 7,859,765 B2 | 12/2010 | Katakura et al. |
| 8,019,211 B2 | 9/2011 | Miyazaki et al. |
| 2010/0196003 A1* | 8/2010 | Miyazaki ............. G02B 15/177 359/689 |

FOREIGN PATENT DOCUMENTS

| | | |
|---|---|---|
| JP | 07-333504 | 12/1995 |
| JP | 08-068940 | 3/1996 |
| JP | 2004-037925 | 2/2004 |
| JP | 2006-098962 | 4/2006 |
| JP | 2007-072291 | 3/2007 |
| JP | 2009-258174 | 11/2009 |
| JP | 2009-258402 | 11/2009 |
| JP | 2010-032936 | 2/2010 |
| JP | 2010-032937 | 2/2010 |
| JP | 2010-169848 | 8/2010 |
| JP | 2010-176099 | 8/2010 |
| JP | 2012-022019 | 2/2012 |
| JP | 2013-242394 | 12/2013 |

OTHER PUBLICATIONS

International Search Report, dated Jul. 15, 2014, issued in corresponding International Application No. PCT/JP2014/063561.

* cited by examiner

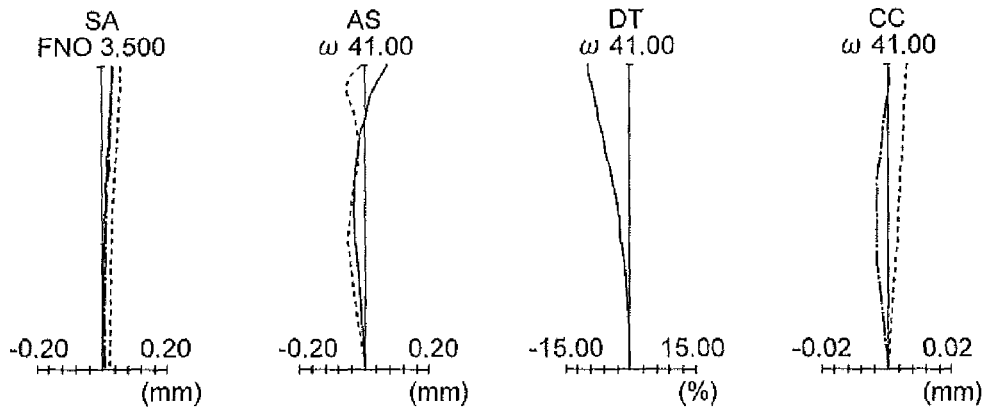
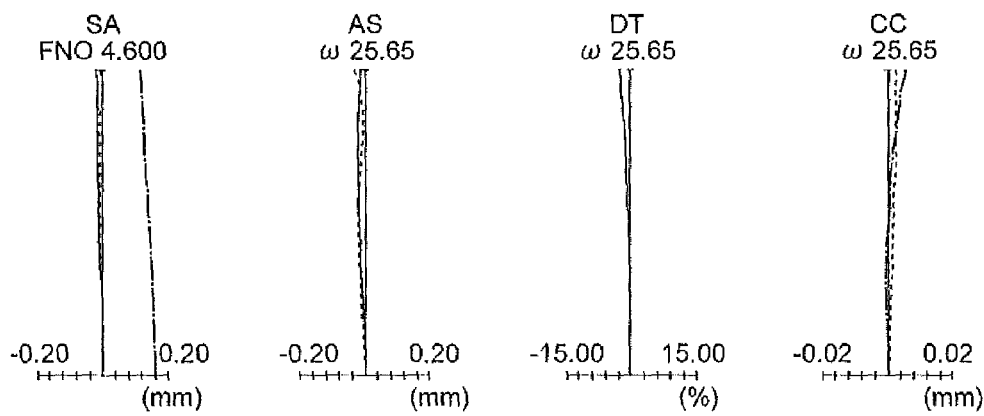
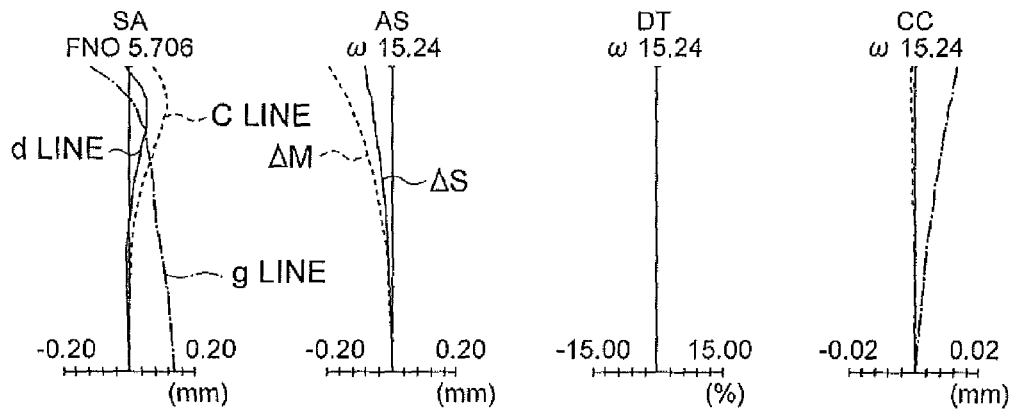

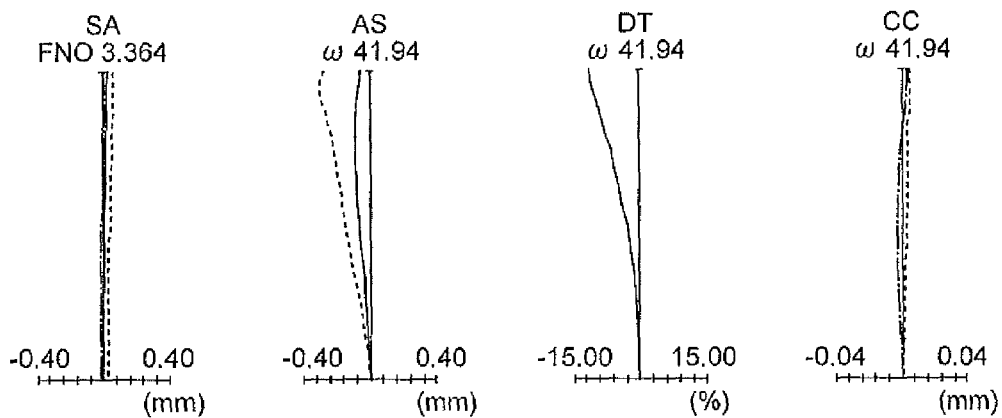
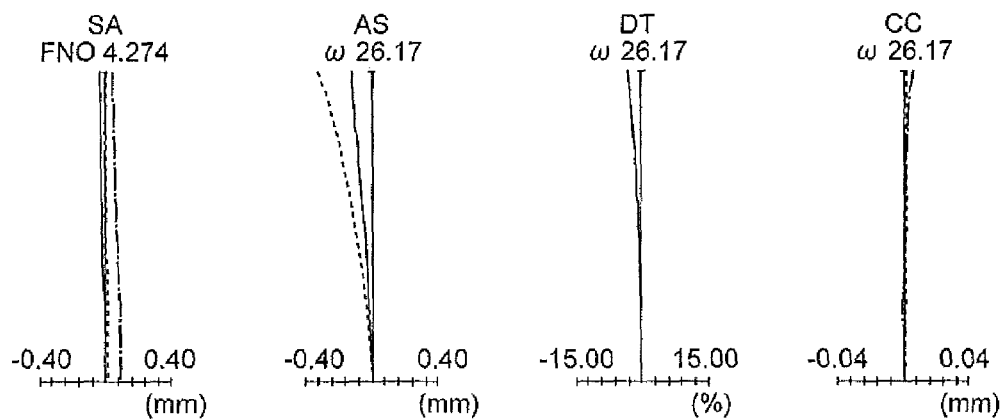
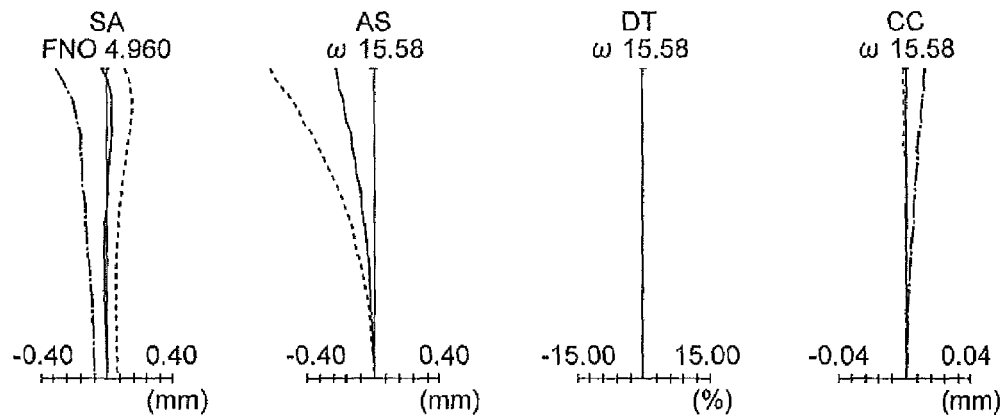

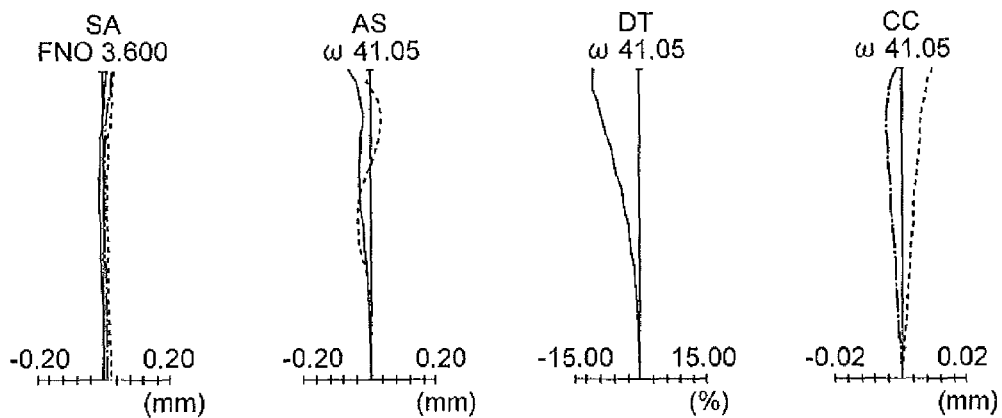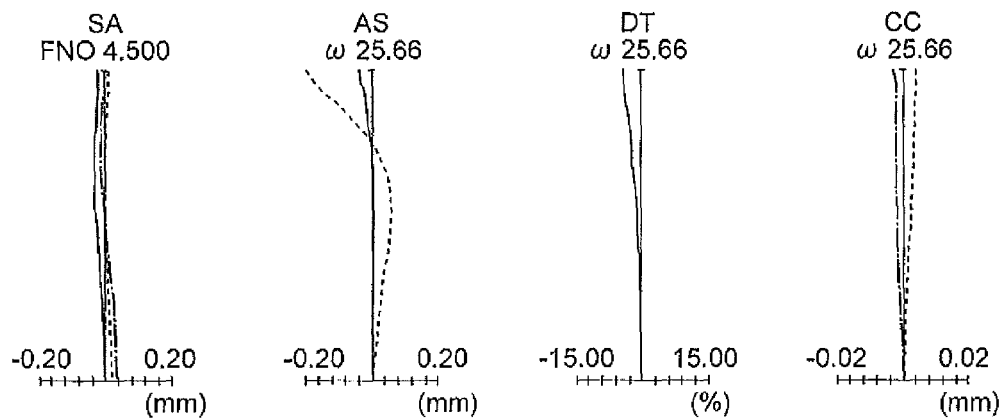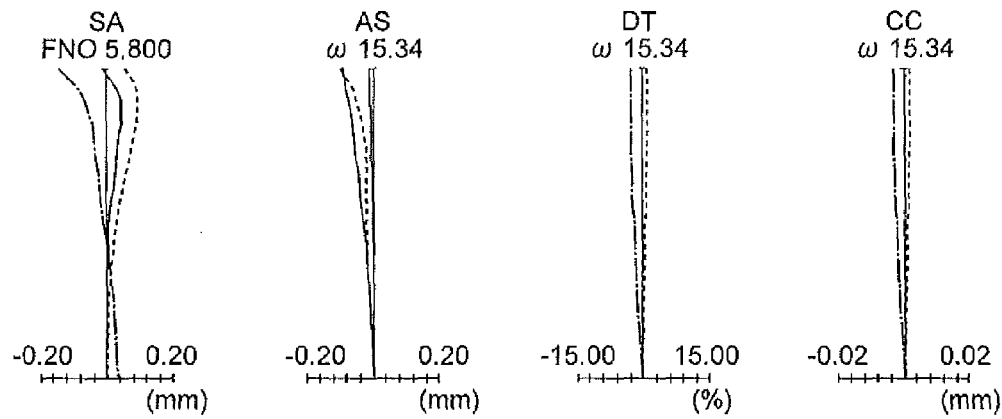

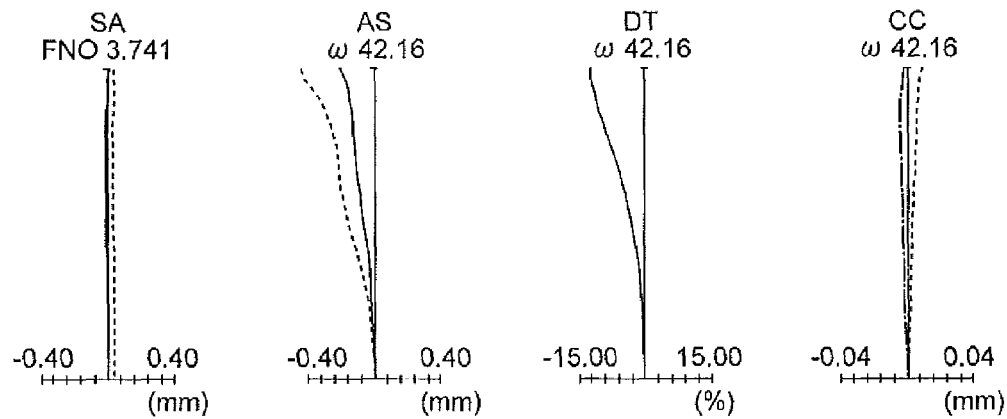
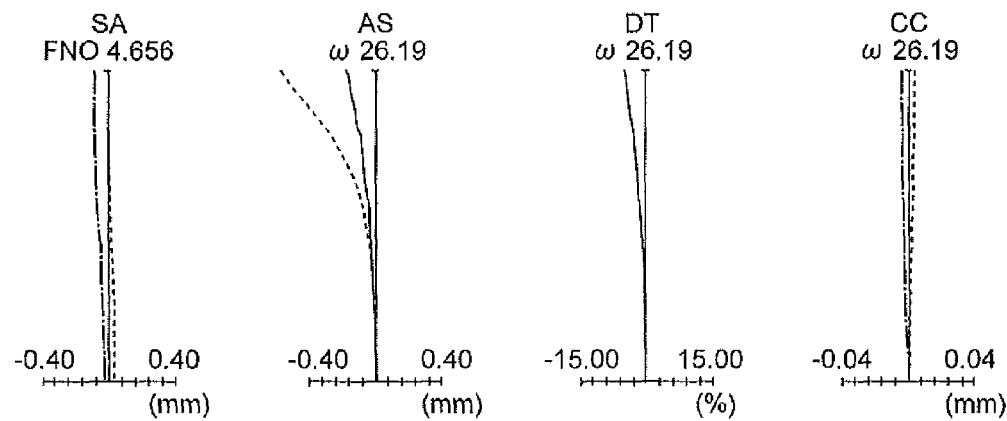
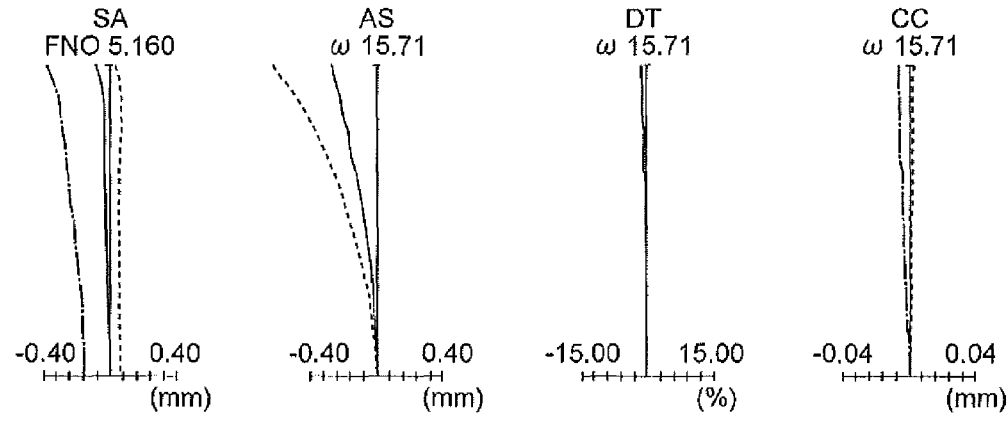

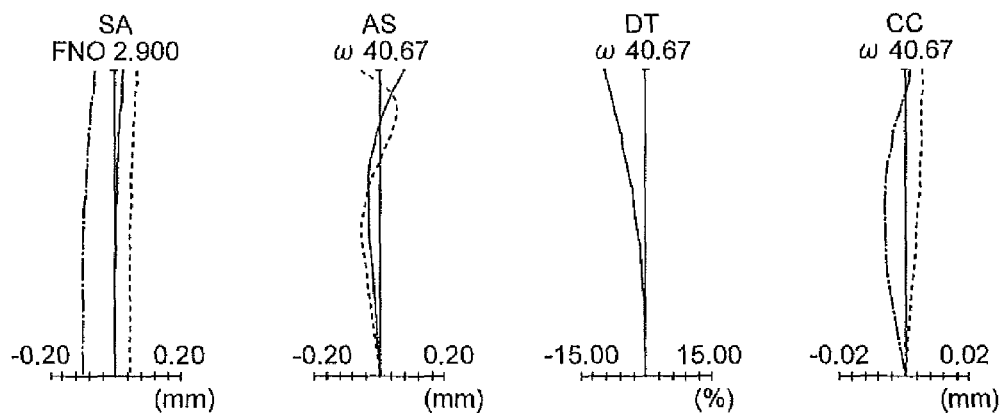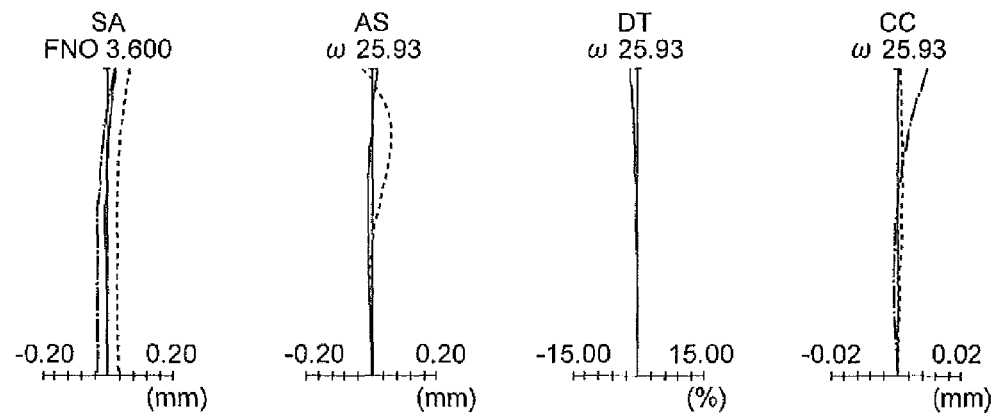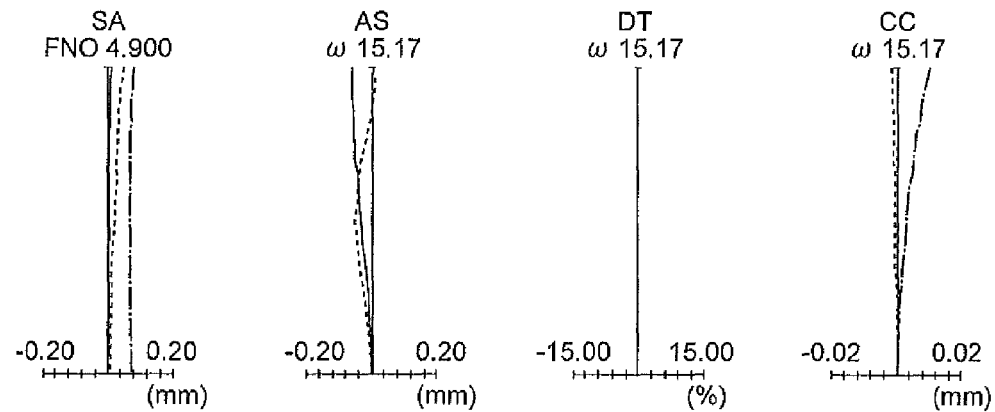

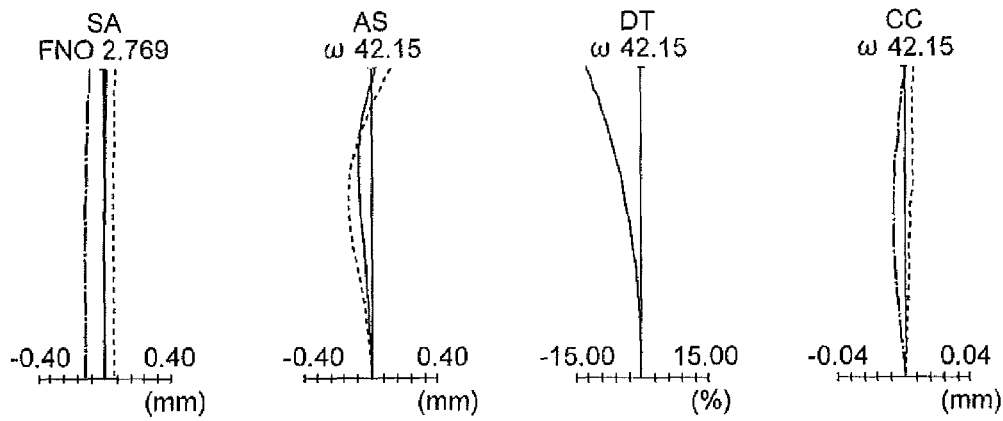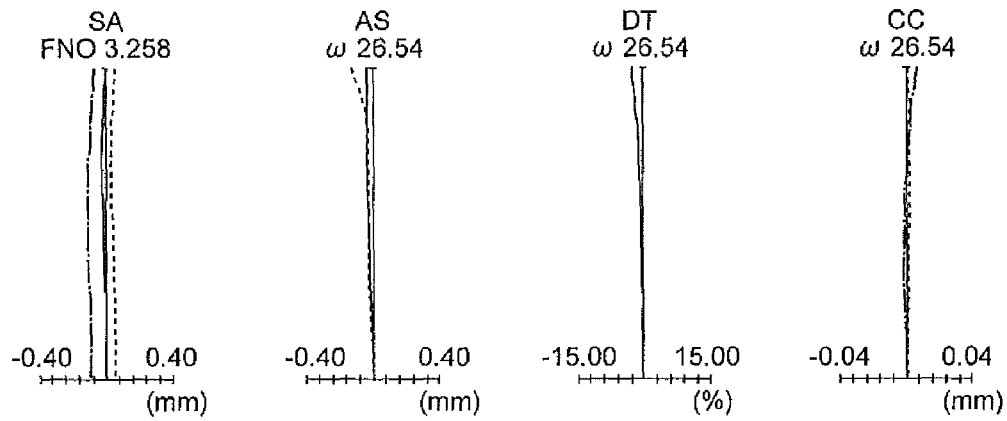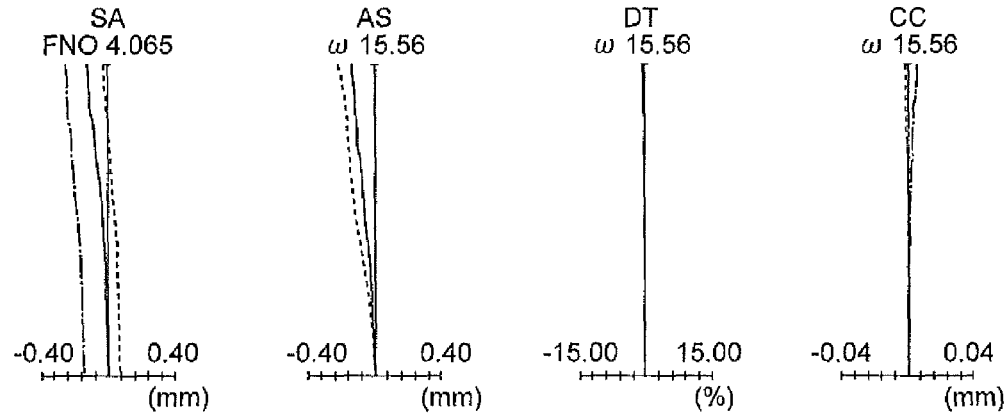

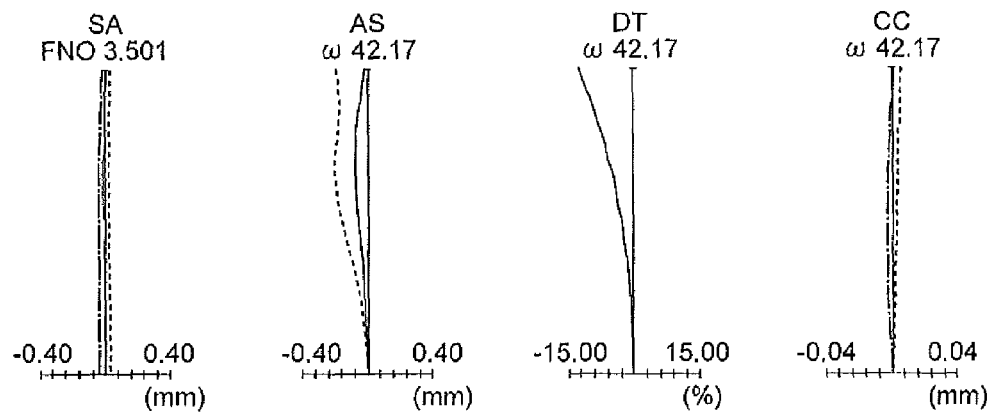
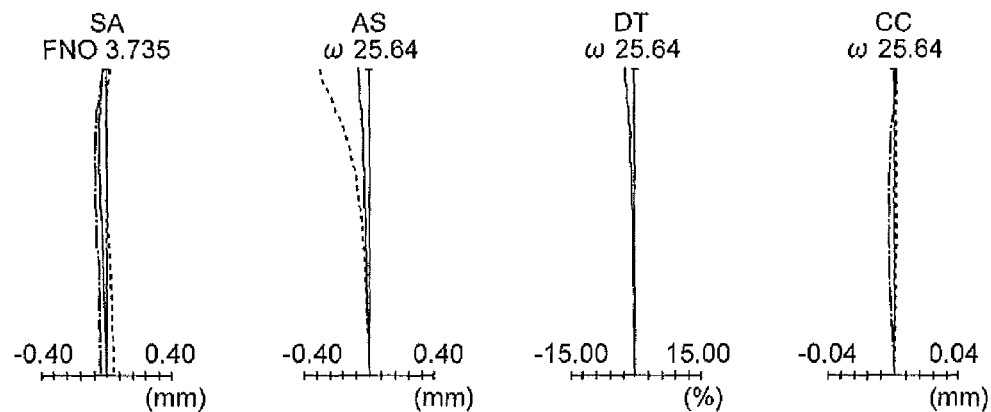
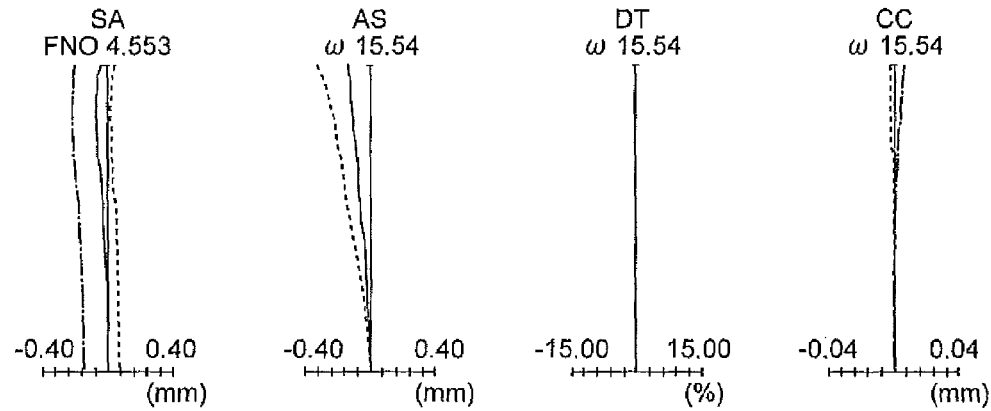

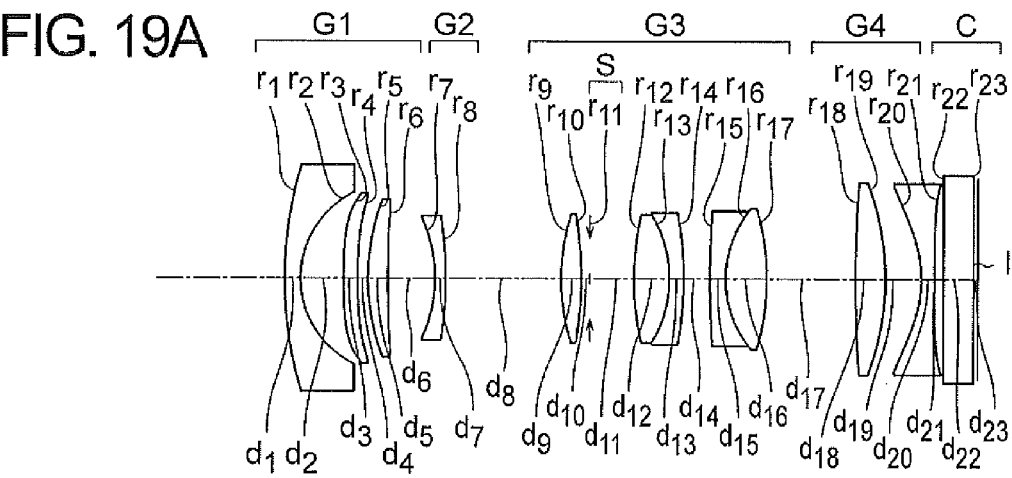
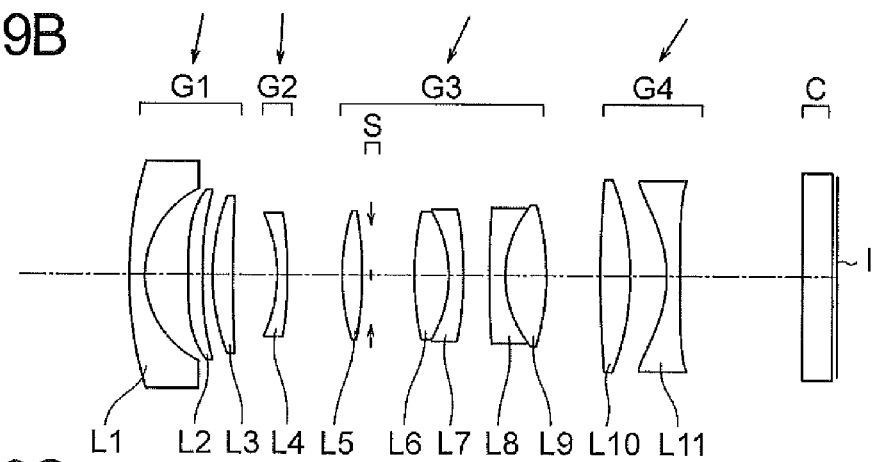
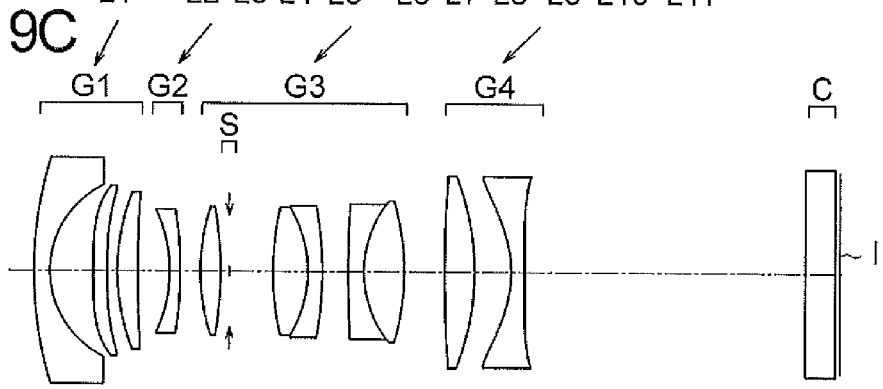

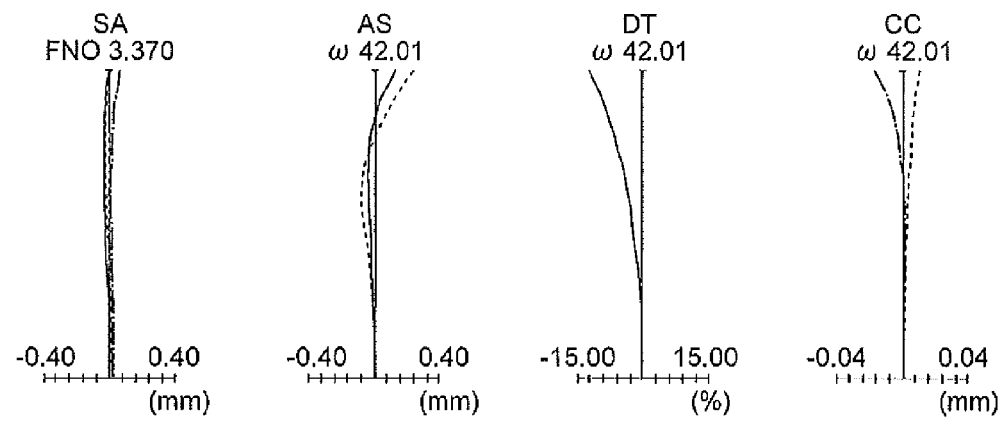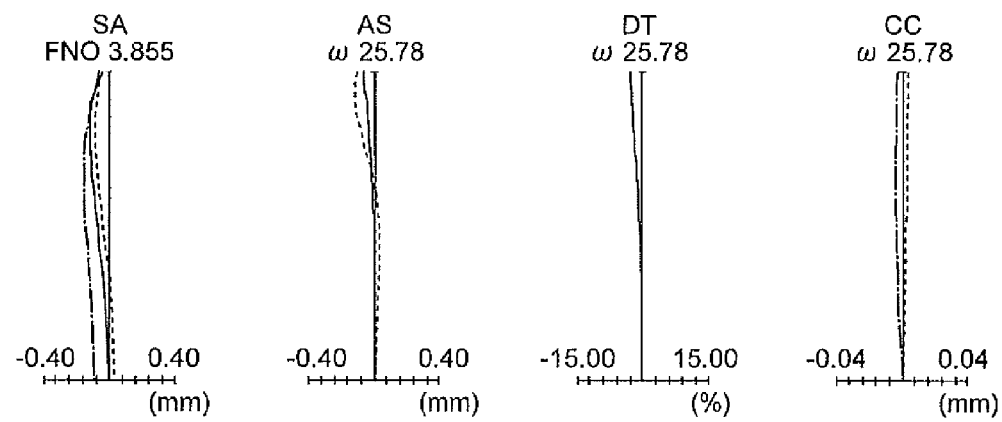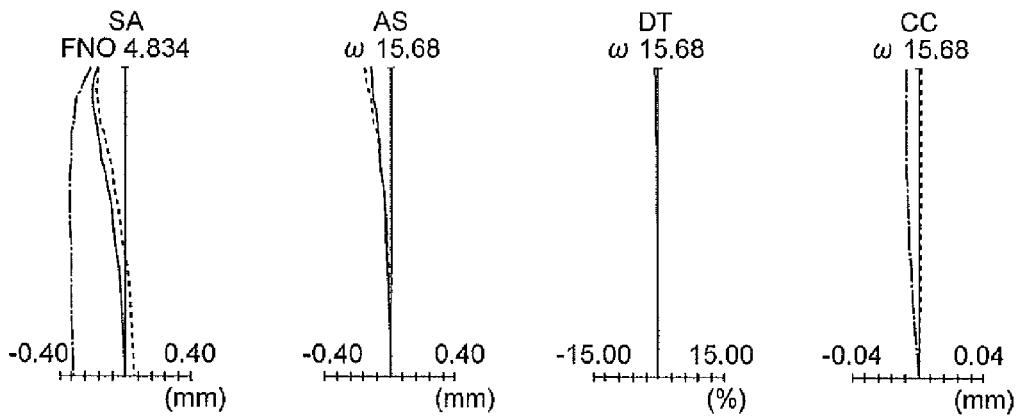

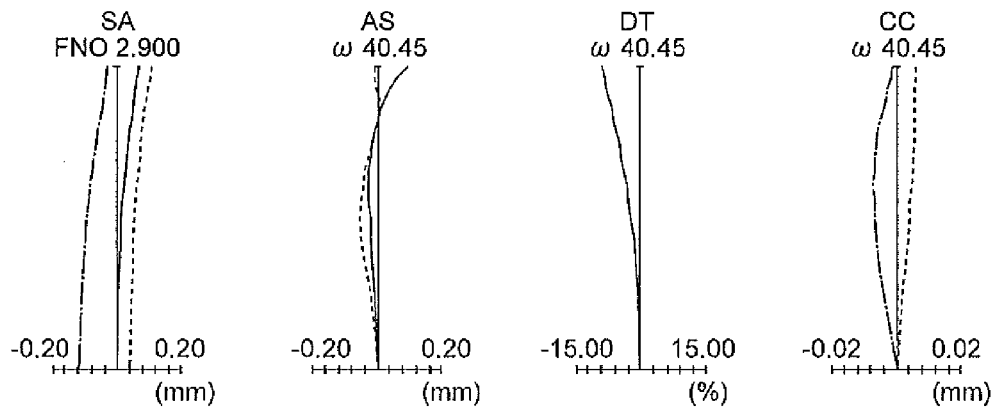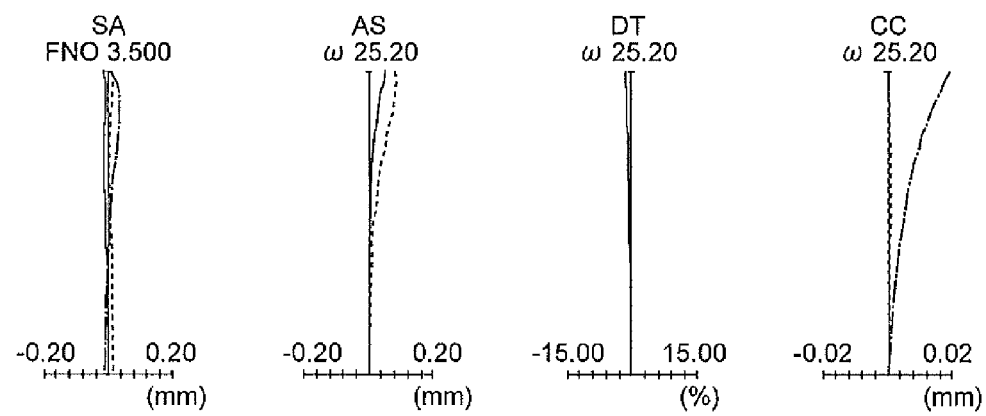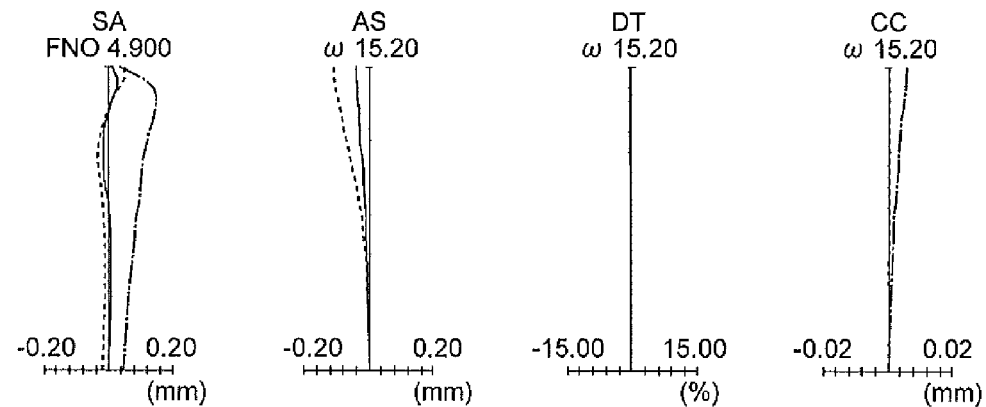

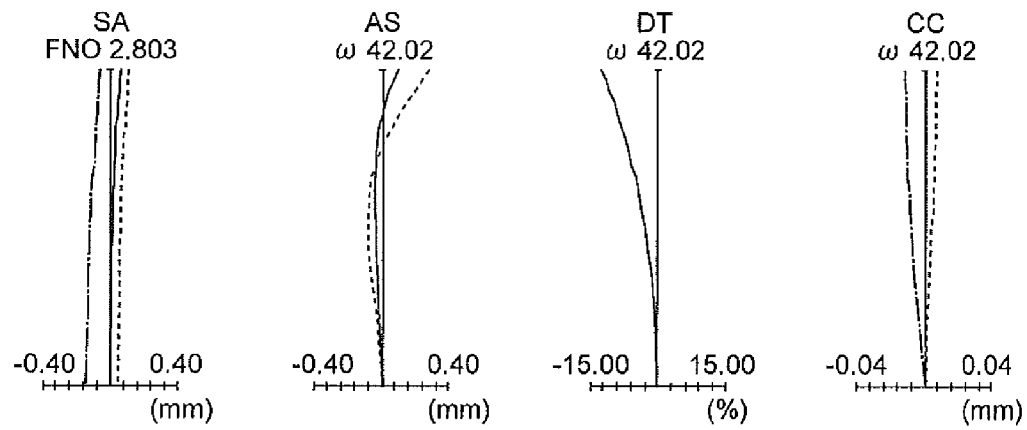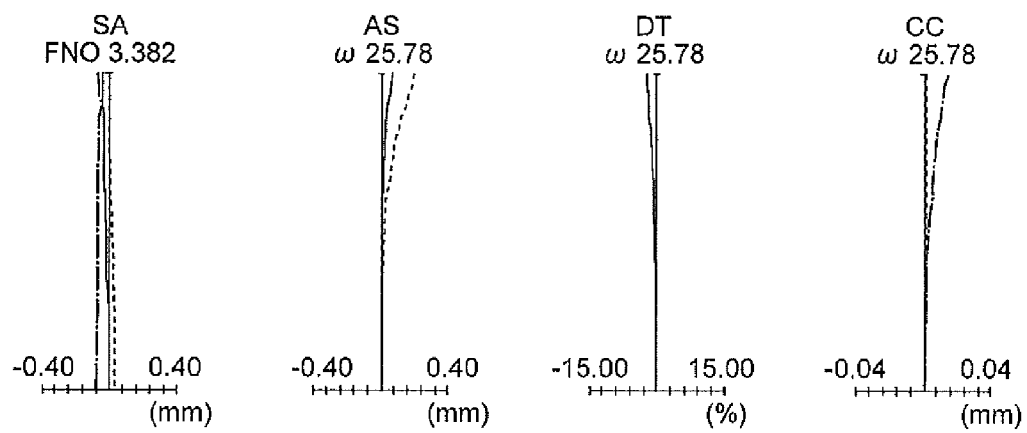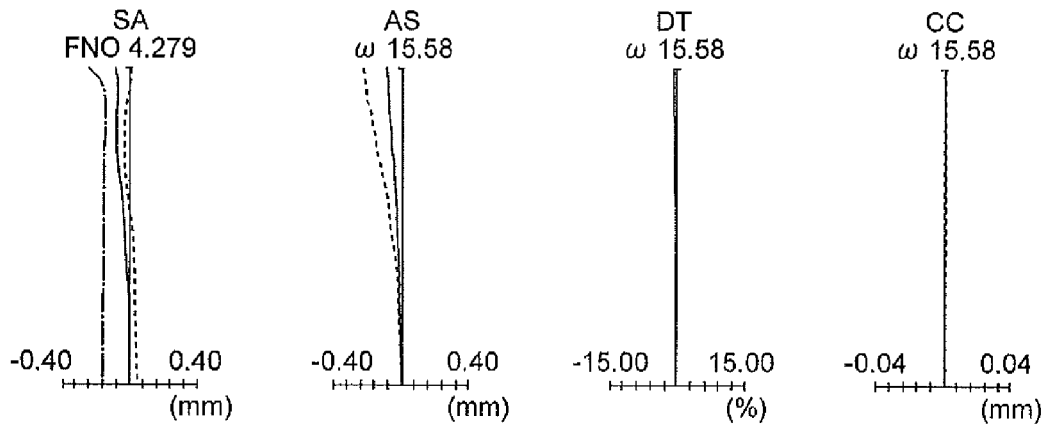

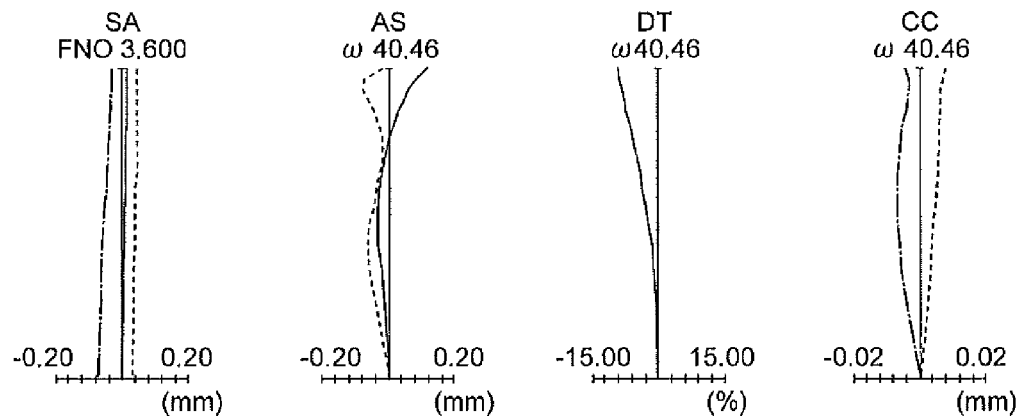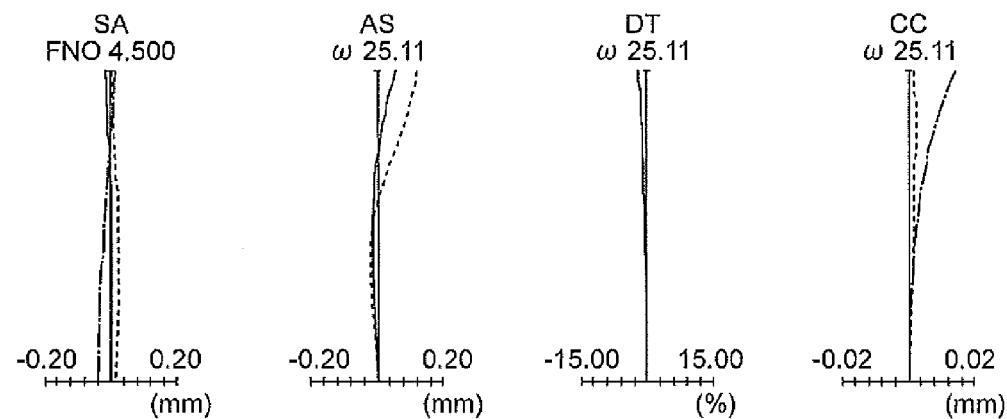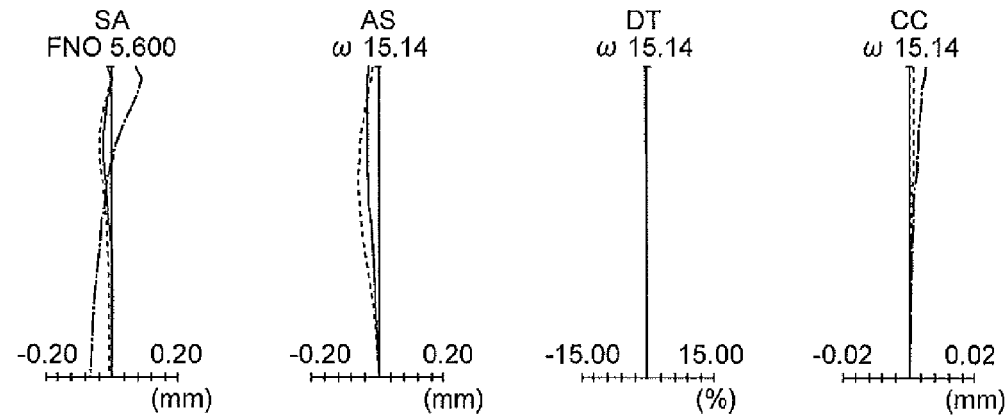

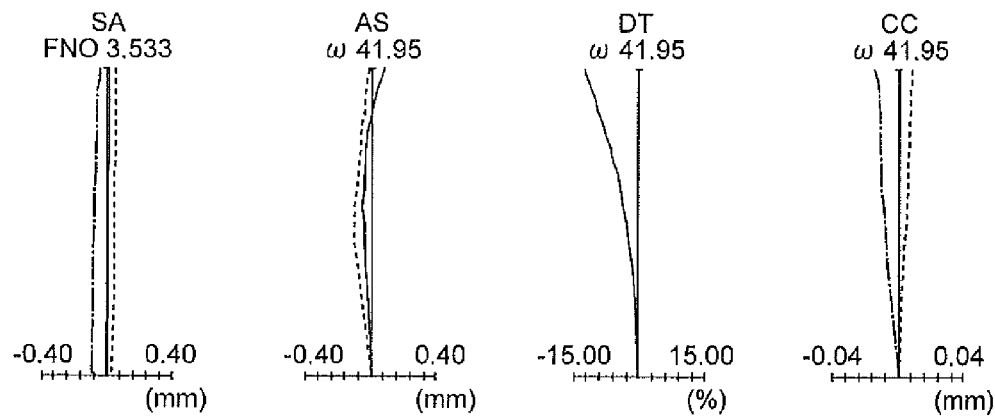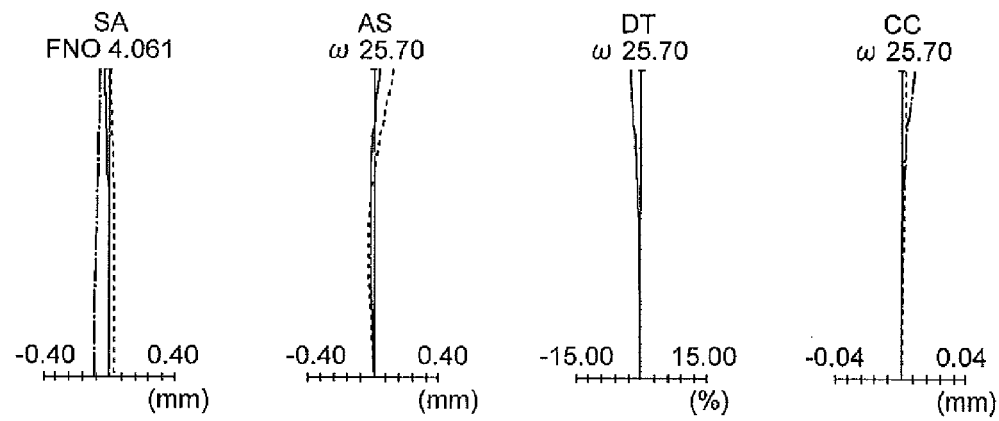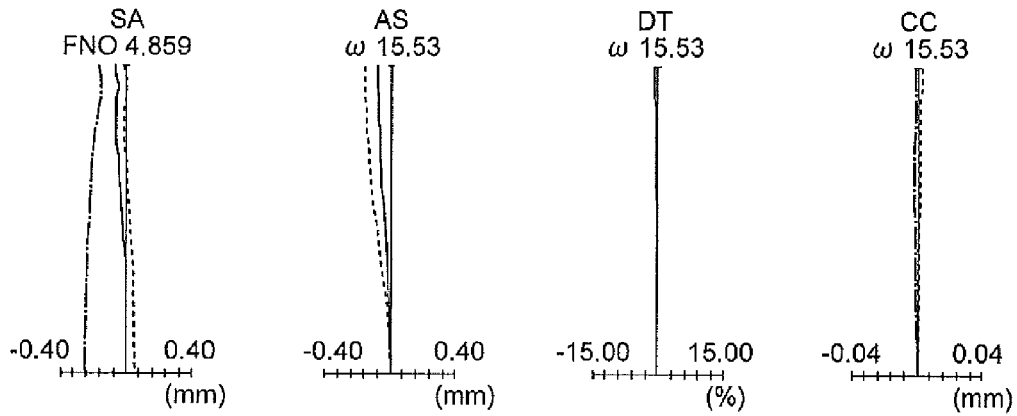

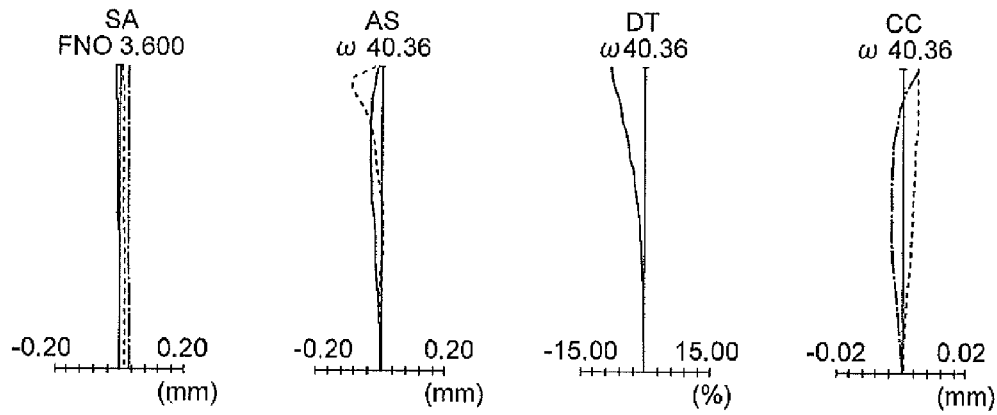
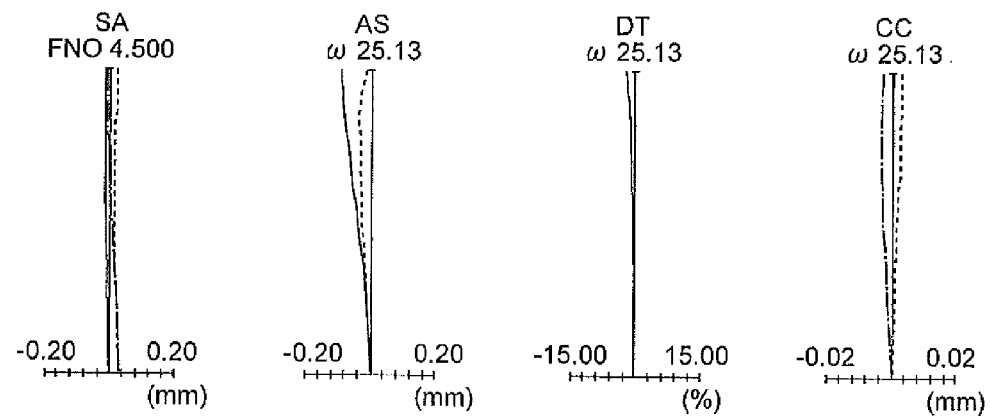
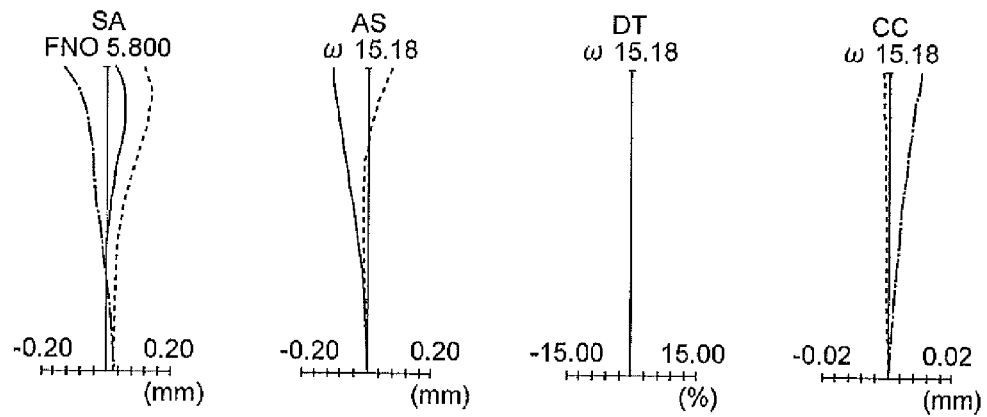

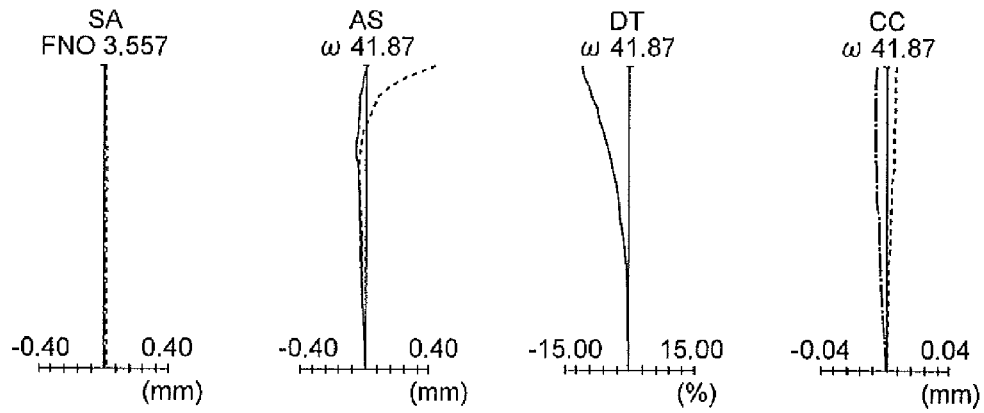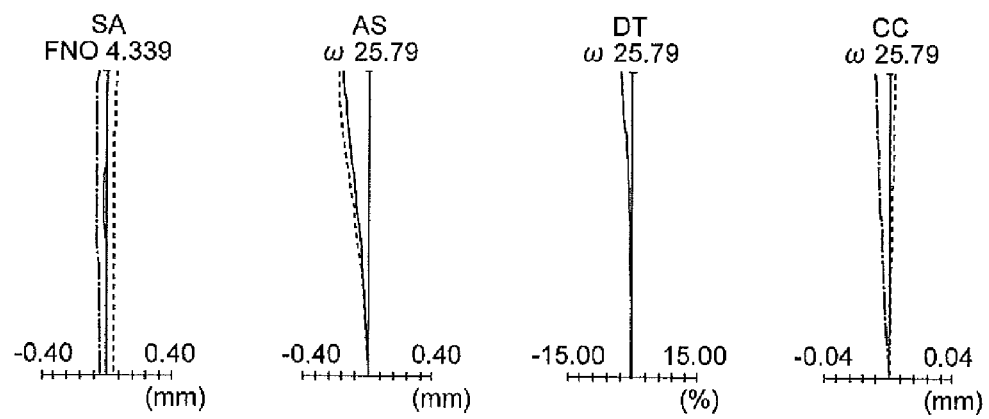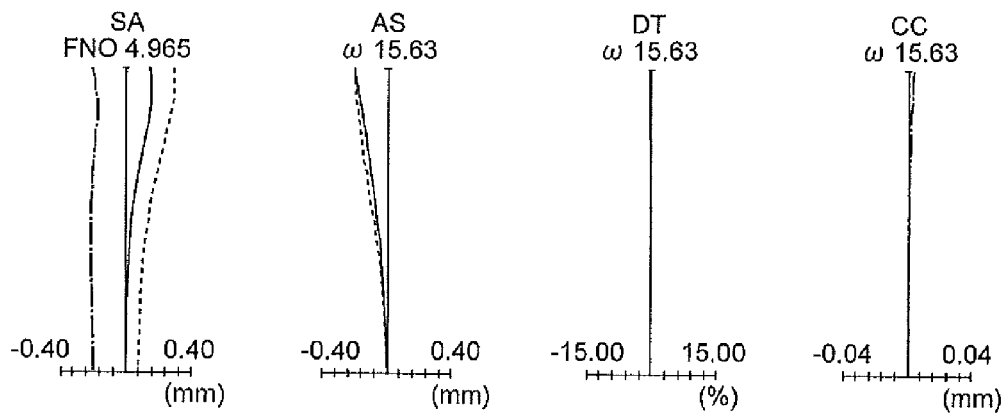

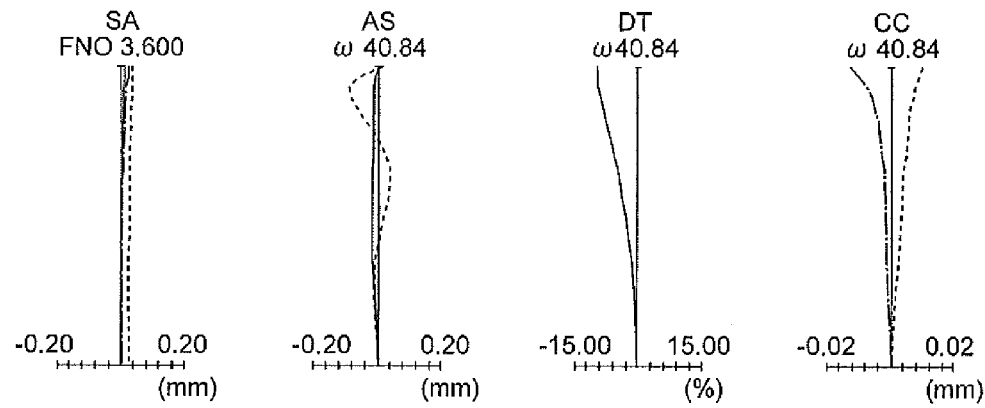
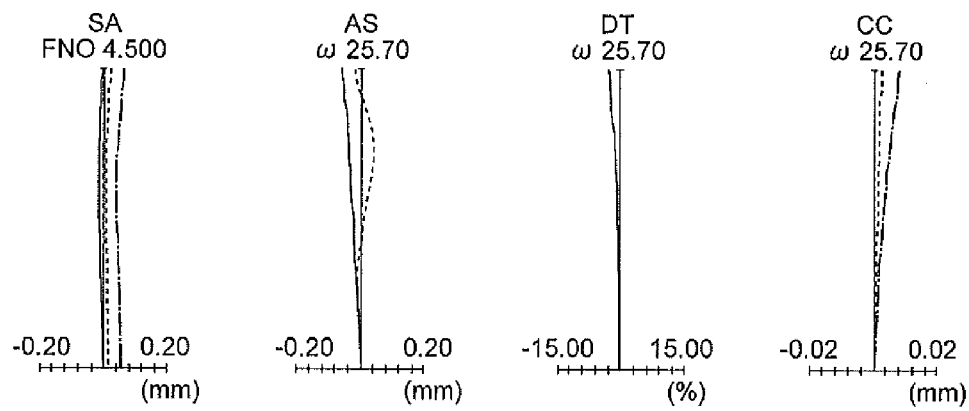
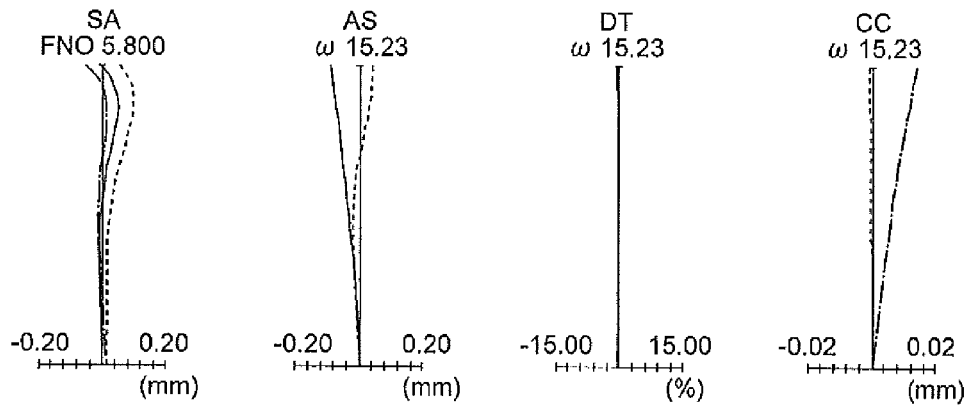

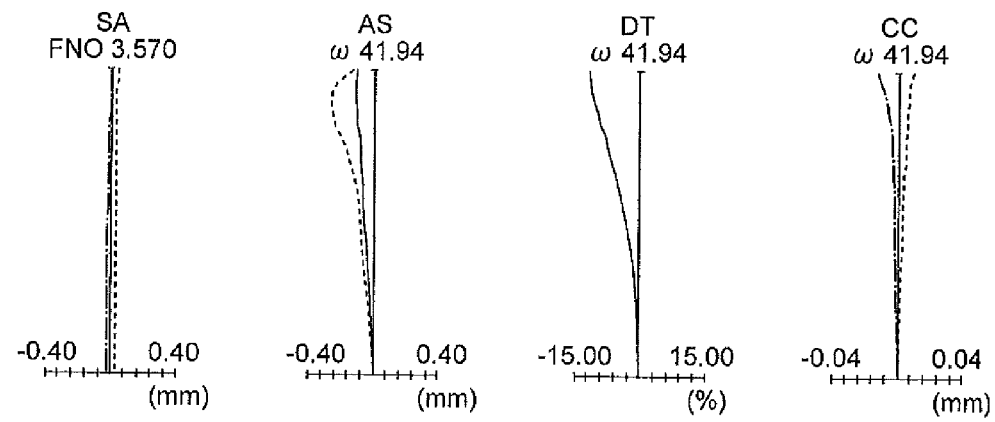
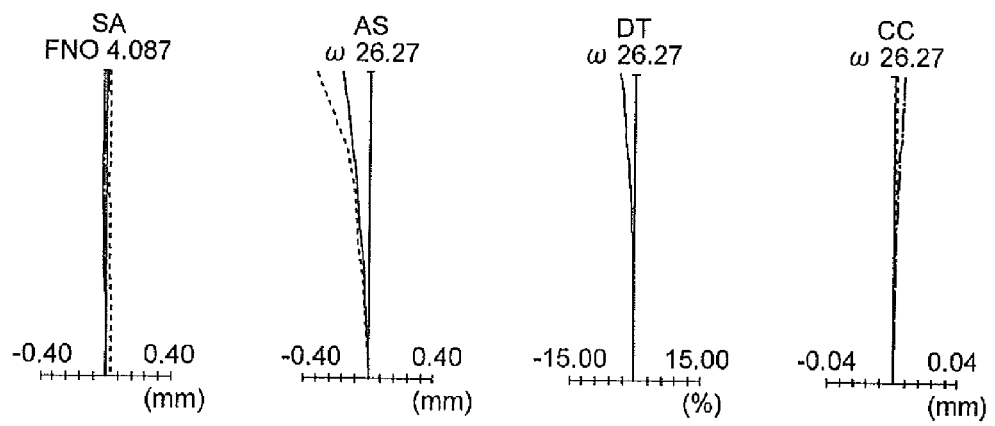
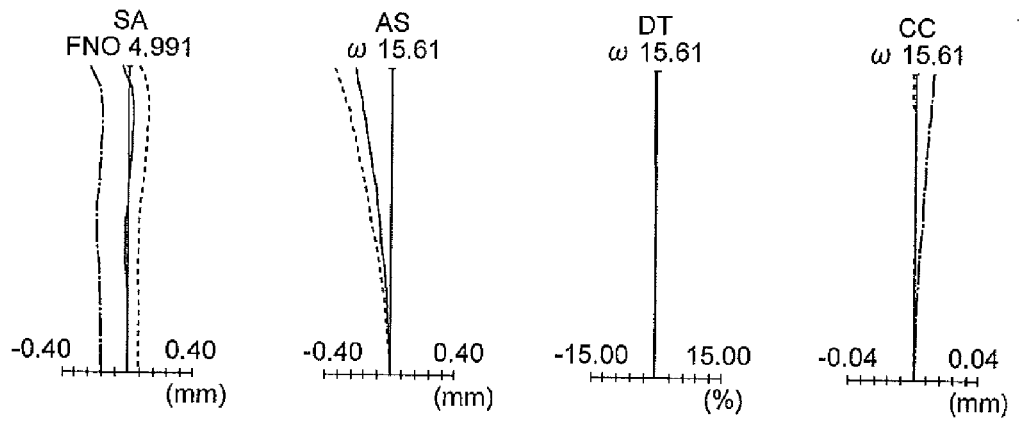

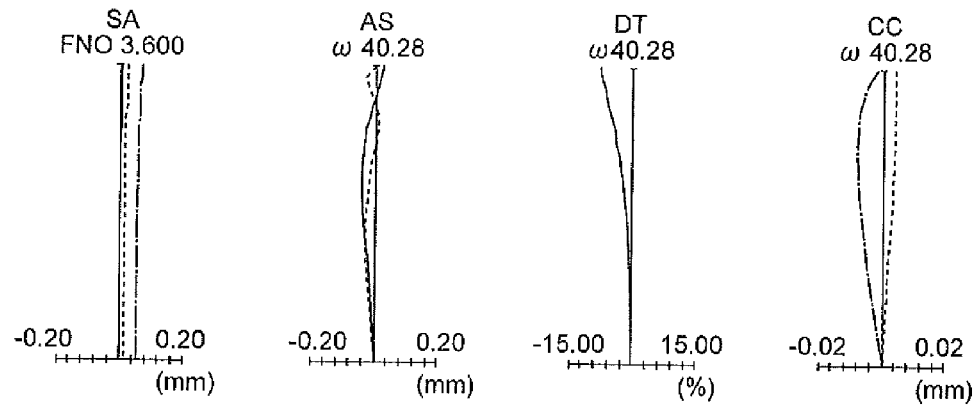
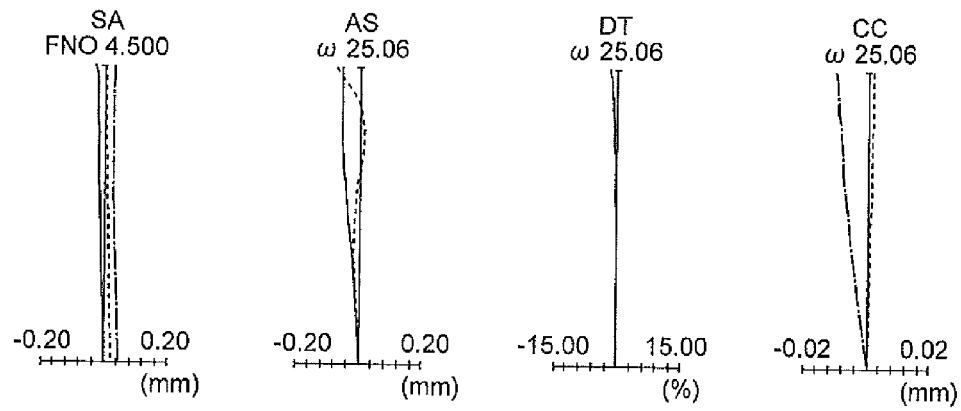
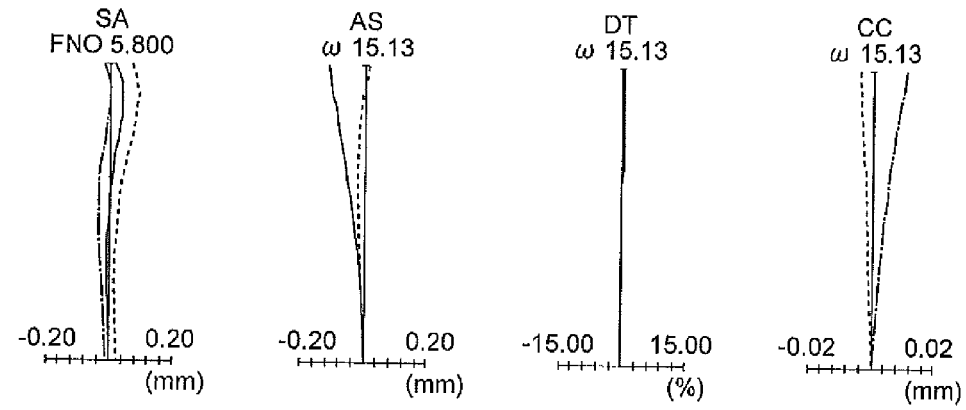

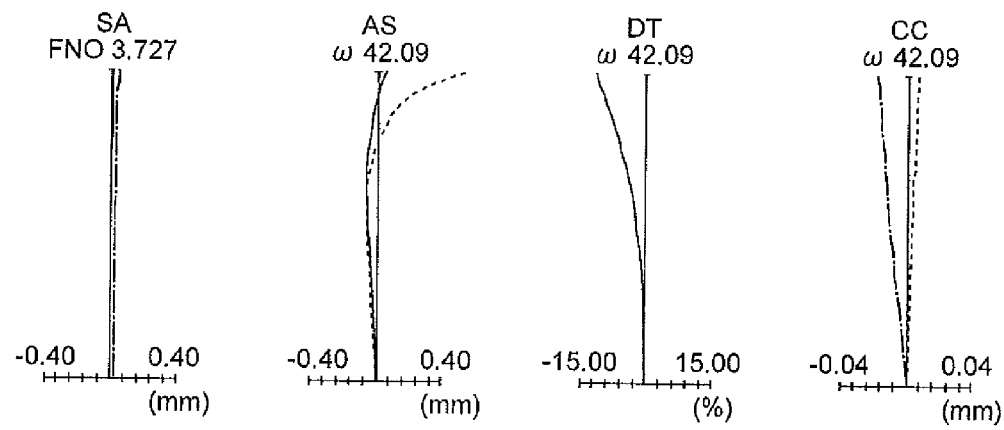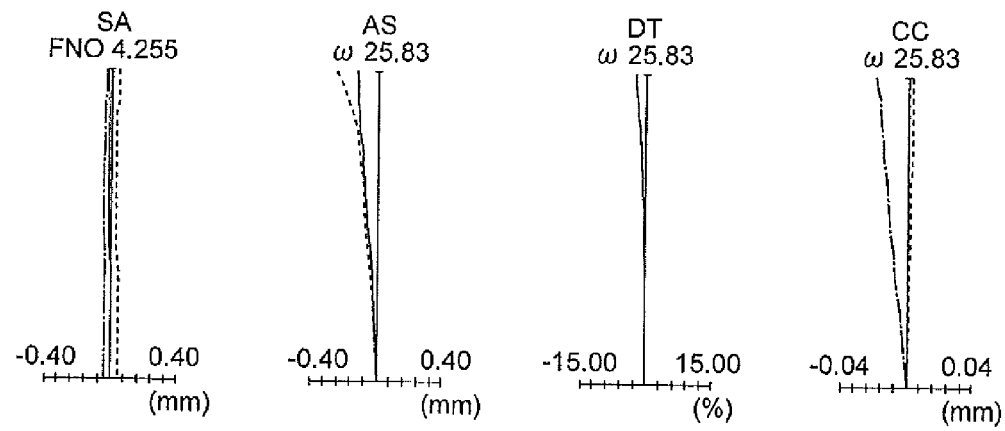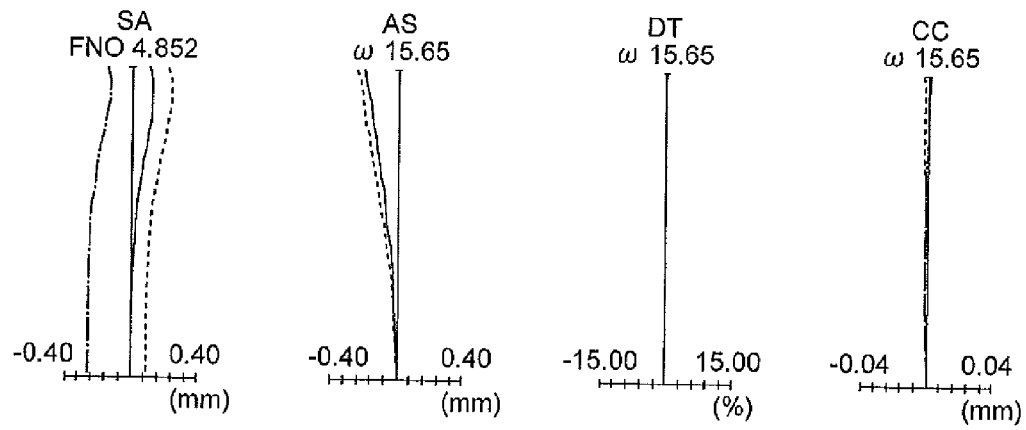

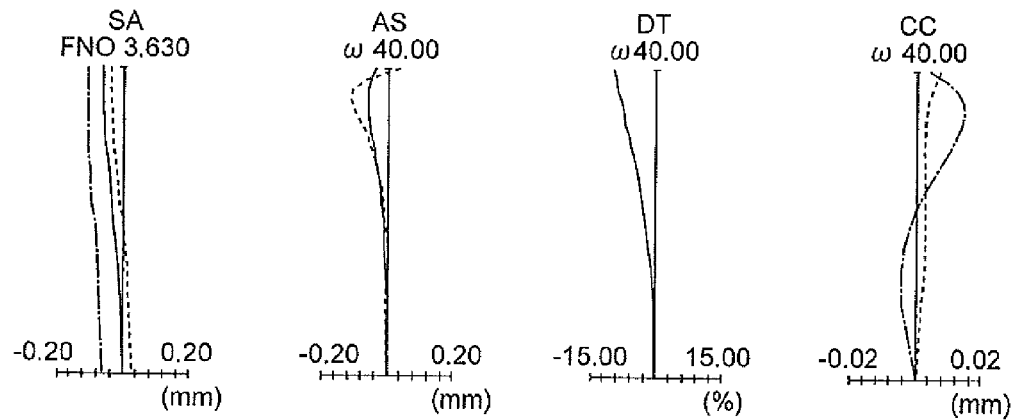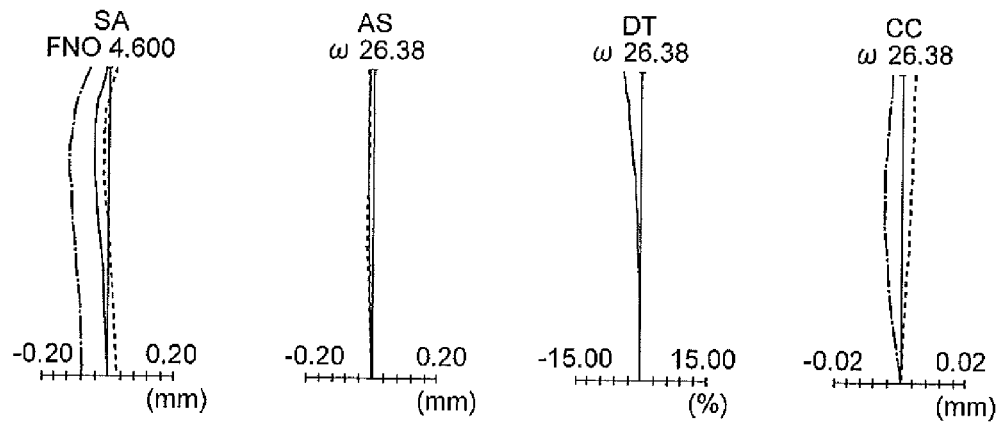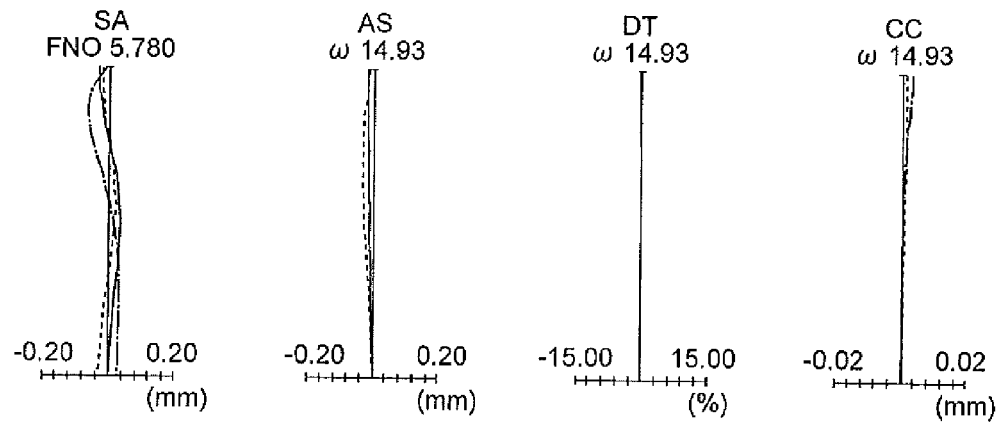

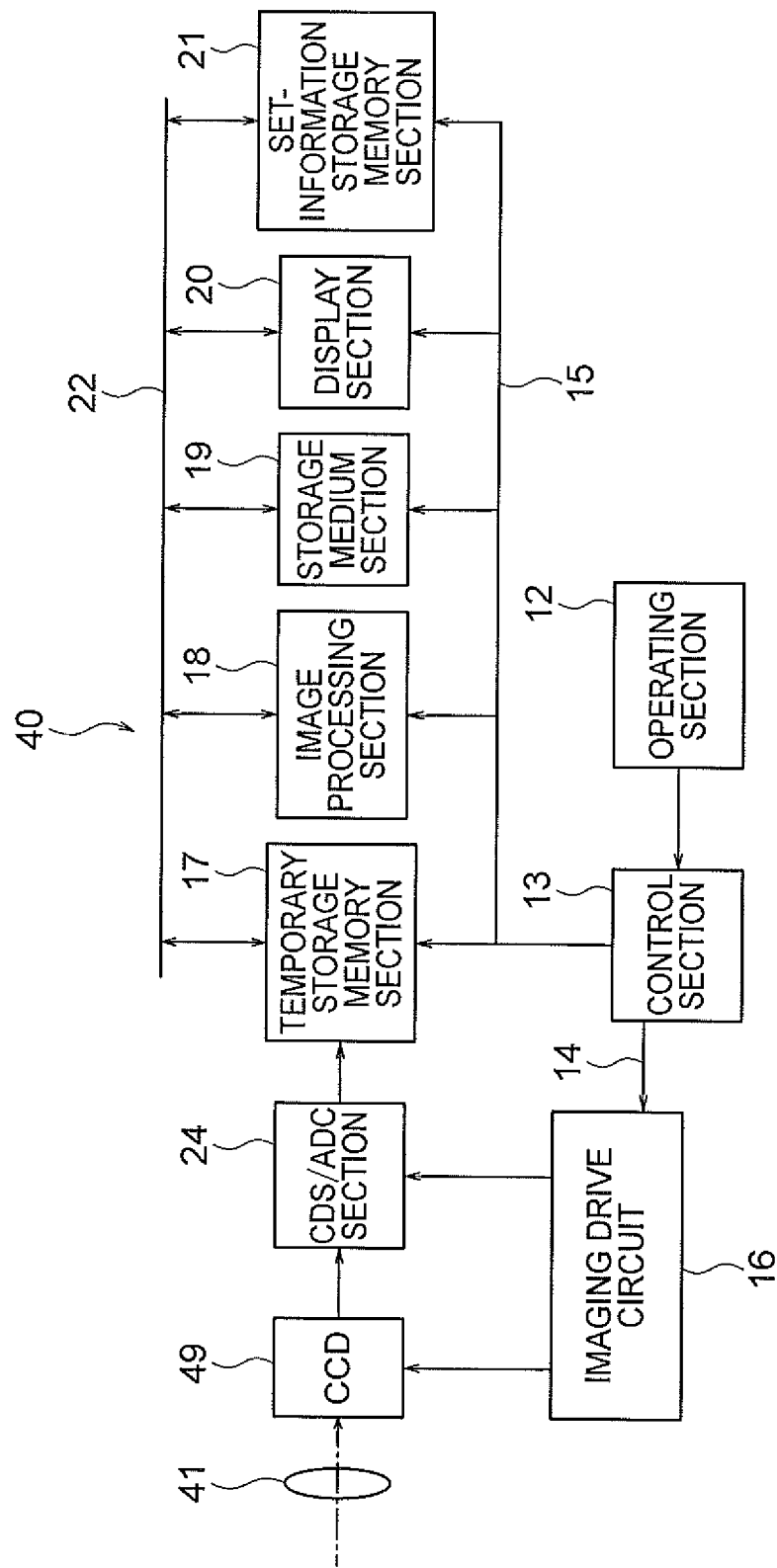

ZOOM LENS AND IMAGE PICKUP APPARATUS USING THE SAME

CROSS-REFERENCE TO RELATED APPLICATION

The present application is a continuation of PCT/JP2014/063561, filed on May 22, 2014 which is based upon and claims the benefit of priority from Japanese Patent Application No. 2013-114622 filed on May 30, 2013; the entire contents of which are incorporated herein by reference.

BACKGROUND OF THE INVENTION

Field of the Invention

The present invention relates to a zoom lens and an image pickup apparatus using the same.

Description of the Related Art

A zoom lens to be used in an image pickup apparatus is desired to be small-sized, and moreover, it is desired that various aberrations are corrected favorably. On the other hand, an image pickup element to be used in an image pickup apparatus is preferred to have a high sensitivity and a large number of pixels. Therefore, a size of the image pickup element (a size of a light receiving surface) becomes large. For such reasons, in a zoom lens, in addition to be small-sized and having favorable correction of various aberrations, it is desired that the zoom lens is capable to cope with an image pickup element of a large size.

As the size of the image pickup element becomes large, a size of an image formed on the image pickup element also becomes large. To be able to cope with the image pickup element of a large size means various aberrations in a peripheral portion (a portion of a large image height) are to be corrected favorably even in a case in which, the size of the image has become large.

As a zoom lens which realizes the abovementioned demand, a zoom lens of negative-lead type has been known. In the negative-lead type zoom lens, a lens unit having a negative refractive power is disposed nearest to an object. As the negative-lead type zoom lens, a zoom lens that includes two lens units and a zoom lens that includes three lens units are available. The zoom lens that includes two lens units includes in order from an object side, a lens unit having a negative refractive power and a lens unit having a positive refractive power.

Moreover, as the zoom lens that includes three lens units, a zoom lens disclosed in Japanese Patent Application Laid-open Publication No. 2012-22019 is available. The zoom lens disclosed in Japanese Patent Application Laid-open Publication No. 2012-22019 includes in order from the object side, a first lens unit having a negative refractive power, a second lens unit having a negative refractive power, and a third lens unit having a positive refractive power.

SUMMARY OF THE INVENTION

A zoom lens of the present invention comprises in order from an object side,
  a first lens unit having a negative refractive power,
  a second lens unit having a negative refractive power,
  a lens unit having a positive refractive power, and
  a rearmost lens unit having a negative refractive power,
wherein
  at the time of zooming, distances between the lens units change.

Moreover, an image pickup apparatus of the present invention comprises
  the zoom lens, and
  an image pickup element having an image pickup surface.

BRIEF DESCRIPTION OF THE DRAWINGS

FIG. 1A is a cross-sectional view at a wide angle end, FIG. 1B is a cross-sectional view at an intermediate focal length state, and FIG. 1C is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L (hereinafter, 'FIG. 2A to FIG. 2L') are diagrams showing a spherical aberration (SA), an astigmatism (AS), a distortion (DT), and a chromatic aberration of magnification (CC) of the zoom lens according to the example 1 at the time of focusing on an infinite object point, where, FIG. 2A, FIG. 2B, FIG. 2C, and FIG. 2D show a state at the wide angle end, FIG. 2E, FIG. 2F, FIG. 2G, and FIG. 2H show an intermediate focal length state, and FIG. 2I, FIG. 2J, FIG. 2K, and FIG. 2L show a state at the telephoto end;

FIG. 3A is a cross-sectional view at a wide angle end, FIG. 3B is a cross-sectional view at an intermediate focal length state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L (hereinafter, 'FIG. 4A to FIG. 4L') are diagrams showing a spherical aberration (SA), an astigmatism (AS), a distortion (DT), and a chromatic aberration of magnification (CC) of the zoom lens according to the example 1 at the time of focusing on an object point at a short distance, where, FIG. 4A, FIG. 4B, FIG. 4C, and FIG. 4D show a state at the wide angle end, FIG. 4E, FIG. 4F, FIG. 4G, and FIG. 4H show an intermediate focal length state, and FIG. 4I, FIG. 4J, FIG. 4K, and FIG. 4L show a state at the telephoto end;

FIG. 5A is a cross-sectional view at a wide angle end, FIG. 5B is a cross-sectional view at an intermediate focal length state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L (hereinafter, 'FIG. 6A to FIG. 6L') are diagrams showing a spherical aberration (SA), an astigmatism (AS), a distortion (DT), and a chromatic aberration of magnification (CC) of the zoom lens according to the example 2 at the time of focusing on an infinite object point, where, FIG. 6A, FIG. 6B, FIG. 6C, and FIG. 6D show a state at the wide angle end, FIG. 6E, FIG. 6F, FIG. 6G, and FIG. 6H show an intermediate focal length state, and FIG. 6I, FIG. 6J, FIG. 6K, and FIG. 6L show a state at the telephoto end;

FIG. 7A is a cross-sectional view at a wide angle end, FIG. 7B is a cross-sectional view at an intermediate focal length state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') are diagrams showing a spherical aberration (SA), an astigmatism (AS), a distortion (DT), and a chromatic aberration of magnification (CC) of the zoom lens according to the example 2 at the time of focusing on an object point at a short distance, where, FIG. 8A, FIG. 8B, FIG. 8C, and FIG. 8D show a state at the wide angle end, FIG. 8E, FIG. 8F, FIG. 8G, and FIG. 8H show an intermediate focal length state, and FIG. 8I, FIG. 8J, FIG. 8K, and FIG. 8L show a state at the telephoto end;

FIG. 9A is a cross-sectional view at a wide angle end, FIG. 9B is a cross-sectional view at an intermediate focal length state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are diagrams showing a spherical aberration (SA), an astigmatism (AS), a distortion (DT), and a chromatic aberration of magnification (CC) of the zoom lens according to the example 3 at the time of focusing on an infinite object point, where, FIG. 10A, FIG. 10B, FIG. 10C, and FIG. 10D show a state at the wide angle end, FIG. 10E, FIG. 10F, FIG. 10G, and FIG. 10H show an intermediate focal length state, and FIG. 10I, FIG. 10J, FIG. 10K, and FIG. 10L show a state at the telephoto end;

FIG. 11A is a cross-sectional view at a wide angle end, FIG. 11B is a cross-sectional view at an intermediate focal length state, and FIG. 11C is a cross-sectional view at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are diagrams showing a spherical aberration (SA), an astigmatism (AS), a distortion (DT), and a chromatic aberration of magnification (CC) of the zoom lens according to the example 3 at the time of focusing on an object point at a short distance, where, FIG. 12A, FIG. 12B, FIG. 12C, and FIG. 12D show a state at the wide angle end, FIG. 12E, FIG. 12F, FIG. 12G, and FIG. 12H show an intermediate focal length state, and FIG. 12I, FIG. 12J, FIG. 12K, and FIG. 12L show a state at the telephoto end;

FIG. 13A is a cross-sectional view at a wide angle end, FIG. 13B is a cross-sectional view at an intermediate focal length state, and FIG. 13C is a cross-sectional view at a telephoto end;

FIG. 14A, FIG. 14B, FIG. 14C, and FIG. 14D show a state at the wide angle end, FIG. 14E, FIG. 14F, FIG. 14G, and FIG. 14H show an intermediate focal length state, and FIG. 14I, FIG. 14J, FIG. 14K, and FIG. 14L show a state at the telephoto end;

FIG. 15A is a cross-sectional view at a wide angle end, FIG. 15B is a cross-sectional view at an intermediate focal length state, and FIG. 15C is a cross-sectional view at a telephoto end;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L (hereinafter, 'FIG. 16A to FIG. 16L') are diagrams showing a spherical aberration (SA), an astigmatism (AS), a distortion (DT), and a chromatic aberration of magnification (CC) of the zoom lens according to the example 4 at the time of focusing on an object point at a short distance, where, FIG. 16A, FIG. 16B, FIG. 16C, and FIG. 16D show a state at the wide angle end, FIG. 16E, FIG. 16F, FIG. 16G, and FIG. 16H show an intermediate focal length state, and FIG. 16I, FIG. 16J, FIG. 16K, and FIG. 16L show a state at the telephoto end;

FIG. 17A is a cross-sectional view at a wide angle end, FIG. 17B is a cross-sectional view at an intermediate focal length state, and FIG. 17C is a cross-sectional view at a telephoto end;

FIG. 18A, FIG. 18B, FIG. 18C, and FIG. 18D show a state at the wide angle end, FIG. 18E, FIG. 18F, FIG. 18G, and FIG. 18H show an intermediate focal length state, and FIG. 18I, FIG. 18J, FIG. 18K, and FIG. 18L show a state at the telephoto end;

FIG. 19A, FIG. 19B, and FIG. 19C are cross-sectional views along an optical axis showing an optical arrangement of the zoom lens according to the example 5 at the time of focusing on an object point at a short distance, where, FIG. 19A is a cross-sectional view at a wide angle end, FIG. 19B is a cross-sectional view in at intermediate focal length state, and FIG. 19C is a cross-sectional view at a telephoto end;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L (hereinafter, 'FIG. 20A to FIG. 20L') are diagrams showing a spherical aberration (SA), an astigmatism (AS), a distortion (DT), and a chromatic aberration of magnification (CC) of the zoom lens according to the example 5 at the time of focusing on an object point at a short distance, where, FIG. 20A, FIG. 20B, FIG. 20C, and FIG. 20D show a state at the wide angle end, FIG. 20E, FIG. 20F, FIG. 20G, and FIG. 20H show an intermediate focal length state, and FIG. 20I, FIG. 20J, FIG. 20K, and FIG. 20L show a state at the telephoto end;

FIG. 21A is a cross-sectional view at a wide angle end, FIG. 21B is a cross-sectional view at an intermediate focal length state, and FIG. 21C is a cross-sectional view at a telephoto end;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L (hereinafter, 'FIG. 22A to FIG. 22L') are diagrams showing a spherical aberration (SA), an astigmatism (AS), a distortion (DT), and a chromatic aberration of magnification (CC) of the zoom lens according to the example 6 at the time of focusing on an infinite object point, where, FIG. 22A, FIG. 22B, FIG. 22C, and FIG. 22D show a state at the wide angle end, FIG. 22E, FIG. 22F, FIG. 22G, and FIG. 22H show an intermediate focal length state, and FIG. 22I, FIG. 22J, FIG. 22K, and FIG. 22L show a state at the telephoto end;

FIG. 23A is a cross-sectional view at a wide angle end, FIG. 23B is a cross-sectional view at an intermediate focal length state, and FIG. 23C is a cross-sectional view at a telephoto end;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L (hereinafter, 'FIG. 24A to FIG. 24L') are diagrams showing a spherical aberration (SA), an astigmatism (AS), a distortion (DT), and a chromatic aberration of magnification (CC) of the zoom lens according to the example 6 at the time of focusing on an object point at a short distance, where, FIG. 24A, FIG. 24B, FIG. 24C, and FIG. 24D show a state at the wide angle end, FIG. 24E, FIG. 24F, FIG. 24G, and FIG. 24H show an intermediate focal length state, and FIG. 24I, FIG. 24J, FIG. 24K, and FIG. 24L show a state at the telephoto end;

FIG. 25A is a cross-sectional view at a wide angle end, FIG. 25B is a cross-sectional view at an intermediate focal length state, and FIG. 25C is a cross-sectional view at a telephoto end;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L (hereinafter, 'FIG. 26A to FIG. 26L') are diagrams showing a spherical aberration (SA), an astigmatism (AS), a distortion (DT), and a chromatic aberration of magnification (CC) of the zoom lens according to the example 7 at the time of focusing on an infinite object point, where, FIG. 26A, FIG. 26B, FIG. 26C, and FIG. 26D show a state at the wide angle end, FIG. 26E, FIG. 26F, FIG. 26G, and FIG. 26H show an intermediate focal length state, and FIG. 26I, FIG. 26J, FIG. 26K, and FIG. 26L show a state at the telephoto end;

FIG. 27A is a cross-sectional view at a wide angle end, FIG. 27B is a cross-sectional view at an intermediate focal length state, and FIG. 27C is a cross-sectional view at a telephoto end;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L (hereinafter, 'FIG. 28A to FIG. 28L') are diagrams showing a spherical aberration (SA), an astigmatism (AS), a distortion (DT), and a chromatic aberration of magnification (CC) of the zoom lens according to the example 7 at the time of focusing on an object point at a short distance, where, FIG. 28A, FIG. 28B, FIG. 28C, and FIG. 28D show a state at the wide angle end, FIG. 28E, FIG. 28F, FIG. 28G, and FIG. 28H show an intermediate focal length state, and FIG. 28I, FIG. 28J, FIG. 28K, and FIG. 28L show a state at the telephoto end;

FIG. 29A is a cross-sectional view at a wide angle end, FIG. 29B is a cross-sectional view at an intermediate focal length state, and FIG. 29C is a cross-sectional view at a telephoto end;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L (hereinafter, 'FIG. 30A to FIG. 30L') are diagrams showing a spherical aberration (SA), an astigmatism (AS), a distortion (DT), and a chromatic aberration of magnification (CC) of the zoom lens according to the example 8 at the time of focusing on an infinite object point, where, FIG. 30A, FIG. 30B, FIG. 30C, and FIG. 30D show a state at the wide angle end, FIG. 30E, FIG. 30F, FIG. 30G, and FIG. 30H show an intermediate focal length state, and FIG. 30I, FIG. 30J, FIG. 30K, and FIG. 30L show a state at the telephoto end;

FIG. 31A is a cross-sectional view at a wide angle end, FIG. 31B is a cross-sectional view at an intermediate focal length state, and FIG. 31C is a cross-sectional view at a telephoto end;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L (hereinafter, 'FIG. 32A to FIG. 32L') are diagrams showing a spherical aberration (SA), an astigmatism (AS), a distortion (DT), and a chromatic aberration of magnification (CC) of the zoom lens according to the example 8 at the time of focusing on an object point at a short distance, where, FIG. 32A, FIG. 32B, FIG. 32C, and FIG. 32D show a state at the wide angle end, FIG. 32E, FIG. 32F, FIG. 32G, and FIG. 32H show an intermediate focal length state, and FIG. 32I, FIG. 32J, FIG. 32K, and FIG. 32L show a state at the telephoto end;

FIG. 33A is a cross-sectional view at a wide angle end, FIG. 33B is a cross-sectional view at an intermediate focal length state, and FIG. 33C is a cross-sectional view at a telephoto end;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L (hereinafter, 'FIG. 34A to FIG. 34L') are diagrams showing a spherical aberration (SA), an astigmatism (AS), a distortion (DT), and a chromatic aberration of magnification (CC) of the zoom lens according to the example 9 at the time of focusing on an infinite object point, where, FIG. 34A, FIG. 34B, FIG. 34C, and FIG. 34D show a state at the wide angle end, FIG. 34E, FIG. 34F, FIG. 34G, and FIG. 34H show an intermediate focal length state, and FIG. 34I, FIG. 34J, FIG. 34K, and FIG. 34L show a state at the telephoto end;

FIG. 35A is a cross-sectional view at a wide angle end, FIG. 35B is a cross-sectional view at an intermediate focal length state, and FIG. 35C is a cross-sectional view at a telephoto end;

FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L (hereinafter, 'FIG. 36A to FIG. 36L') are diagrams showing a spherical aberration (SA), an astigmatism (AS), a distortion (DT), and a chromatic aberration of magnification (CC) of the zoom lens according to the example 9 at the time of focusing on an object point at a short distance, where, FIG. 36A, FIG. 36B, FIG. 36C, and FIG. 36D show a state at the wide angle end, FIG. 36E, FIG. 36F, FIG. 36G, and FIG. 36H show an intermediate focal length state, and FIG. 36I, FIG. 36J, FIG. 36K, and FIG. 36L show a state at the telephoto end;

FIG. 37A is a cross-sectional view at a wide angle end, FIG. 37B is a cross-sectional view at an intermediate focal length state, and FIG. 37C is a cross-sectional view at a telephoto end;

FIG. 38A, FIG. 38B, FIG. 38C, FIG. 38D, FIG. 38E, FIG. 38F, FIG. 38G, FIG. 38H, FIG. 38I, FIG. 38J, FIG. 38K, and FIG. 38L (hereinafter, 'FIG. 38A to FIG. 38L') are diagrams showing a spherical aberration (SA), an astigmatism (AS), a distortion (DT), and a chromatic aberration of magnification (CC) of the zoom lens according to the example 10 at the time of focusing on an infinite object point, where, FIG. 38A, FIG. 38B, FIG. 38C, and FIG. 38D show a state at the wide angle end, FIG. 38E, FIG. 38F, FIG. 38G, and FIG. 38H show an intermediate focal length state, and FIG. 38I, FIG. 38J, FIG. 38K, and FIG. 38L show a state at the telephoto end;

FIG. 39A is a cross-sectional view at a wide angle end, FIG. 39B is a cross-sectional view at an intermediate focal length state, and FIG. 39C is a cross-sectional view at a telephoto end;

FIG. 40A, FIG. 40B, FIG. 40C, FIG. 40D, FIG. 40E, FIG. 40F, FIG. 40G, FIG. 40H, FIG. 40I, FIG. 40J, FIG. 40K, and FIG. 40L (hereinafter, 'FIG. 40A to FIG. 40L') are diagrams showing a spherical aberration (SA), an astigmatism (AS), a distortion (DT), and a chromatic aberration of magnification (CC) of the zoom lens according to the example 10 at the time of focusing on an object point at a short distance, where, FIG. 40A, FIG. 40B, FIG. 40C, and FIG. 40D show a state at the wide angle end, FIG. 40E, FIG. 40F, FIG. 40G, and FIG. 40H show an intermediate focal length state, and FIG. 40I, FIG. 40J, FIG. 40K, and FIG. 40L show a state at the telephoto end;

FIG. 41A is a cross-sectional view at a wide angle end, FIG. 41B is a cross-sectional view at an intermediate focal length state, and FIG. 41C is a cross-sectional view at a telephoto end;

FIG. 42A, FIG. 42B, FIG. 42C, FIG. 42D, FIG. 42E, FIG. 42F, FIG. 42G, FIG. 42H, FIG. 42I, FIG. 42J, FIG. 42K, and FIG. 42L (hereinafter, 'FIG. 42A to FIG. 42L') are diagrams showing a spherical aberration (SA), an astigmatism (AS), a distortion (DT), and a chromatic aberration of magnification (CC) of the zoom lens according to the example 11 at the time of focusing on an infinite object point, where, FIG. 42A, FIG. 42B, FIG. 42C, and FIG. 42D show a state at the wide angle end, FIG. 42E, FIG. 42F, FIG. 42G, and FIG. 42H show an intermediate focal length state, and FIG. 42I, FIG. 42J, FIG. 42K, and FIG. 42L show a state at the telephoto end;

FIG. 43A is a cross-sectional view at a wide angle end, FIG. 43B is a cross-sectional view at an intermediate focal length state, and FIG. 43C is a cross-sectional view at a telephoto end;

FIG. 44A, FIG. 44B, FIG. 44C, and FIG. 44D show a state at the wide angle end, FIG. 44E, FIG. 44F, FIG. 44G, and FIG. 44H show an intermediate focal length state, and FIG. 44I, FIG. 44J, FIG. 44K, and FIG. 44L show a state at the telephoto end;

FIG. 48 is a structural block diagram of an internal circuit of main components of the digital camera in FIG. 46.

DETAILED DESCRIPTION OF THE INVENTION

Figure 1A:
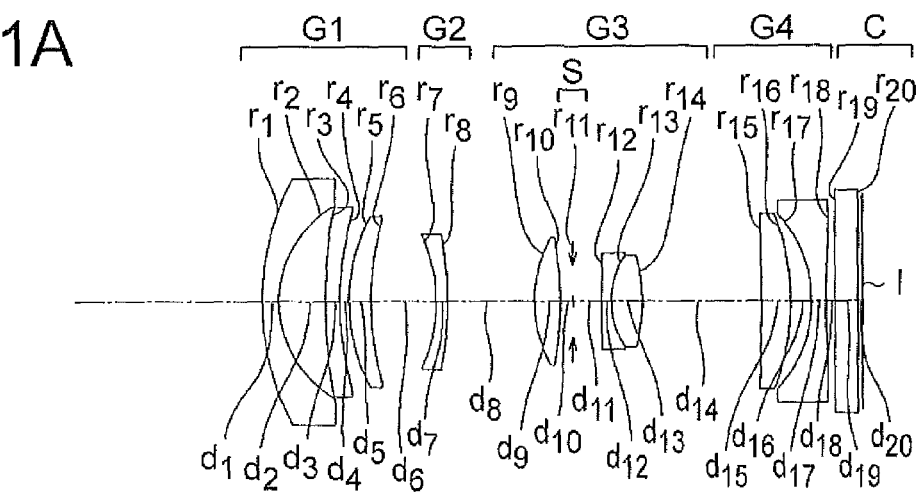
FIG. 1A, FIG. 1B, and FIG. 1C are cross-sectional views along an optical axis showing an optical arrangement of a zoom lens according to an example 1 at the time of focusing on an infinite object point, where.

Prior to explaining examples, action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations in these aspects. Therefore, the present invention is not restricted to the aspects that are exemplified.

Moreover, arrangements and conditional expressions described below are arrangements and conditional expressions at a time of focusing on an infinite object point, unless specifically noted. Moreover, in a case in which, a lens surface is an aspheric surface, a paraxial radius of curvature may be let to be a radius of curvature of that lens surface.

Moreover, in a case in which, an arrangement of a lens unit is described by using 'a lens nearest to an image' and 'a lens nearest to an object', that lens unit is not restricted to include a plurality of lenses. In other words, a case in which, that lens unit includes one lens is also included. In a case in which, a lens unit includes one lens, that lens is a lens positioned nearest to an object in that lens unit, and at the same time, is a lens positioned nearest to an image in that lens unit.

A zoom lens of the present embodiment includes a plurality of lens units, and includes in order from an object side, a first lens unit having a negative refractive power, a second lens unit having a negative refractive power, a lens unit having a positive refractive power, and a rearmost lens unit having a negative refractive power, and the rearmost lens unit is positioned nearest to an image in the plurality of lens units, and at the time of zooming, distances between the lens units in the plurality of lens units change.

For small-sizing the zoom lens, it is necessary to shorten the overall length of the zoom lens. When an attempt is made to shorten the overall length of the zoom lens, a refractive power of each lens unit becomes large. In a zoom lens that includes three lens units, as the refractive power of each lens unit is made large, correction of a chromatic aberration of magnification, an astigmatism, a distortion, a spherical aberration, and a longitudinal chromatic aberration becomes difficult as mentioned above.

For instance, in the first lens unit and the second lens unit, the chromatic aberration of magnification, the astigmatism, and the distortion occur. When an attempt is made to correct these aberrations by a lens unit having a positive refractive power, correction of the spherical aberration and the longitudinal chromatic aberration occurring in the lens unit having a positive refractive power becomes difficult.

Therefore, in the zoom lens of the present embodiment, the rearmost lens unit having a negative refractive power is disposed nearest to the image in the plurality of lens units. By disposing the lens unit having a negative refractive power nearest to the image, both a refractive power on an object side and a refractive power on an image side, sandwiching the lens having a positive refractive power, become negative. In such manner, since it is possible to make an arrangement of refractive power symmetric, it is possible to correct various aberrations favorably.

Moreover, as mentioned above, correction of off-axis aberrations such as the chromatic aberration of magnification, the astigmatism, and the distortion had hitherto been carried out in a lens unit having a positive refractive power. However, since the zoom lens of the present embodiment includes the rearmost lens unit, the correction of these off-axis aberrations is carried out in the rearmost lens unit and the lens unit having a positive refractive power. Therefore, in the zoom lens of the present embodiment, it is possible to correct the chromatic aberration of magnification, the astigmatism, and the distortion favorably.

In such manner, by including the rearmost lens unit, it is possible to reduce a load of aberration correction, and particularly, a load of correction of an off-axis aberration such as the chromatic aberration of magnification, the astigmatism, and the distortion, on the lens unit having a positive refractive power. Therefore, in the lens unit having a positive refractive power, the aberration correction with mainly the spherical aberration and the longitudinal chromatic aberration being the main target of correction, is possible. As a result, it is possible to shorten the overall length of the zoom lens while correcting the chromatic aberration of magnification, the astigmatism, the distortion, the spherical aberration, and the longitudinal chromatic aberration favorably.

Moreover, by letting the refractive power of the rearmost lens unit to be a negative refractive power, it is possible to make a light ray emerging from the rearmost lens unit emerge in a direction away from an optical axis. This means that it is possible to form a large image. Therefore, even in a case in which an image pickup element of a large size is used, it is possible to form a large image having various aberrations corrected favorably, on the image pickup element.

Moreover, at the time of zooming from a wide angle end to a telephoto end, an amount of the chromatic aberration of magnification, the distortion, and the astigmatism that occur changes. Therefore, by changing a distance between the first lens unit and the second lens unit, it is possible to correct these aberrations favorably. Moreover, it is possible to shorten the overall length of the zoom lens.

In such manner, by including the rearmost lens unit having a negative refractive power nearest to the image, it is possible to realize a zoom lens in which various aberrations are corrected favorably from a center up to a peripheral area, and also the overall length is short, even in a case in which an image pickup element of a large size is used.

Moreover, in the zoom lens of the present embodiment, it is preferable that at the time of focusing from the infinite object point to an object point at a short distance, only the second lens unit moves, and the following conditional expression (1) is satisfied:

$$2.00 < |S_f| < 8.00 \tag{1}$$

where, $$S_f = (1 - \beta_{2t} \times \beta_{2t}) \times \beta_{ct} \times \beta_{ct},$$

$\beta_{2t}$ denotes a lateral magnification of the second lens unit,
$\beta_{ct}$ denotes a combined lateral magnification of all the lens units positioned on the image side of the second lens unit, and both $\beta_{2t}$ and $\beta_{ct}$ are a lateral magnification at the time of focusing on the infinite object point at a telephoto end.

At the telephoto end, a height of an off-axis light ray in the second lens unit is suppressed to be lower as compared to a height of an off-axis light ray in the first lens unit. Therefore, by moving only the second lens unit at the time of focusing, it is possible to suppress the astigmatism and the distortion that occur due to focusing.

Conditional expression (1) is a conditional expression related to a focusing sensitivity at the telephoto end in a case of focusing by the second lens unit. The focusing sensitivity is an amount of movement of an image plane indicated paraxially with respect to an amount of movement of the second lens unit. In a case of focusing by the second lens unit, a combined lateral magnification of lens units positioned on the image side of the second lens unit is included in the focusing sensitivity. There is a plurality of lens units on the image side of the second lens unit. The combined lateral magnification is a product of lateral magnification of the plurality of lens units.

By satisfying conditional expression (1), the astigmatism and the distortion are corrected favorably, and also it is possible to realize a zoom lens with a short overall length. Moreover, it is possible to secure a favorable imaging performance when focused on an object point at a short distance (object point which is near). In other words, an image in which, various aberrations are corrected favorably is achieved. Consequently, when small-sizing of an optical system is carried out, a problem occurs frequently at the time of focusing on an object point at a short distance. Here, the problem is that a fluctuation of aberrations such as the astigmatism and a curvature of field become large. However, according to the zoom lens of the present embodiment, it is possible to solve such problem.

By making so as not to fall below a lower limit value of conditional expression (1), it is possible to make the focusing sensitivity adequately high. Therefore, it is possible to suppress an increase in the amount of movement of the second lens unit at the time of focusing, and the fluctuation in the astigmatism and the distortion. Moreover, by the amount of movement of the second lens unit being suppressed, it is possible to make a space necessary for the movement of the second lens unit small. As a result, it is possible to shorten the overall length of the zoom lens.

By making so as not to exceed an upper limit value of conditional expression (1), it is possible to suppress the focusing sensitivity from becoming excessively high. Accordingly, it is possible to suppress an occurrence of the astigmatism and the distortion in the second lens unit.

It is more preferable that the following conditional expression (1') is satisfied instead of conditional expression (1).

$$2.80 < |S_f| < 7.00 \quad (1')$$

Furthermore, it is even more preferable that the following conditional expression (1") is satisfied instead of conditional expression (1).

$$2.90 < |S_f| < 6.50 \quad (1'')$$

Moreover, with regard to the movement of the second lens unit at the time of focusing, movement toward the object side is preferable. As mentioned above, in the zoom lens of the present embodiment, the second lens unit has a negative refractive power. Here, when the lens unit having a negative refractive power is moved toward the object side at the time of focusing, a position of an entrance pupil at the time of focusing on focused on an object point at a short distance becomes a position which moved farther on the object side of a position of the entrance pupil at the time of focusing on an infinite object point. When the position of the entrance pupil is moved toward the object side, it is possible to suppress an increase in a height (becoming high) of an off-axis light ray passing through the first lens unit. Therefore, it is possible to suppress the fluctuation in the astigmatism in the first lens unit. As a result, an image in which various aberrations are corrected favorably is achieved even when focused on an object point at a short distance.

Moreover, it is preferable that the zoom lens of the present embodiment includes an aperture stop, and the aperture stop is disposed between two lenses. Moreover, it is preferable that out of the two lenses, one lens is positioned nearest to the image in the second lens unit, and the other lens is positioned nearest to the object in the rearmost lens unit. Furthermore, it is preferable that at the time of zooming from the wide angle end to the telephoto end, the aperture stop moves toward the object side.

By making such arrangement, in both the first lens unit and the rearmost lens unit, it is possible to suppress an increase in lens diameter. As a result, it is possible to make the optical system small-sized. Moreover, at both the wide angle end and the telephoto end, it is possible to correct the chromatic aberration of magnification and the distortion favorably.

It is preferable that the aperture stop is disposed in a lens unit having a positive refractive power.

Moreover, in the zoom lens of the present embodiment, it is preferable that the following conditional expression (2) is satisfied:

$$1.00 < D_{aiw}/(\tan \omega_t \times f_t) < 5.00 \quad (2)$$

where, $D_{aiw}$ denotes a distance between the aperture stop and an image plane at the wide angle end, $\omega_t$ denotes a half angle of view at the telephoto end, and $f_t$ denotes a focal length of the overall zoom lens system at the telephoto end.

Conditional expression (2) is a conditional expression in which, a ratio of a distance between the aperture stop at the wide angle end and the image plane, and a product of the half angle of view at the telephoto end and the focal length of the overall zoom lens system at the telephoto end, is taken.

By making so as not to fall below a lower limit value of conditional expression (2), it is possible to separate apart a position of the aperture stop adequately from the image plane. When such an arrangement is made, at the wide angle end, it is possible to dispose the first lens unit and the second lens unit near the aperture stop. Since a height of an off-axis light ray is low at the position of the aperture stop, a height of an off-axis light ray that passes through the first lens unit and the second lens unit also becomes low. Therefore, it is possible to make a lens diameter in the first lens unit and the second lens unit small. As a result, it is possible to make the optical system small-sized. Moreover, it is possible to correct off-axis aberrations such as the distortion and the astigmatism favorably at the wide angle end.

By making so as not to exceed an upper limit value of conditional expression (2), it is possible to prevent the position of the aperture stop form being separated excessively apart from the image plane (it is possible to bring the position of the aperture stop adequately closer to the image plane). Accordingly, it is possible to make the distance between the image plane and the aperture stop small at the wide angle end. As a result, it is possible to shorten the overall length of the zoom lens at the wide angle end.

Moreover, when the aperture stop moves toward the object side at the time of zooming from the wide angle end to the telephoto end, the aperture stop is positioned nearest to the object even at the telephoto end in all positions while moving. Therefore, the overall length of the zoom lens is susceptible to become long at the telephoto end. By making so as not to exceed the upper limit value of conditional expression (2), at the telephoto end, it is possible to move and keep the position of the aperture stop closer to the image plane. As a result, it is possible to shorten the overall length of the zoom lens even at the telephoto end where the overall length is susceptible to become long.

Moreover, by positioning the aperture stop nearest to the object at the telephoto end, it is possible to make a refractive power of lens units on both sides of the aperture stop symmetric about the aperture stop. Therefore, at the telephoto end, it is possible to correct the distortion and the chromatic aberration of magnification favorably.

It is more preferable to that the following conditional expression (2') is satisfied instead of conditional expression (2).

$$1.30 < D_{aiw}/(\tan \omega_t \times f_t) < 4.10 \quad (2')$$

Furthermore, it is even more preferable that the following conditional expression (2") is satisfied instead of conditional expression (2).

$$1.50 < D_{aiw}/(\tan \omega_t \times f_t) < 3.50 \quad (2'')$$

Moreover, in the zoom lens of the present embodiment, it is preferable that the following conditional expression (3) is satisfied:

$$0.70 < \beta_{1w} < 2.00 \quad (3)$$

where, $\beta_{1w}$ denotes a lateral magnification of the rearmost lens unit at the time of focusing on the infinite object point at the wide angle end.

Conditional expression (3) is a conditional expression related to the lateral magnification of the rearmost lens unit at the wide angle end.

By making so as not to fall below a lower limit value of conditional expression (3), it is possible to position a principal point of the overall optical system on the object side. Accordingly, it is possible to enhance telephoto performance of the optical system. As a result, it is possible to shorten the overall length of the zoom lens while correcting various aberrations favorably.

By making so as not to exceed an upper limit value of conditional expression (3), it is possible to correct the chromatic aberration of magnification, the distortion, and the astigmatism occurred favorably in the first lens unit and the second lens unit while suppressing an occurrence of the spherical aberration in the rearmost lens unit.

It is more preferable that the following conditional expression (3') is satisfied instead of conditional expression (3).

$$0.80 < \beta_{1w} < 1.50 \tag{3'}$$

Furthermore, it is even more preferable that the following conditional expression (3") is satisfied.

$$0.85 < \beta_{1w} < 1.35 \tag{3"}$$

In the zoom lens of the present embodiment, it is preferable that the following conditional expression (4) is satisfied:

$$0.20 < (\beta_{1t}/\beta_{1w})/(f_t/f_w) < 0.90 \tag{4}$$

where, $\beta_{1t}$ denotes a lateral magnification of the rearmost lens unit at the telephoto end, $\beta_{1w}$ denotes the lateral magnification of the rearmost lens unit at the wide angle end, both $\beta_{1t}$ and $\beta_{1w}$ are lateral magnification at the time of focusing on the infinite object point, $f_t$ denotes the focal length of the overall zoom lens system at the telephoto end, and $f_w$ denotes a focal length of the overall zoom lens system at the wide angle end.

Conditional expression (4) is a related to a zooming ratio of the rearmost lens unit.

By making so as not to fall below a lower limit value of conditional expression (4), it is possible to make the zooming ratio of the rearmost unit large to some extent. Accordingly, at the telephoto end, it is possible to make a distance between the rearmost lens unit and a lens unit on the object side of the rearmost lens unit small. In this case, a height of an axial light ray passing through the rearmost lens unit becomes higher at the telephoto end than a height at the wide angle end. Therefore, an aberration correction at the telephoto end has almost no effect on a fluctuation of aberration at the wide angle end. In such manner, by making so as not to fall below a lower limit value of conditional expression (4), it is possible to correct the spherical aberration and the longitudinal chromatic aberration at the telephoto end without allowing the spherical aberration and the longitudinal chromatic aberration at the wide angle end to deteriorate.

Moreover, the lens unit on the object side of the rearmost lens unit has a zooming effect. When it is possible to make the zooming ratio of the rearmost lens unit large, it is possible to make the zooming ratio of the lens unit on the object side of the rearmost lens unit relatively small. When the zooming ratio can be made relatively small, since it is possible to reduce an amount of movement of the lens unit on the object side of the rearmost lens unit, it is possible to shorten the overall length of the zoom lens.

By making so as not to exceed an upper limit value of conditional expression (4), it is possible to suppress both an increase in the refractive power of the rearmost lens unit and the amount of movement of the rearmost lens unit. Therefore, it is possible to suppress an occurrence of the astigmatism at the wide angle end, and to suppress an occurrence of the spherical aberration at the telephoto end.

It is more preferable that the following conditional expression (4') is satisfied instead of conditional expression (4).

$$0.30 < (\beta_{1t}/\beta_{1w})/(f_t/f_w) < 0.80 \tag{4'}$$

Furthermore, it is even more preferable that the following conditional expression (4") is satisfied instead of conditional expression (4).

$$0.35 < (\beta_{1t}/\beta_{1w})/(f_t/f_w) < 0.70 \tag{4"}$$

Moreover, in the zoom lens of the present embodiment, it is preferable that the following conditional expression (5) is satisfied:

$$0.94 < (\beta_{2t}/\beta_{2w}) < 1.09 \tag{5}$$

where, $\beta_{2t}$ denotes the lateral magnification of the second lens unit at the telephoto end, and $\beta_{2w}$ denotes a lateral magnification of the second lens unit at the wide angle end, and both $\beta_{2t}$ and $\beta_{2w}$ are lateral magnification at the time of focusing on the infinite object point.

Conditional expression (5) is a conditional expression related to a zooming ratio of the second lens unit.

By making so as not to fall below a lower limit value of conditional expression (5), it is possible to make the zooming ratio of the second lens unit adequately large. Therefore, at the telephoto end, it is possible to suppress widening of the distance between the first lens unit and the second lens unit. As a result, it is possible to shorten the overall length of the zoom lens even at the telephoto end at which, the overall length is susceptible to become long.

Moreover, when it is possible to make the zooming ratio of the second lens unit adequately large, since the second lens unit comes closer to the first lens unit, it is possible to position the entrance pupil on the object side. Accordingly, it is possible to suppress an increase in the height of an off-axis ray in the first lens unit. As a result, it is possible to suppress an occurrence of the astigmatism and the chromatic aberration of magnification in the first lens unit.

By making so as not to exceed an upper limit value of conditional expression (5), at the wide angle end, the second lens unit comes closer to the first lens unit. Here, in the first lens unit, the height of an axial light ray at the wide angle end is low. Therefore, as the second lens unit comes closer to the first lens unit, it is possible to suppress an occurrence of the longitudinal chromatic aberration and the spherical aberration at the wide angle end, in the second lens unit.

It is more preferable that the following conditional expression (5') is satisfied instead of conditional expression (5).

$$0.96 < (\beta_{2t}/\beta_{2w}) < 1.07 \tag{5'}$$

Furthermore, it is even more preferable that the following conditional expression (5") is satisfied instead of conditional expression (5).

$$0.98 < (\beta_{2t}/\beta_{2w}) < 1.05 \tag{5"}$$

Moreover, in the zoom lens of the present embodiment, it is preferable that the following conditional expression (6) is satisfied:

$$0.80 < EXP_w/(\tan \omega_t \times f_t) < 3.00 \quad (6)$$

where, $EXP_w$ denotes a distance between the image plane and an exit pupil at the wide angle end $\omega_t$ denotes the half angle of view at the telephoto end, and $f_t$ denotes the focal length of the overall zoom lens system at the telephoto end.

Conditional expression (6) is a conditional expression in which, a ratio of a distance between an exit pupil and an image plane at the wide angle end, and a product of the half angle of view at the telephoto end and the focal length of the overall zoom lens system at the telephoto end is taken.

By making so as not to fall below a lower limit value of conditional expression (6), it is possible to separate apart a position of the exit pupil adequately from the image plane. Accordingly, it is possible to dispose a lens necessary for correction of the distortion and the astigmatism at the wide angle end between the aperture stop and the image plane. As a result, it is possible to correct favorably the distortion and the astigmatism at the wide angle end.

By making so as not to exceed an upper limit value of conditional expression (6), it is possible to prevent the position of the exit pupil from being separated excessively apart from the image plane (it is possible to bring the position of the exit pupil adequately closer to the image plane). Accordingly, it is possible to make the distance between the aperture stop and the image plane small at the wide angle end. As a result, it is possible to shorten the overall length of the zoom lens at the wide angle end.

Moreover, by satisfying conditional expression (6), it is possible to make an angle of incidence of a light ray incident on the image pickup element large. Accordingly, it is possible to prevent a diameter of a lens positioned nearest to the image in the rearmost lens unit from being excessively large with respect to a size of the image pickup element. As a result, it is possible to make the optical system small-sized.

It is more preferable that the following conditional expression (6') is satisfied instead of conditional expression (6).

$$0.90 < EXP_w/(\tan \omega_t \times f_t) < 2.50 \quad (6')$$

Furthermore, it is even more preferable that the following conditional expression (6") is satisfied instead of conditional expression (6).

$$1.00 < EXP_w/(\tan \omega_t \times f_t) < 2.30 \quad (6'')$$

Moreover, in the zoom lens of the present embodiment, it is preferable that the second lens unit includes one negative lens.

As it has been mentioned above, sometimes the second lens unit moves at the time of focusing from the infinite object point to an object point at a short distance. Therefore, by making an arrangement such that the second lens unit includes one negative lens, it is possible to make a space in which the negative lens (second lens unit) is to be disposed small, and a space which is necessary for the movement of the negative lens (second lens unit). As a result, it is possible to shorten the overall length of the zoom lens at the telephoto end, and it is possible to make the optical system small-sized.

Moreover, in the zoom lens of the present embodiment, it is preferable that the negative lens is a meniscus lens having a convex surface directed toward an image side, and at the time of focusing from an infinite object point to an object point at a short distance, the negative lens moves toward the object side, and the following conditional expression (7) is satisfied:

$$-6.00 < (r_{ff} + r_{fb})/(r_{ff} - r_{fb}) < -1.00 \quad (7)$$

where, $r_{ff}$ denotes the radius of curvature of the object-side lens surface of the negative lens, and $r_{fb}$ denotes the radius of curvature of the image-side lens surface of the negative lens.

In a case in which, the second lens unit includes one negative lens, it is preferable to let a shape of the negative lens to be a meniscus shape. By making such arrangement, it is possible to suppress an occurrence of the spherical aberration at the wide angle end and the telephoto end.

Moreover, it is preferable to dispose the negative lens having a meniscus shape such that a convex surface thereof is directed toward the image side. By making such arrangement, it is possible to position a principal point more toward the object. Moreover, it is possible to position the entrance pupil more toward the object while securing a space necessary for the movement of the lens between the first lens unit and the third lens unit. Moreover, at the wide angle end, it is possible to suppress an occurrence of the astigmatism and the chromatic aberration of magnification.

Conditional expression (7) is related to a shaping factor of the negative lens.

By making so as not to fall below a lower limit value of conditional expression (7), it is possible to make the radius of curvature of the object-side lens surface and the radius of curvature of the image-side lens surface differ. Accordingly, it is possible to correct the spherical aberration occurring at the image-side lens surface favorably by the object-side lens surface.

By making so as not to exceed an upper limit value of conditional expression (7), it is possible to suppress a fluctuation in aberration due to focusing, and particularly, a fluctuation in the spherical aberration at the telephoto end.

It is more preferable that the following conditional expression (7') is satisfied instead of conditional expression (7).

$$-5.00 < (r_{ff} + r_{fb})/(r_{ff} - r_{fb}) < -1.10 \quad (7')$$

Furthermore, it is even more preferable that the following conditional expression (7") is satisfied instead of conditional expression (7).

$$-4.50 < (r_{ff} + r_{fb})/(r_{ff} - r_{fb}) < -1.20 \quad (7'')$$

In the zoom lens of the present embodiment, it is preferable that the following conditional expression (8) is satisfied:

$$-5.50 < f_2/f_w < -1.00 \quad (8)$$

where, $f_2$ denotes a focal length of the second lens unit, and $f_w$ denotes the focal length of the overall zoom lens system at a wide angle end.

Conditional expression (8) is a conditional expression related to a ratio of the focal length of the second lens unit to the focal length of the overall zoom lens system at the wide angle end.

By making so as not to fall below a lower limit value of conditional expression (8), it is possible to make the focal length of the second lens unit adequately long (to make the refractive power small). Accordingly, it is possible to suppress various aberrations, particularly, the astigmatism and the chromatic aberration of magnification at the wide angle end that occur in the second lens unit.

By making so as not to exceed an upper limit value of conditional expression (8), it is possible to make the focal length of the second lens unit adequately short (to make the refractive power large). Accordingly, since it is possible to position the entrance pupil further on the object side, it is possible to make a diameter of the first lens unit small. Moreover, it is possible to suppress an occurrence of various aberrations, particularly, off-axis aberrations such as the astigmatism and the chromatic aberration of magnification that occur in the first lens unit.

It is more preferable that the following conditional expression (8') is satisfied instead of conditional expression (8).

$$-5.00 < f_2/f_w < -1.50 \qquad (8')$$

Furthermore, it is even more preferable that the following conditional expression (8") is satisfied instead of conditional expression (8').

$$-4.50 < f_2/f_w < -1.80 \qquad (8")$$

Moreover, in the zoom lens of the present embodiment, it is preferable that the following conditional expression (9) is satisfied:

$$-6.00 < f_1/f_w < -1.00 \qquad (9)$$

where, $f_1$ denotes a focal length of the first lens unit, and $f_w$ denotes the focal length of the overall zoom lens system at the wide angle end.

Conditional expression (9) is a conditional expression related to a ratio of the focal length of the first lens unit and the focal length of the overall zoom lens system at the wide angle end.

By making so as not to fall below a lower limit value of conditional expression (9), it is possible to make the focal length of the first lens unit adequately long (to make the refractive power small). Accordingly, it is possible to suppress an occurrence of the astigmatism and the chromatic aberration of magnification at the wide angle end, and moreover, it is possible to suppress an occurrence of the chromatic aberration of magnification at the telephoto end.

By making so as not to exceed an upper limit value of conditional expression (9), it is possible to make the focal length of the first lens unit adequately short (to make the refractive power large). In this case, since it is possible to position the entrance pupil more toward the object side, it is possible to make a diameter of a lens in the first lens unit small. As a result, it is possible to make the optical system small-sized.

Moreover, by making the focal length of the first lens unit adequately short, it is possible to position an image point of the first lens unit (an image of an object formed by the first lens unit) more toward the image side. In this case, an object point of a lens unit having a positive refractive power is also positioned more toward the image side. Therefore, since it is possible to make a magnification of a lens unit having a positive refractive power large at the wide angle end, it is possible to shorten the overall length of the zoom lens.

It is more preferable that the following conditional expression (9') is satisfied instead of conditional expression (9).

$$-5.00 < f_1/f_w < -2.00 \qquad (9')$$

Furthermore, it is even more preferable that the following conditional expression (9") is satisfied instead of conditional expression (9).

$$-4.50 < f_1/f_w < -2.30 \qquad (9")$$

In the zoom lens of the present embodiment, it is preferable that a lens nearest to an image in the rearmost lens unit satisfies the following conditional expressions (10) and (11):

$$-3.00 < (r_{1f} + r_{1b})/(r_{1f} - r_{1b}) < -0.30 \qquad (10)$$

$$|r_{1f}| < |r_{1b}| \qquad (11)$$

where, $r_{1f}$ denotes a radius of curvature of an object-side lens surface of a lens positioned nearest to the image in the rearmost lens unit, and $r_{1b}$, denotes a radius of curvature of an image-side lens surface of a lens positioned nearest to the image in the rearmost lens unit.

Conditional expression (10) is a conditional expression related to a shaping factor of a lens (hereinafter, appropriately referred to as a rearmost lens) positioned nearest to the image in the rearmost lens unit. Moreover, conditional expression (11) indicates that the radius of curvature of the object-side surface of the rearmost lens is smaller than the radius of curvature of the image-side surface of the rearmost lens.

By making so as not to fall below a lower limit value of conditional expression (10), it is possible to suppress an occurrence of the spherical aberration at the telephoto end.

By making so as not to exceed an upper limit value of conditional expression (10), it is possible to suppress an occurrence of the astigmatism, particularly an occurrence of the astigmatism at the image-side surface of the rearmost lens, at the wide angle end.

As the rearmost lens satisfies conditional expression (11), or in other words, by letting the radius of curvature of the object-side surface of the rearmost lens to be smaller than the radius of curvature of the image-side surface of the rearmost lens, it is possible to suppress an occurrence of the astigmatism.

It is more preferable that the following conditional expression (10') is satisfied instead of conditional expression (10).

$$-2.50 < (r_{1f} + r_{1b})/(r_{1f} - r_{1b}) < -0.40 \qquad (10')$$

Furthermore, it is more preferable that the following conditional expression (10") is satisfied instead of conditional expression (10).

$$-2.30 < (r_{1f} + r_{1b})/(r_{1f} - r_{1b}) < -0.50 \qquad (10")$$

In the zoom lens of the present embodiment, it is preferable that at the time of zooming from the wide angle end to the telephoto end, the rearmost lens unit moves toward the object side.

When such arrangement is made, at the telephoto end, it is possible to make a distance between the rearmost lens unit and a lens unit on the object side of the rearmost lens unit smaller. Accordingly, it is possible to make the optical system small-sized.

Moreover, the height of an axial light ray at the rearmost lens unit becomes higher at the telephoto end than a height at the wide angle end. Therefore, it is possible to correct the spherical aberration and the longitudinal chromatic aberration favorably at the telephoto end without letting the spherical aberration and the longitudinal chromatic aberration to be deteriorated at the wide angle end.

Moreover, by moving the rearmost lens unit, it is possible to impart a zooming effect even to the rearmost lens unit. Since the lens unit having the zooming effect is on the object side of the rearmost lens unit, by imparting the zooming effect to the rearmost lens unit, it is possible to reduce a load of zooming on the lens unit positioned on the object side of the rearmost lens unit. In other words, it is possible to reduce an amount of movement at the time of zooming of the lens unit positioned on the object side. As a result, it is possible to shorten the overall length of the zoom lens.

In the zoom lens of the present embodiment, it is preferable that the following conditional expression (12) is satisfied:

$$0.30 < D_{1L}/D_{1a} < 4.00 \quad (12)$$

where, $D_{1L}$ denotes a sum total of a lens thickness on an optical axis of the first lens unit, and $D_{1a}$ denotes a sum total of an air space on the optical axis in the first lens unit.

Conditional expression (12) is a conditional expression related to a ratio of the sum of the lens thickness on the optical axis of a lens in the first lens unit and the sum of the air space in the first lens unit.

By making so as not to fall below a lower limit value of conditional expression (12), it is possible to correct an aberration such as the chromatic aberration of magnification and the astigmatism while suppressing an increase in the air space of the lens in the first lens unit and slimming the thickness of the first lens unit. Moreover, since it is possible to suppress the increase in the air space, it is possible to make the first lens unit small-sized.

By making so as not to exceed an upper limit value of conditional expression (12), it is possible to make the air space of the lens in the first lens unit of an appropriate width. Therefore, it is possible to suppress various aberrations, particularly, the astigmatism and the chromatic aberration of magnification that occur in the first lens unit. Moreover, since it is possible to suppress the increase in the thickness of the lens, it is possible to make the first lens unit small-sized.

It is more preferable that the following conditional expression (12') is satisfied instead of conditional expression (12).

$$0.40 < D_{1L}/D_{1a} < 3.00 \quad (12')$$

Furthermore, it is even more preferable that the following conditional expression (12") is satisfied instead of conditional expression (12).

$$0.50 < D_{1L}/D_{1a} < 2.50 \quad (12'')$$

Moreover, in the zoom lens of the present embodiment, it is preferable that the first lens unit includes at least one negative lens and one positive lens.

By making such arrangement, it is possible to correct the astigmatism and the chromatic aberration of magnification that occur at the wide angle end, and the longitudinal chromatic aberration that occurs at the telephoto end favorably.

It is preferable that an image-side surface of the negative lens in the first lens unit is concave toward the image side. Furthermore, it is preferable that an object-side surface of the positive lens in the first lens unit is convex toward the object side. It is preferable that the negative lens in the first lens unit is disposed nearest to the object. Moreover, it is preferable that the positive lens in the first lens unit is disposed nearest to the image.

In the zoom lens of the present embodiment, it is preferable that the zoom lens includes an aperture stop, and the plurality of lens units includes four lens units, and the lens unit having a positive refractive power is a third lens unit, and the rearmost lens unit is a fourth lens unit, and the aperture stop is disposed in the third lens unit, and the zoom lens includes at least one aspheric lens.

By making an arrangement such that the zoom lens includes four lens units, an arrangement of refractive power in order from the object side is, a negative refractive power, a negative refractive power, a positive refractive power, and a negative refractive power. An effectiveness of such arrangement of refractive power, particularly an effectiveness with respect to aberration correction in a case in which, the overall length of the zoom lens is shortened (in a case in which, the refractive power of each lens unit is made large) is as mentioned above. In such manner, according to the zoom lens of the present embodiment, it is possible to shorten the overall length of the zoom lens even while correcting the chromatic aberration of magnification, the distortion, the spherical aberration, and the longitudinal chromatic aberration.

It is preferable that the third lens unit includes a positive lens and a cemented lens. Moreover, it is preferable that the positive lens is disposed on the object side of the cemented lens. Furthermore, in the positive lens, it is preferable that an object-side surface is convex toward the object side, and an image side surface is convex toward the image side. In the third lens unit, it is preferable that a biconvex lens is disposed nearest to the object.

It is preferable that the cemented lens includes a positive lens and a negative lens. Here, in the positive lens, it is preferable that an object-side surface is convex toward the object side, or that an image-side surface is convex toward the image side. Moreover, in the negative lens, it is preferable that an object-side surface is concave toward the object side, or that an image-side surface is concave toward the image side. Furthermore, it is preferable that a cemented surface of the cemented lens is convex toward the object side, or is convex toward the image side.

Moreover, a positive lens may be included on the image side of the cemented lens. In the positive lens, it is preferable that an object-side surface is convex toward the object side, or an image-side surface is convex toward the image side. Furthermore, a negative lens may be included, and the negative lens may be cemented to a positive lens. In this case, it is preferable that a cemented surface of the cemented lens is convex toward the object side, or is convex toward the image side. Moreover, in the third lens, it is preferable that a surface nearest to the image is convex toward the image side.

Moreover, it is preferable that the fourth lens unit includes a positive lens and a negative lens. Here, in the negative lens, it is preferable that an object-side surface is concave toward the object side. Moreover, in the positive lens, it is preferable that an image-side surface is convex toward the image side.

Moreover, it is preferable that the negative lens in the first lens unit has an aspheric surface. Moreover, it is preferable that the positive lens in the third lens unit has an aspheric surface. Furthermore, it is preferable that the negative lens in the fourth lens unit has an aspheric surface.

Moreover, an image pickup apparatus of the present embodiment includes any one of the zoom lenses described above, and an image pickup element which has an image pickup surface.

By making such arrangement, it is possible to provide an image pickup apparatus which includes the zoom lens in which, various aberrations from a center up to a peripheral area are corrected, and the overall length of the optical system is short, even in a case in which an image pickup element of a large size is used.

Regarding each conditional expression, it is preferable to make that function more assured by restricting one of or both of the lower limit value and the upper limit value. Moreover, regarding each conditional expression, only an upper limit value or a lower limit value of a numerical range of a further restricted conditional expression may be restricted. Moreover, for restricting the numerical range of a conditional expression, the upper limit value or the lower limit value of each conditional expression may be let to be the upper limit value or the lower limit value of the other conditional expression.

Examples of zoom lenses according to certain aspects of the present invention will be described below in detail by referring to the accompanying diagrams. However, the present invention is not restricted to the examples described below. Moreover, as to whether the refractive power is a positive refractive power or a negative refractive power is based on a paraxial radius of curvature.

Figure 1B:
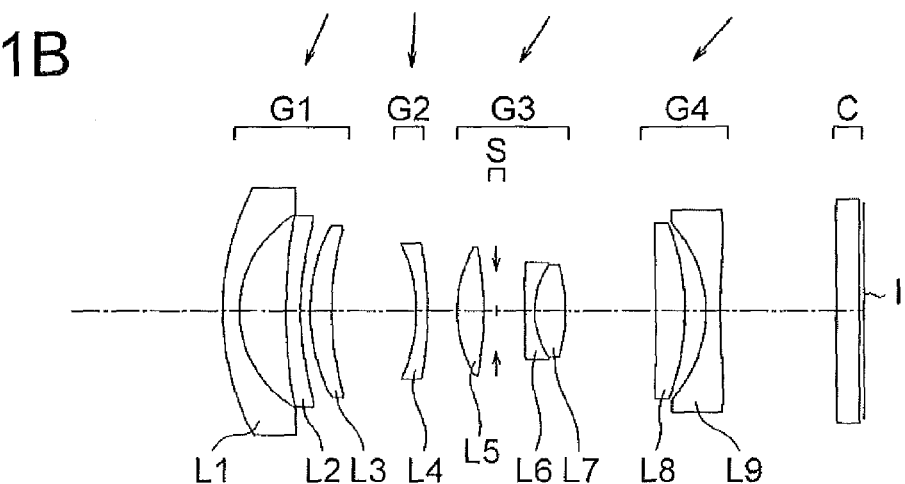
Figure 1C:
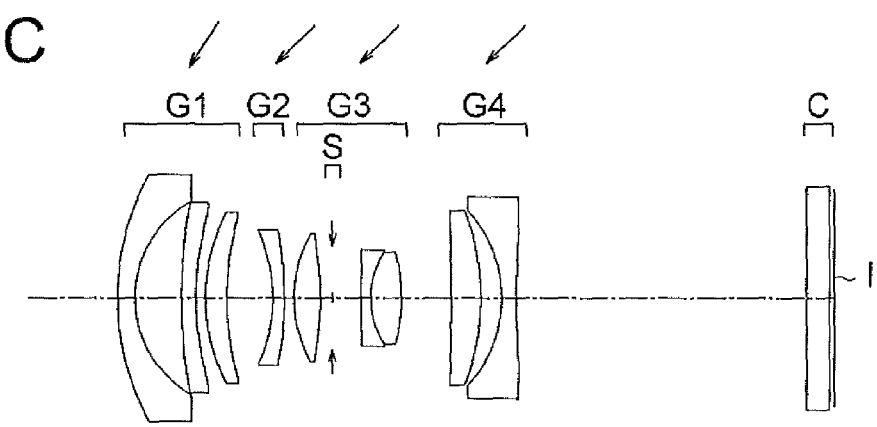
Figure 3A:
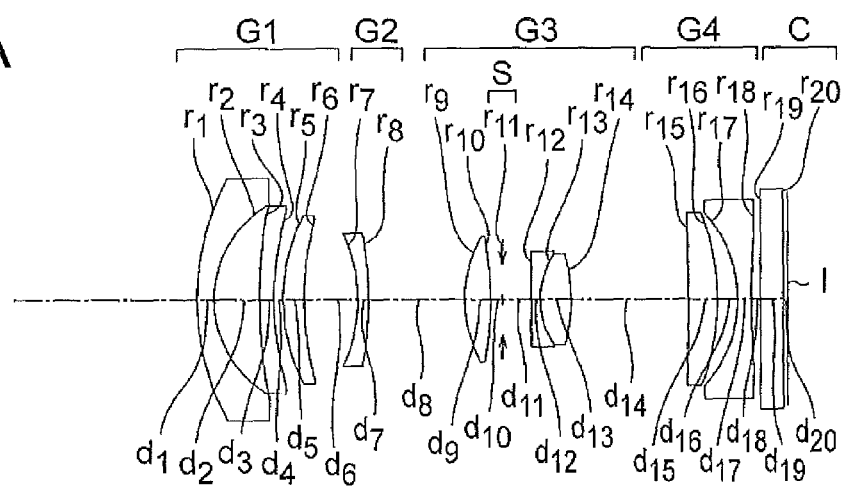
FIG. 3A, FIG. 3B, and FIG. 3C are cross-sectional views along an optical axis showing an optical arrangement of the zoom lens according to the example 1 at the time of focusing on an object point at a short distance, where.
Figure 3B:
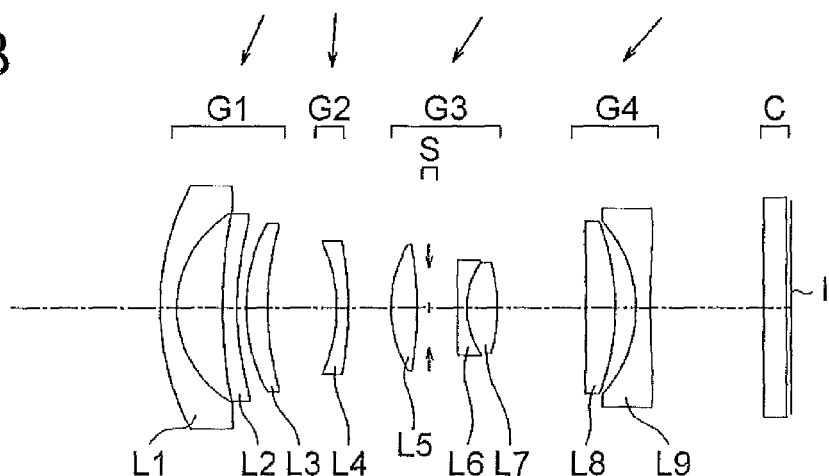
Figure 3C:
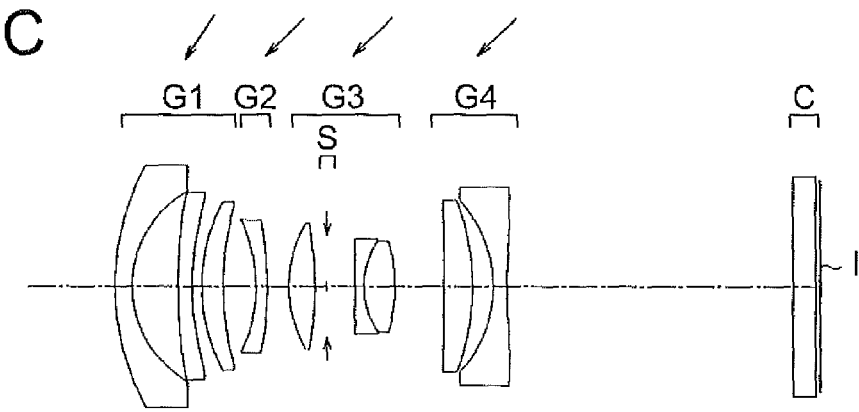

A zoom lens according to an example 1 of the present invention will be described below. FIG. 1A, FIG. 1B, and FIG. 1C and FIG. 3A, FIG. 3B, and FIG. 3C are cross-sectional views (lens cross-sectional views) along an optical axis showing an optical arrangement of the zoom lens according to the example 1. FIG. 1A, FIG. 1B, and FIG. 1C are cross-sectional views at the time of focusing on an infinite object point and FIG. 3A, FIG. 3B, and FIG. 3C are cross-sectional views at the time of focusing on an object point at a short distance. Moreover, FIG. 1A and FIG. 3A are cross-sectional views at a wide angle end, FIG. 1B and FIG. 3B are cross-sectional views at an intermediate focal length state, and FIG. 1C and FIG. 3C are cross-sectional views at a telephoto end. In all the examples that follow, in cross-sectional views, C denotes a cover glass, and I denotes an image pickup surface of an image pickup element.

Diagrams from FIG. 2A to FIG. 2L and from FIG. 4A to FIG. 4L are aberration diagrams of the zoom lens according to the example 1. FIG. 2A to FIG. 2L are aberration diagrams at the time of focusing on the infinite object point. FIG. 4A to FIG. 4L are aberration diagrams at the time of focusing on the object point at the short distance. Here, ω denotes a half angle of view. Reference numerals in the aberration diagrams are common for all the examples that will be described later.

Moreover, in these aberration diagrams, FIG. 2A to FIG. 2D, FIG. 4A to FIG. 4D, FIG. 6A to FIG. 6D, FIG. 8A to FIG. 8D, FIG. 10A to FIG. 10D, FIG. 12A to FIG. 12D, FIG. 14A to FIG. 14D, FIG. 16A to FIG. 16D, FIG. 18A to FIG. 18D, FIG. 20A to FIG. 20D, FIG. 22A to FIG. 22D, FIG. 24A to FIG. 24D, FIG. 26A to FIG. 26D, FIG. 28A to FIG. 28D, FIG. 30A to FIG. 30D, FIG. 32A to FIG. 32D, FIG. 34A to FIG. 34D, FIG. 36A to FIG. 36D, FIG. 38A to FIG. 38D, FIG. 40A to FIG. 40D, FIG. 42A to FIG. 42D, and FIG. 44A to FIG. 44D show a spherical aberration (SA) at the wide angle end, an astigmatism (AS) at the wide angle end, a distortion (DT) at the wide angle end, and a chromatic aberration of magnification (CC) at the wide angle end respectively.

Moreover, FIG. 2E to FIG. 2H, FIG. 4E to FIG. 4H, FIG. 6E to FIG. 6H, FIG. 8E to FIG. 8H, FIG. 10E to FIG. 10H, FIG. 12E to FIG. 12H, FIG. 14E to FIG. 14H, FIG. 16E to FIG. 16H, FIG. 18E to FIG. 18H, FIG. 20E to FIG. 20H, FIG. 22E to FIG. 22H, FIG. 24E to FIG. 24H, FIG. 26E to FIG. 26H, FIG. 28E to FIG. 28H, FIG. 30E to FIG. 30H, FIG. 32E to FIG. 32H, FIG. 34E to FIG. 34H, FIG. 36E to FIG. 36H, FIG. 38E to FIG. 38H, FIG. 40E to FIG. 40H, FIG. 42E to FIG. 42H, and FIG. 44E to FIG. 44H show a spherical aberration (SA) at the intermediate focal length state, an astigmatism (AS) at the intermediate focal length state, a distortion (DT) at the intermediate focal length state, and a chromatic aberration of magnification (CC) at the intermediate focal length state respectively.

Furthermore, FIG. 2I to FIG. 2L, FIG. 4I to FIG. 4L, FIG. 6I to FIG. 6L, FIG. 8I to FIG. 8L, FIG. 10I to FIG. 10L, FIG. 12I to FIG. 12L, FIG. 14I to FIG. 14L, FIG. 16I to FIG. 16L, FIG. 18I to FIG. 18L, FIG. 20I to FIG. 20L, FIG. 22I to FIG. 22L, FIG. 24I to FIG. 24L, FIG. 26I to FIG. 26L, FIG. 28I to FIG. 28L, FIG. 30I to FIG. 30L, FIG. 32I to FIG. 32L, FIG. 34I to FIG. 34L, FIG. 36I to FIG. 36L, FIG. 38I to FIG. 38L, FIG. 40I to FIG. 40L, FIG. 42I to FIG. 42L, and FIG. 44I to FIG. 44L show a spherical aberration (SA) at the telephoto end, an astigmatism (AS) at the telephoto end, a distortion (DT) at the telephoto end, and a chromatic aberration of magnification (CC) at the telephoto end respectively.

The zoom lens according to an example 1 of the present invention, as shown in FIG. 1A, FIG. 1B, and FIG. 1C, and FIG. 3A, FIG. 3B, and FIG. 3C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, a negative meniscus lens L2 having a convex surface directed toward the object side, and a positive meniscus lens L3 having a convex surface directed toward the object side.

The second lens unit G2 includes a negative meniscus lens L4 having a convex surface directed toward an image side.

The third lens unit G3 includes a biconvex positive lens L5, a negative meniscus lens L6 having a convex surface directed toward the object side, and a biconvex positive lens L7. Here, the negative meniscus lens L6 and the biconvex positive lens L7 are cemented.

The fourth lens unit G4 includes a positive meniscus lens L8 having a convex surface directed toward the image side, and a biconcave negative lens L9.

Moreover, an aperture stop S is disposed between the negative meniscus lens L4 and the positive meniscus lens L8. The negative meniscus lens L4 is positioned nearest to an image in the second lens unit G2, and the positive meniscus lens L8 is positioned nearest to an object in the fourth lens unit G4. More specifically, the aperture stop S is disposed between the biconvex positive lens L5 and the negative meniscus lens L6.

At the time of zooming from a wide angle end to a telephoto end, distances between the lens units change. A distance between the first lens unit G1 and the second lens unit G2 widens once and then narrows. A distance between the second lens unit G2 and the third lens unit G3 narrows. A distance between the third lens unit G3 and the fourth lens unit G4 narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on the object is carried out by moving the second lens unit G2. At the time of focusing from the infinite object point to the object point at the short distance, the negative meniscus lens L4 moves toward the object side.

An aspheric surface is provided to a total of six surfaces namely, both surfaces of the negative meniscus lens L2, both surfaces of the biconvex positive lens L5, and both surfaces of the biconcave negative lens L9.

Figure 5A:
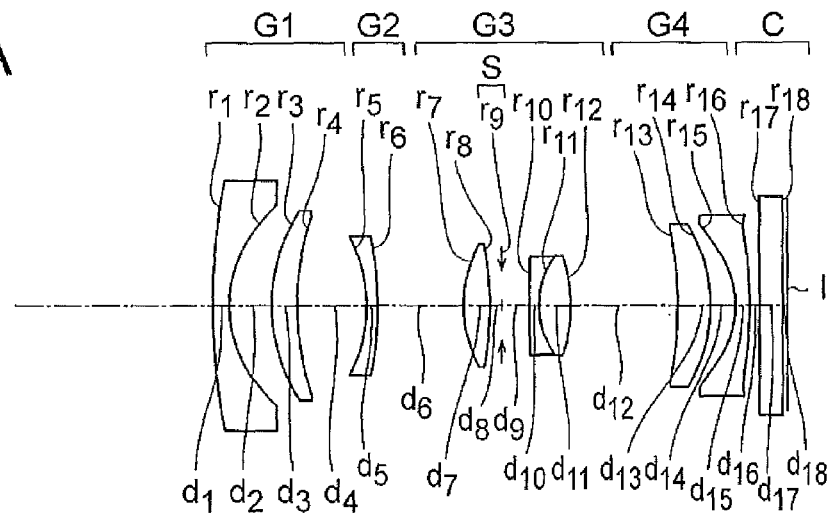
FIG. 5A, FIG. 5B, and FIG. 5C are cross-sectional views along an optical axis showing an optical arrangement of a zoom lens according to an example 2 at the time of focusing on an infinite object point, where.
Figure 5B:
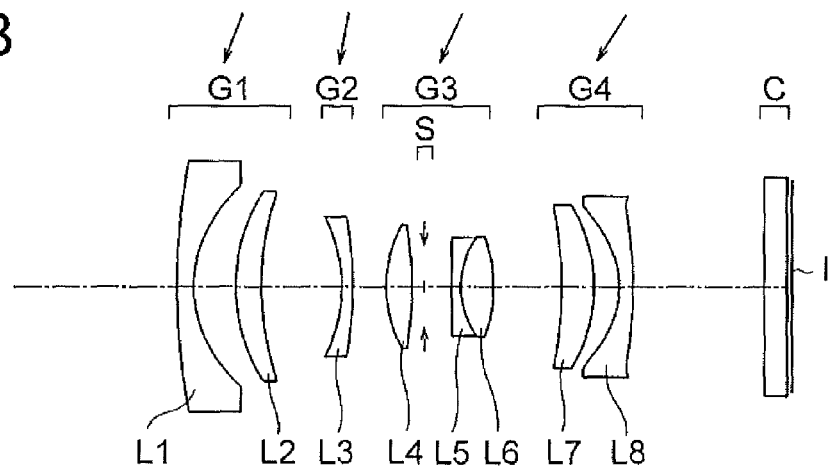
Figure 5C:
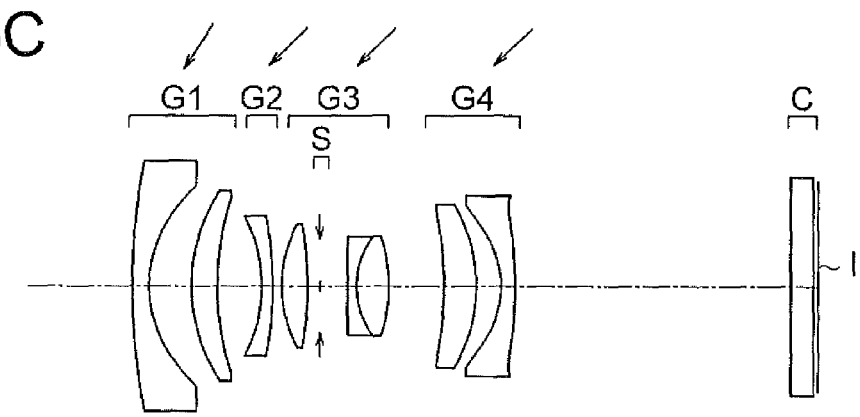
Figure 7A:
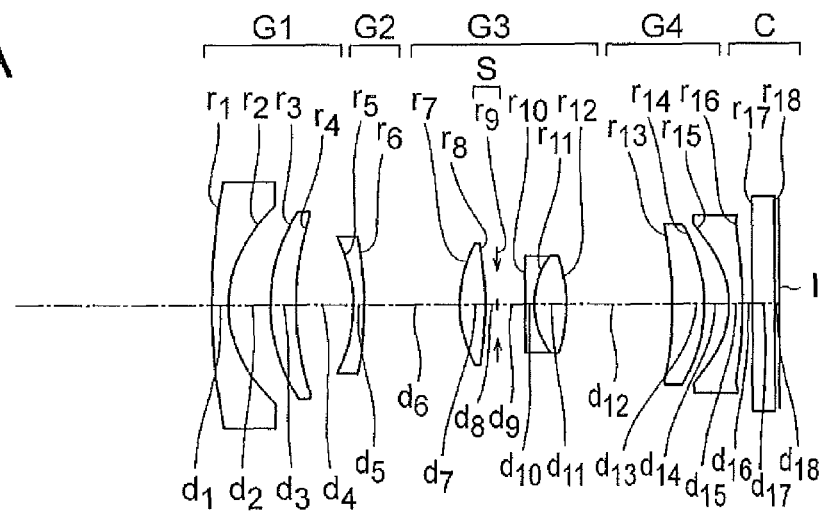
FIG. 7A, FIG. 7B, and FIG. 7C are cross-sectional views along an optical axis showing an optical arrangement of the zoom lens according to the example 2 at the time of focusing on an object point at a short distance, where.
Figure 7B:
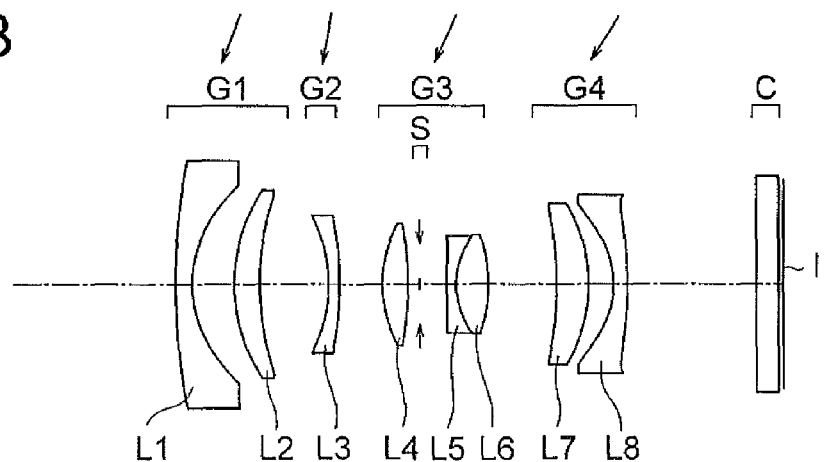
Figure 7C:
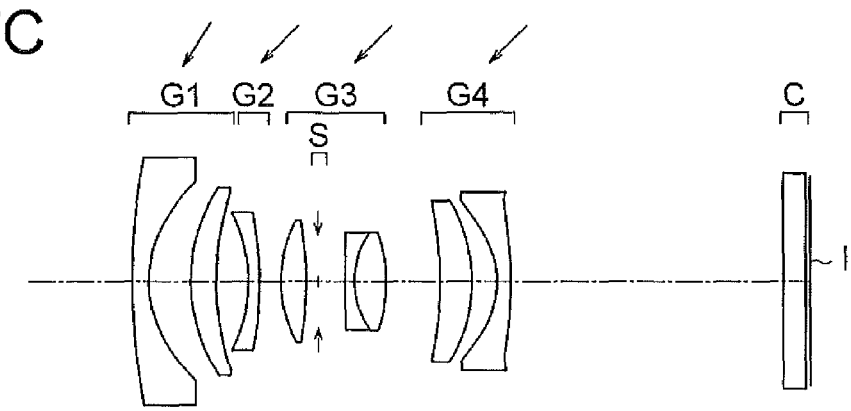

Next, a zoom lens according to an example 2 of the present invention will be described below. FIG. 5A, FIG. 5B, and FIG. 5C, and FIG. 7A, FIG. 7B, and FIG. 7C are cross-sectional views along an optical axis showing an optical arrangement of the zoom lens according to the example 2. FIG. 5A, FIG. 5B, and FIG. 5C are cross-sectional views at the time of focusing on an infinite object point, and FIG. 7A, FIG. 7B, and FIG. 7C are cross-sectional views at the time of focusing on an object point at a short distance. Moreover, FIG. 6A to FIG. 6L, and FIG. 8A to FIG. 8L are aberration diagrams of the zoom lens according to the example 2. FIG. 6A to FIG. 6L are aberration diagrams at the time of focusing on the infinite object point, and FIG. 8A to FIG. 8L are aberration diagrams at the time of focusing on the object point at the short distance.

The zoom lens of the example 2, as shown in FIG. 5A, FIG. 5B, and FIG. 5C, and FIG. 7A, FIG. 7B, and FIG. 7C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, and a positive meniscus lens L2 having a convex surface directed toward the object side.

The second lens unit G2 includes a negative meniscus lens L3 having a convex surface directed toward an image side.

The third lens unit G3 includes a biconvex positive lens L4, a negative meniscus lens L5 having a convex surface directed toward the object side, and a biconvex positive lens L6. Here, the negative meniscus lens L5 and the biconvex positive lens L6 are cemented.

The fourth lens unit G4 includes a positive meniscus lens L7 having a convex surface directed toward the image side, and a negative meniscus lens L8 having a convex surface directed toward the image side.

Moreover, an aperture stop S is disposed between the negative meniscus lens L3 and the positive meniscus lens L7. The negative meniscus lens L3 is positioned nearest to an image in the second lens unit G2, and the positive meniscus lens L7 is disposed nearest to an object in the fourth lens unit G4. More specifically, the aperture stop is disposed between the biconvex positive lens L4 and the negative meniscus lens L5.

At the time of zooming from a wide angle end to a telephoto end, distances between the lens units change. A distance between the first lens unit G1 and the second lens unit G2 widens once and then narrows. A distance between the second lens unit G2 and the third lens unit G3 narrows. A distance between the third lens unit G3 and the fourth lens unit G4 narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on the object is carried out by moving the second lens unit G2. At the time of focusing from the infinite object point to the object point at the short distance, the negative meniscus lens L3 moves toward the object side.

An aspheric surface is provided to a total of five surfaces namely, an image-side surface of the negative meniscus lens L1, both surfaces of the biconvex positive lens L4, and both surfaces of the negative meniscus lens L8.

Figure 9A:
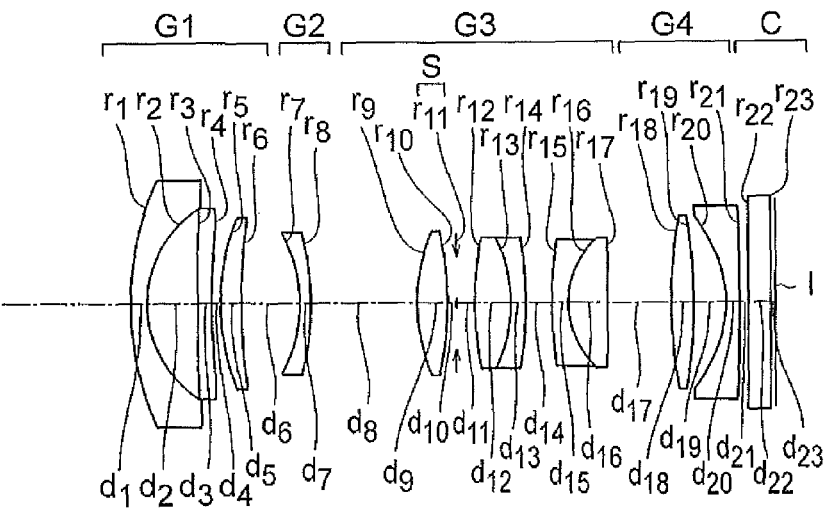
FIG. 9A, FIG. 9B, and FIG. 9C are cross-sectional views along an optical axis showing an optical arrangement of a zoom lens according to an example 3 at the time of focusing on an infinite object point, where.
Figure 9B:
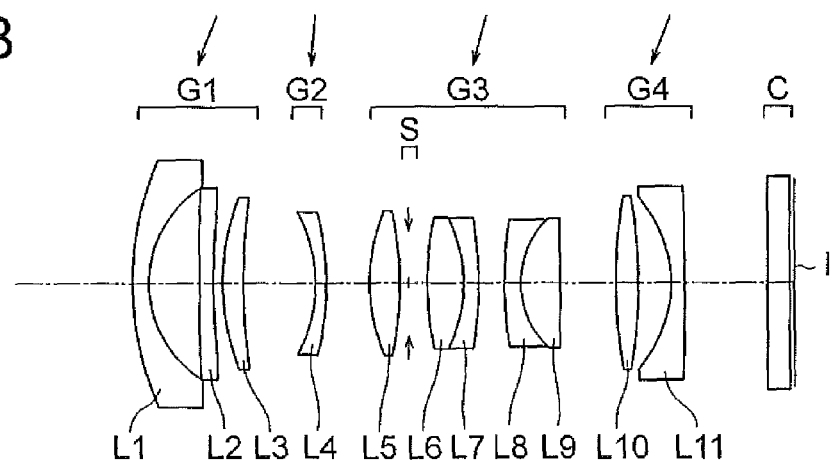
Figure 9C:
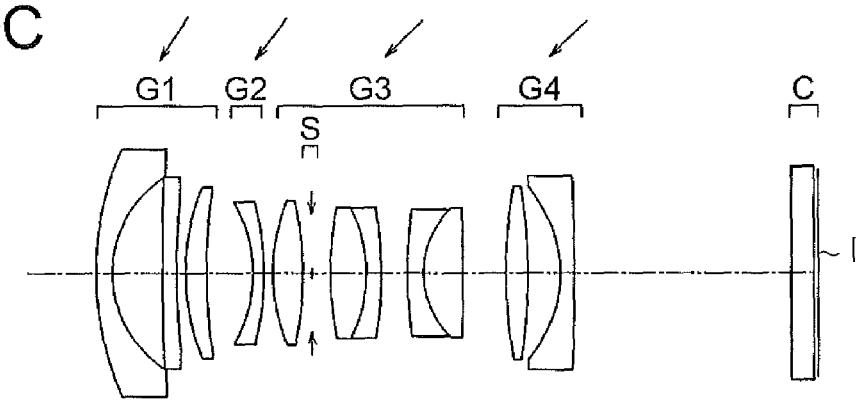
Figure 11A:
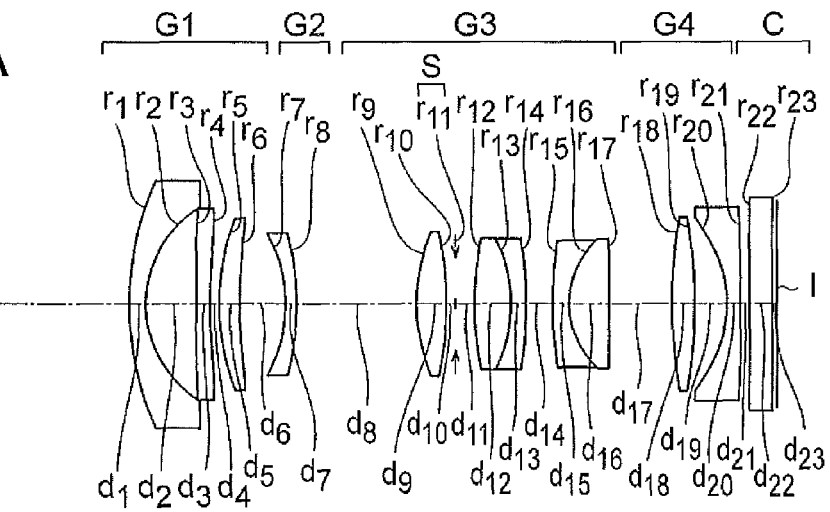
FIG. 11A, FIG. 11B, and FIG. 11C are cross-sectional views along an optical axis showing an optical arrangement of the zoom lens according to the example 3 at the time of focusing on an object point at a short distance, where.
Figure 11B:
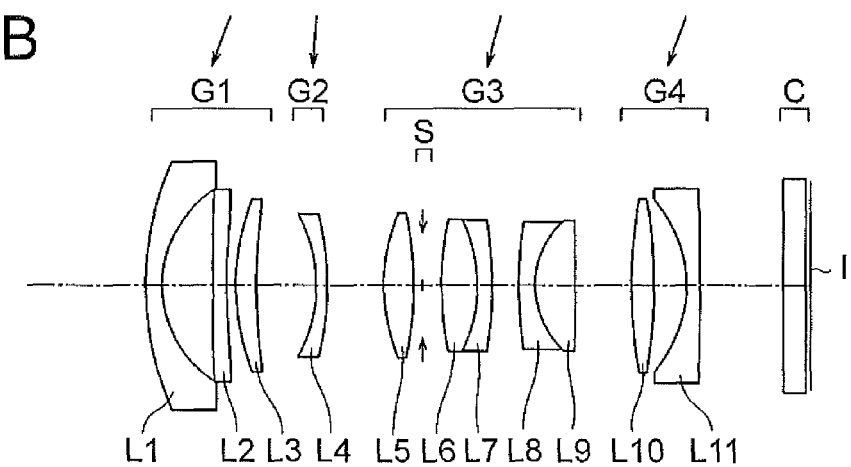
Figure 11C:
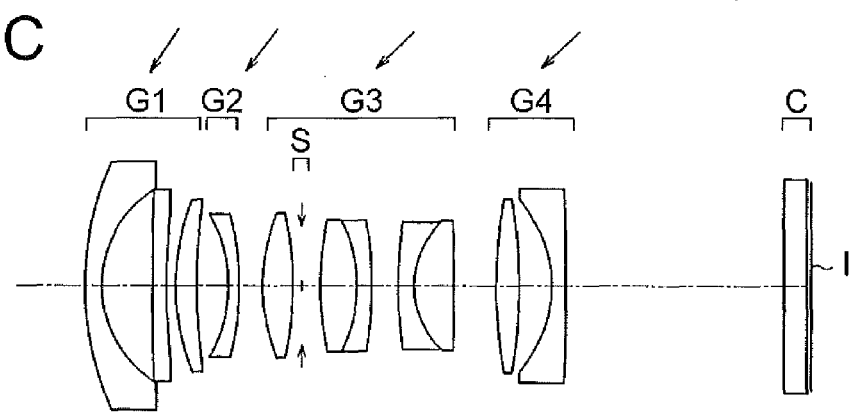

Next, a zoom lens according to an example 3 of the present invention will be described below. FIG. 9A, FIG. 9B, and FIG. 9C, and FIG. 11A, FIG. 11B, and FIG. 11C are cross-sectional views along an optical axis showing an optical arrangement of the zoom lens according to the example 3. FIG. 9A, FIG. 9B, and FIG. 9C are cross-sectional views at the time of focusing on an infinite object point, and FIG. 11A, FIG. 11B, and FIG. 11C are cross-sectional views at the time of focusing on an object point at a short distance. Moreover, FIG. 10A to FIG. 10L, and FIG. 12A to FIG. 12L are aberration diagrams of the zoom lens according to the example 3. FIG. 10A to FIG. 10L are aberration diagrams at the time of focusing on the infinite object point, and FIG. 12A to FIG. 12L are aberration diagrams at the time of focusing on the object point at the short distance.

The zoom lens of the example 3, as shown in FIG. 9A, FIG. 9B, and FIG. 9C, and FIG. 11A, FIG. 11B, and FIG. 11C, includes in order from an object side, a first lens unit G1 having a negative refractive power, a second lens unit G2 having a negative refractive power, a third lens unit G33 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a negative meniscus lens L4 having a convex surface directed toward an image side.

The third lens unit G3 includes a biconvex positive lens L5, a biconvex positive lens L6, a negative meniscus lens L7 having a convex surface directed toward the image side, a negative meniscus lens L8 having a convex surface directed toward the object side, and a biconvex positive lens L9. Here, the biconvex positive lens L6 and the negative meniscus lens L7 are cemented. Moreover, the negative meniscus lens L8 and the biconvex positive lens L9 are cemented.

The fourth lens unit G4 includes a biconvex positive lens L10, and a negative meniscus lens L11 having a convex surface directed toward the image side.

Moreover, an aperture stop S is disposed between the negative meniscus lens L4 and the biconvex positive lens L10. The negative meniscus lens L4 is positioned nearest to an image in the second lens unit G2, and the biconvex positive lens L10 is positioned nearest to an object in the fourth lens unit G4. More specifically, the aperture stop S is disposed between the biconvex positive lens L5 and the biconvex positive lens L6.

At the time of zooming from a wide angle end to a telephoto end, distances between the lens units change. A distance between the first lens unit G1 and the second lens unit G2 widens once and then narrows. A distance between the second lens unit G2 and the third lens unit G3 narrows. A distance between the third lens unit G3 and the fourth lens unit G4 narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L4 moves toward the object side.

An aspheric surface is provided to a total of six surfaces namely, both surfaces of the biconcave negative lens L2, both surfaces of the biconvex positive lens L5, and both surfaces of the negative meniscus lens L11.

Figure 13A:
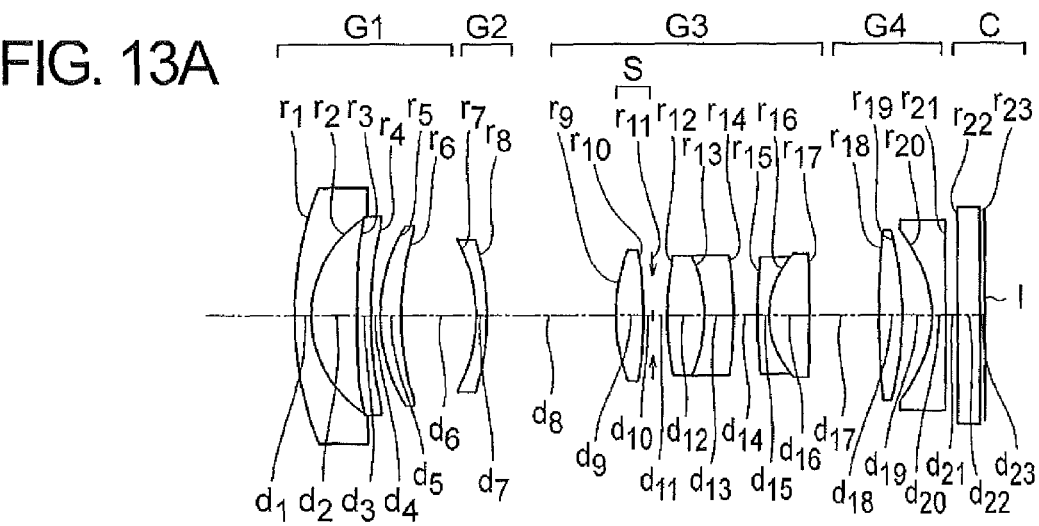
FIG. 13A, FIG. 13B, and FIG. 13C are cross-sectional views along an optical axis showing an optical arrangement of a zoom lens according to an example 4 at the time of focusing on an infinite object point, where.
Figure 13B:
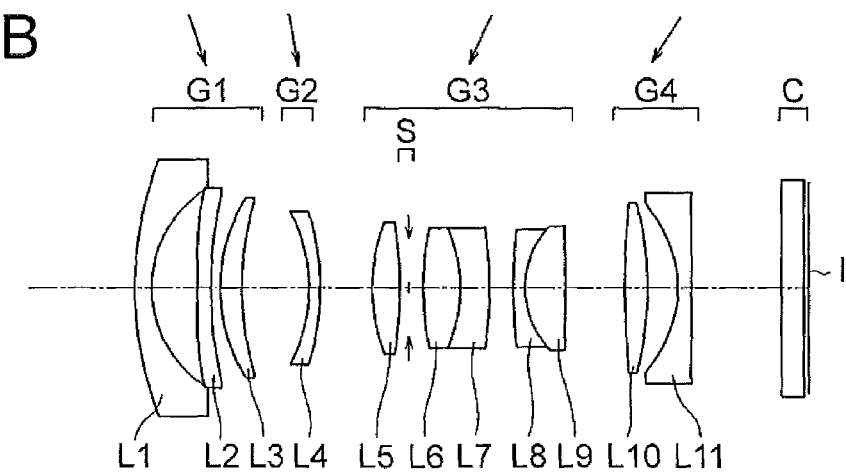
Figure 13C:
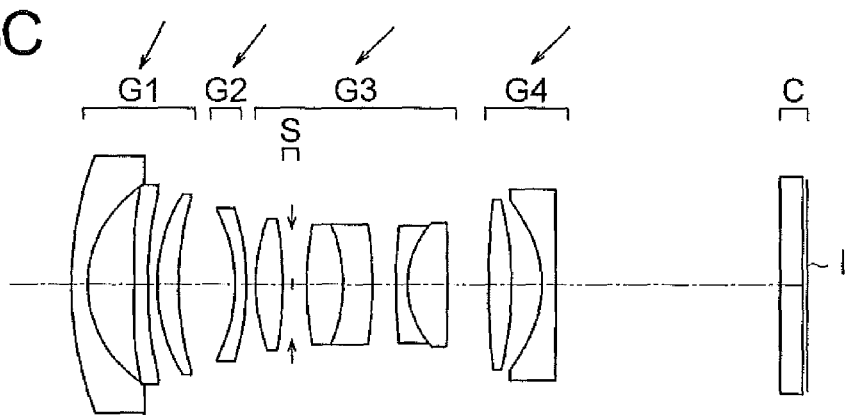
Figures 14A, 14B, 14C, 14D:
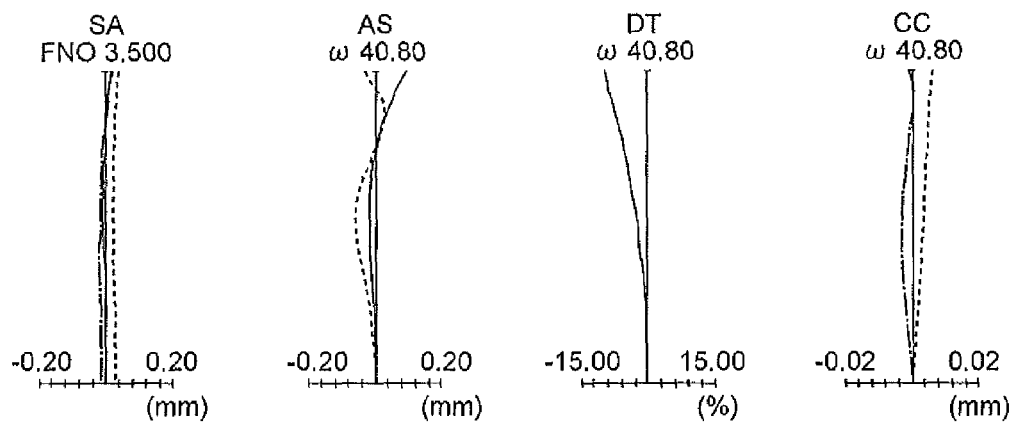
FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L') are diagrams showing a spherical aberration (SA), an astigmatism (AS), a distortion (DT), and a chromatic aberration of magnification (CC) of the zoom lens according to the example 4 at the time of focusing on an infinite object point, where.
Figures 14E, 14F, 14G, 14H:
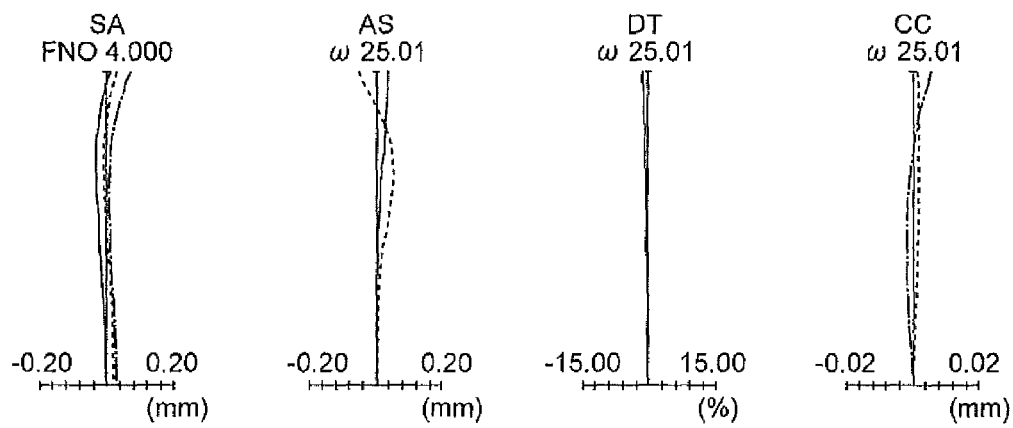
Figures 14I, 14J, 14K, 14L:
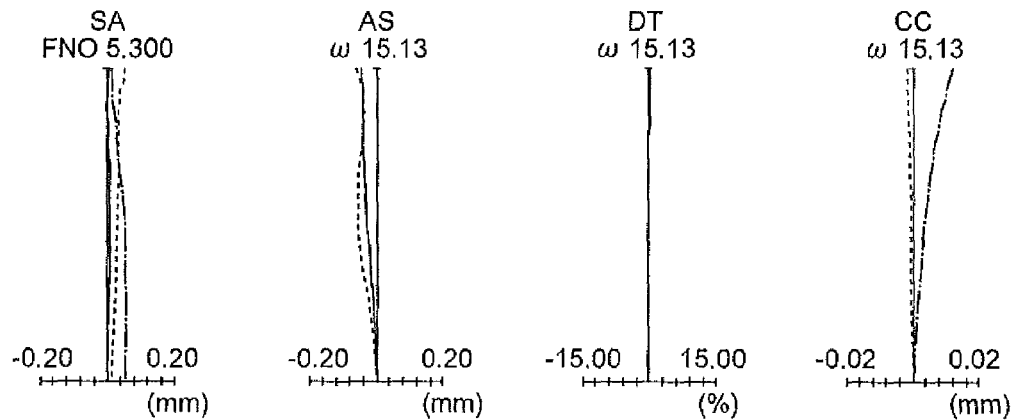
Figure 15A:
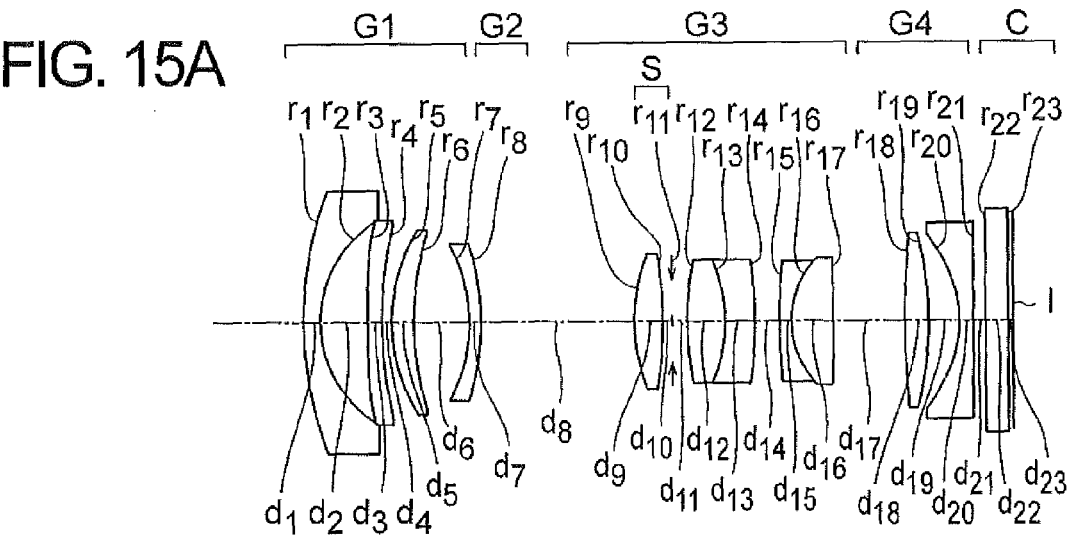
FIG. 15A, FIG. 15B, and FIG. 15C are cross-sectional views along an optical axis showing an optical arrangement of the zoom lens according to the example 4 at the time of focusing on an object point at a short distance, where.
Figure 15B:
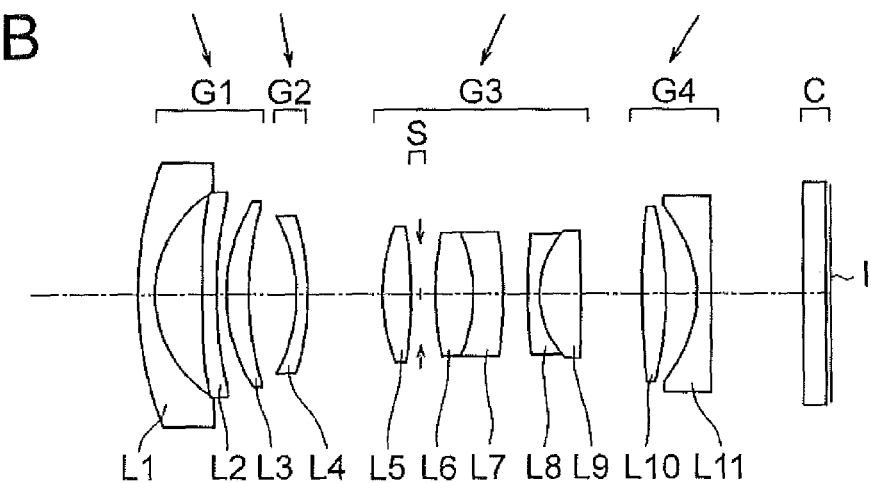
Figure 15C:
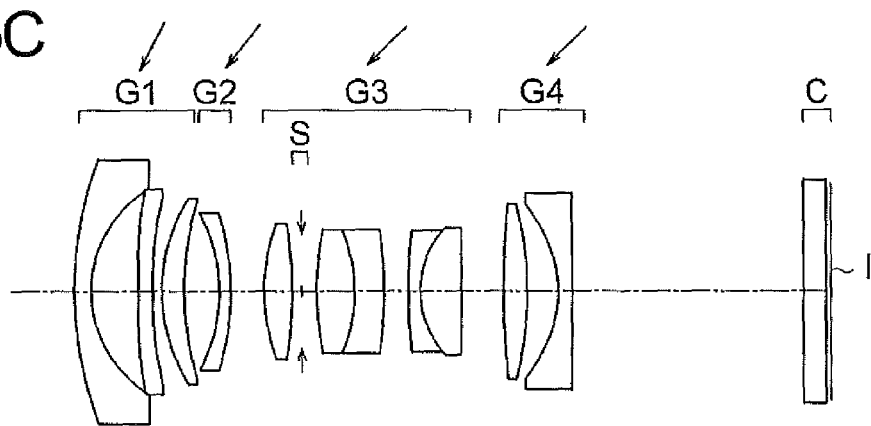

Next, a zoom lens according to an example 4 of the present invention will be described below. FIG. 13A, FIG. 13B, and FIG. 13C, and FIG. 15A, FIG. 15B, and FIG. 15C are cross-sectional views along an optical axis showing an optical arrangement of the zoom lens according to the example 4. FIG. 13A, FIG. 13B, and FIG. 13C are cross-sectional views at the time of focusing on an infinite object point, and FIG. 15A, FIG. 15B, and FIG. 15c are cross-sectional views at the time of focusing on an object point at a short distance. Moreover, FIG. 14A to FIG. 14L, and FIG. 16A to FIG. 16L are aberration diagrams of the zoom lens according to the example 4. FIG. 14A to FIG. 14L are aberration diagrams at the time of focusing on the infinite object point, and FIG. 16A to FIG. 16L are aberration diagrams at the time of focusing on the object point at the short distance.

The zoom lens of the example 4, as shown in FIG. 13A, FIG. 13B, and FIG. 13C, and FIG. 15A, FIG. 15B, and FIG. 15C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a negative meniscus lens L4 having a convex surface directed toward an image side.

The third lens unit G3 includes a biconvex positive lens L5, a biconvex positive lens L6, a negative meniscus lens L7 having a convex surface directed toward the image side, a negative meniscus lens L8 having a convex surface directed toward the object side, and a biconvex positive lens L9. Here, the biconvex positive lens L6 and the negative meniscus lens L7 are cemented. Moreover, the negative meniscus lens L8 and the biconvex positive lens L9 are cemented.

The fourth lens unit G4 includes a biconvex positive lens L10, and a negative meniscus lens L11 having a convex surface directed toward the image side.

Moreover, an aperture stop S is disposed between the negative meniscus lens L4 and the biconvex positive lens L10. The negative meniscus lens L4 is positioned nearest to an image in the second lens unit G2, and the biconvex positive lens L10 is positioned nearest to an object in the fourth lens unit G4. More specifically, the aperture stop S is disposed between the biconvex positive lens L5 and the biconvex positive lens L6.

At the time of zooming from a wide angle end to a telephoto end, distances between the lens units change. A distance between the first lens unit G1 and the second lens unit G2 narrows. A distance between the second lens unit G2 and the third lens unit G3 narrows. A distance between the third lens unit G3 and the fourth lens unit G4 narrows.

More elaborately, both the first lens unit G1 and the second lens unit G2, after moving toward the image side, move toward the object side. Both the third lens unit G3 and the fourth lens unit G4 move toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L4 moves toward the object side.

An aspheric surface is provided to a total of six surfaces namely, both surfaces of the biconcave negative lens L2, both surfaces of the biconvex positive lens L5, and both surfaces of the negative meniscus lens L11.

Figure 17A:
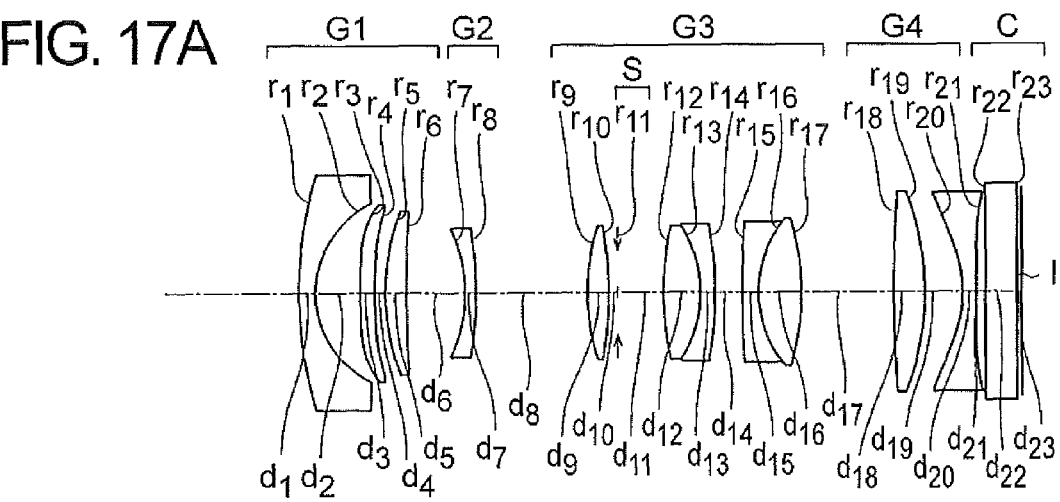
FIG. 17A, FIG. 17B, and FIG. 17C are cross-sectional views along an optical axis showing an optical arrangement of a zoom lens according to an example 5 at the time of focusing on an infinite object point, where.
Figure 17B:
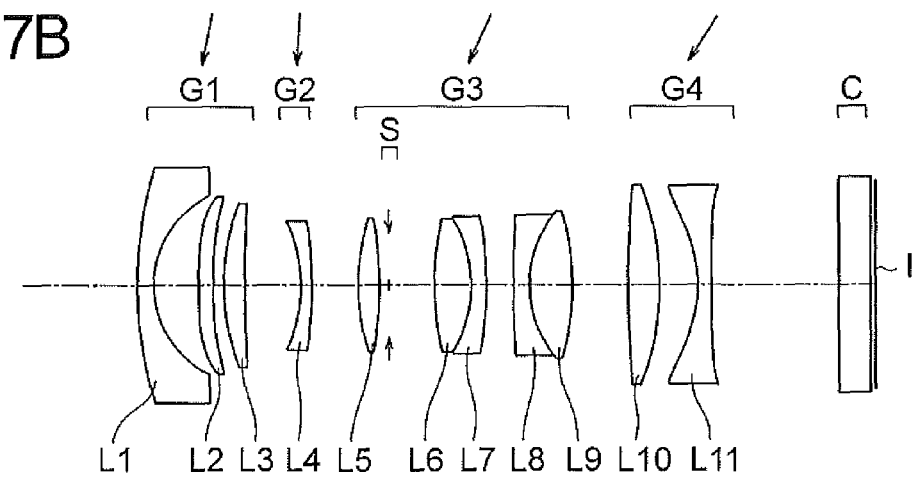
Figure 17C:
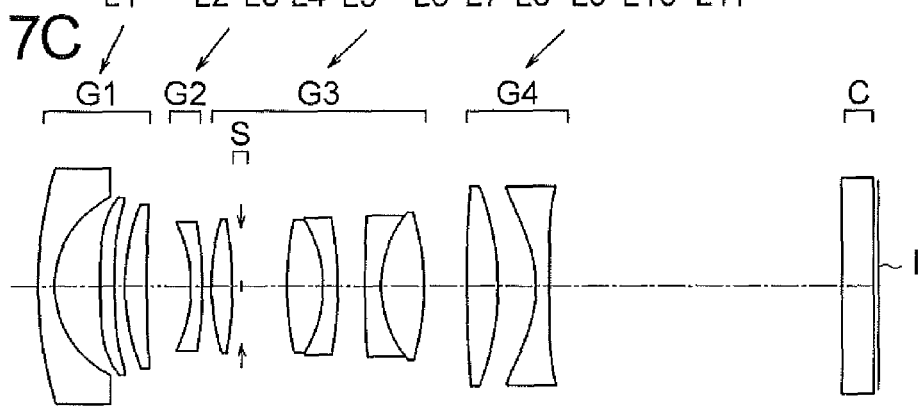
Figures 18A, 18B, 18C, 18D:
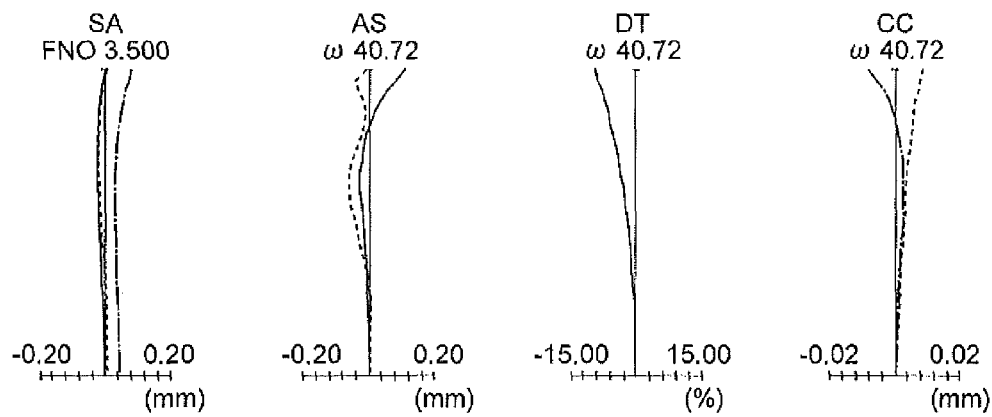
FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L (hereinafter, 'FIG. 18A to FIG. 18L') are diagrams showing a spherical aberration (SA), an astigmatism (AS), a distortion (DT), and a chromatic aberration of magnification (CC) of the zoom lens according to the example 5 at the time of focusing on an infinite object point, where.
Figures 18E, 18F, 18G, 18H:
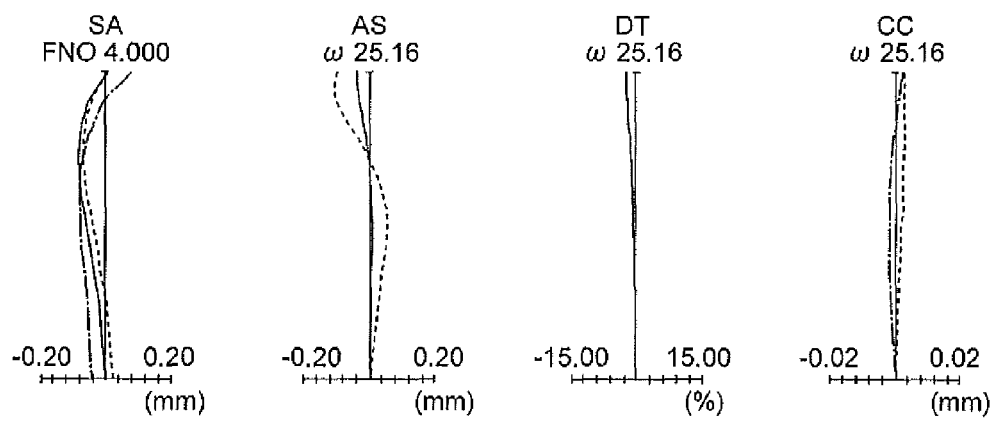
Figures 18I, 18J, 18K, 18L:
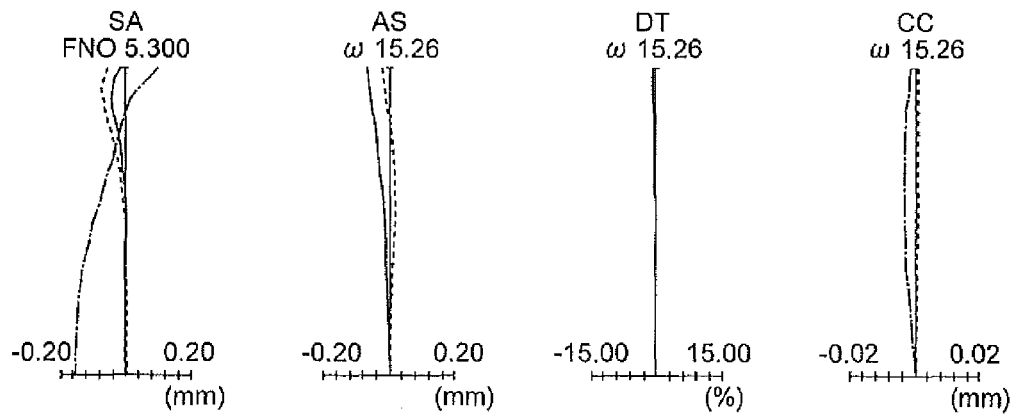

Next, a zoom lens according to an example 5 of the present invention will be described below. FIG. 17A, FIG. 17B, and FIG. 17C, and FIG. 19A, FIG. 19B, and FIG. 19C are cross-sectional views along an optical axis showing an optical arrangement of the zoom lens according to the example 5. FIG. 17A, FIG. 17B, and FIG. 17C are cross-sectional views at the time of focusing on an infinite object point, and FIG. 19A, FIG. 19B, and FIG. 19C are cross-sectional views at the time of focusing on an object point at a short distance. Moreover, FIG. 18A to FIG. 18L, and FIG. 20A to FIG. 20L are aberration diagrams of the zoom lens according to the example 5. FIG. 18A to FIG. 18L are aberration diagrams at the time of focusing on the infinite object point, and FIG. 20A to FIG. 20L are aberration diagrams at the time of focusing on the object point at the short distance.

The zoom lens of the example 5, as shown in FIG. 17A, FIG. 17B, and FIG. 17C, and FIG. 19A, FIG. 19B, and FIG. 19C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, a negative meniscus lens L2 having a convex surface directed toward the object side, and a positive meniscus lens L3 having a convex surface directed toward the object side.

The second lens unit G2 includes a negative meniscus lens L4 having a convex surface directed toward an image side.

The third lens unit G3 includes a biconvex positive lens L5, a biconvex positive lens L6, a negative meniscus lens L7 having a convex surface directed toward the image side, a negative meniscus lens L8 having a convex surface directed toward the object side, and a biconvex positive lens L9. Here, the biconvex positive lens L6 and the negative meniscus lens L7 are cemented. Moreover, the negative meniscus lens L8 and the biconvex positive lens L9 are cemented.

The fourth lens unit G4 includes a biconvex positive lens L10, and a negative meniscus lens L11 having a convex surface directed toward the image side.

Moreover, an aperture stop S is disposed between the negative meniscus lens L4 and the biconvex positive lens L10. The negative meniscus lens L4 is positioned nearest to an image in the second lens unit G2, and the biconvex positive lens L10 is positioned nearest to an object in the fourth lens unit G4. More specifically, the aperture stop S is disposed between the biconvex positive lens L5 and the biconvex positive lens L6.

At the time of zooming from a wide angle end to a telephoto end, distances between the lens units change. A distance between the first lens unit G1 and the second lens unit G2 narrows. A distance between the second lens unit G2 and the third lens unit G3 narrows. A distance between the third lens unit G3 and the fourth lens unit G4 narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L4 moves toward the object side.

An aspheric surface is provided to a total of six surfaces namely, both surfaces of the negative meniscus lens L2, both surfaces of the biconvex positive lens L5, and both surfaces of the negative meniscus lens L11.

Figure 21A:
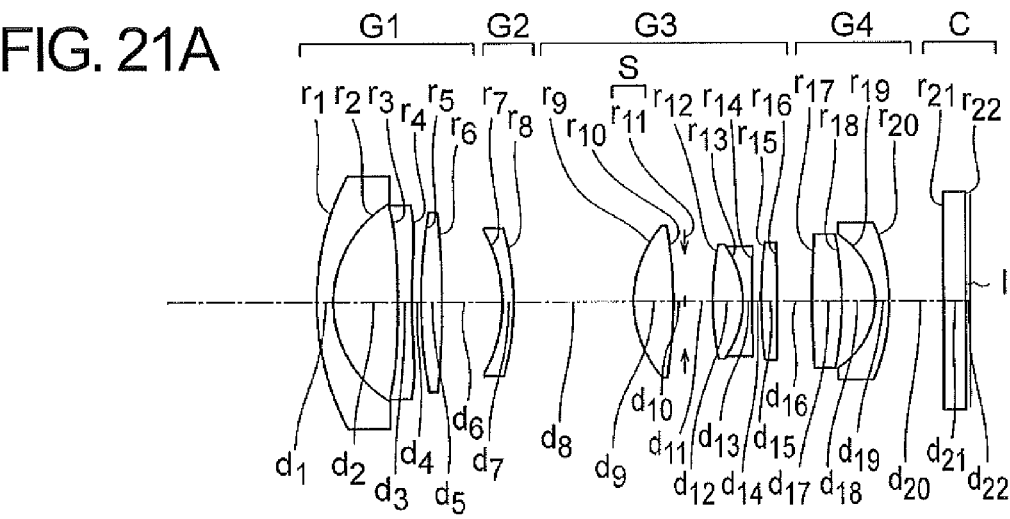
FIG. 21A, FIG. 21B, and FIG. 21C are cross-sectional views along an optical axis showing an optical arrangement of a zoom lens according to an example 6 at the time of focusing on an infinite object point, where.
Figure 21B:
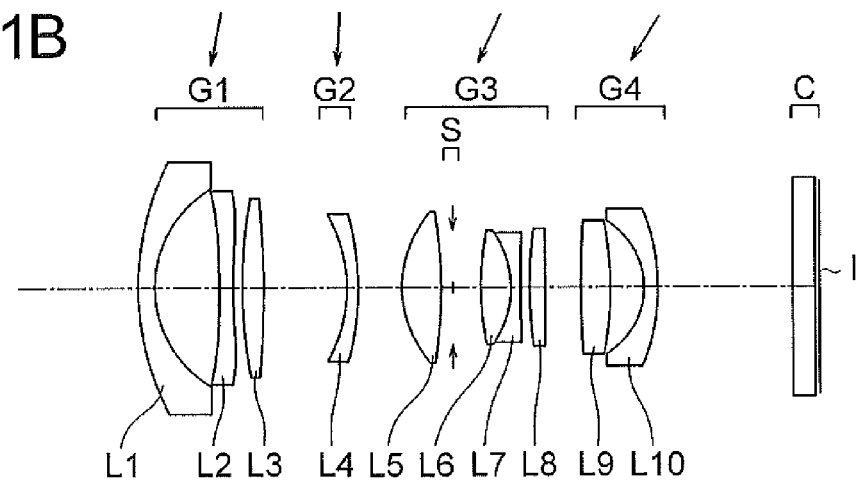
Figure 21C:
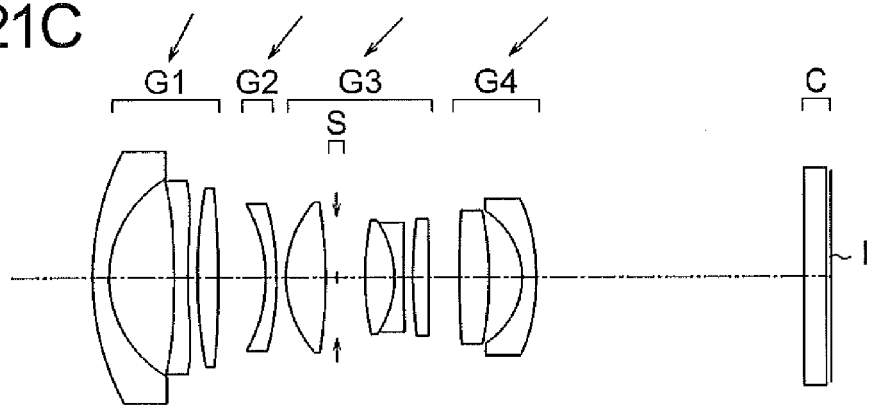
Figure 23A:
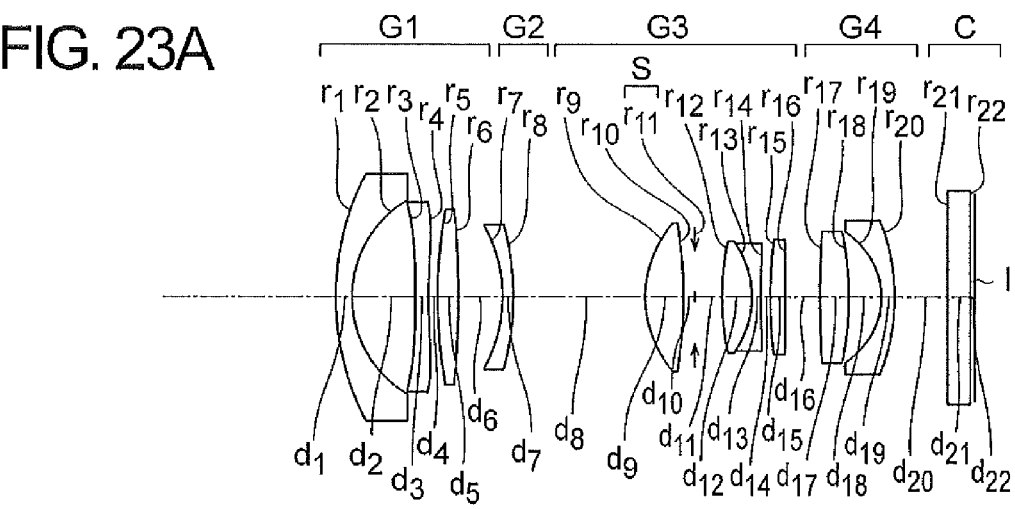
FIG. 23A, FIG. 23B, and FIG. 23C are cross-sectional views along an optical axis showing an optical arrangement of the zoom lens according to the example 6 at the time of focusing on an object point at a short distance, where.
Figure 23B:
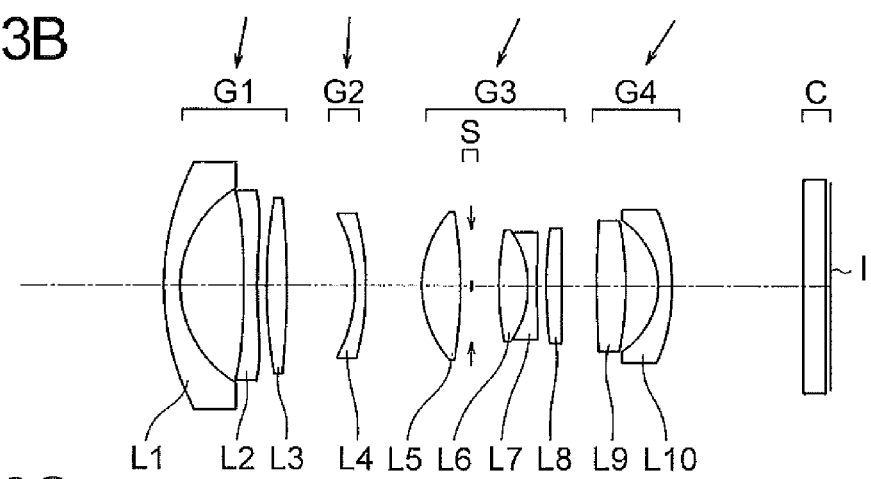
Figure 23C:
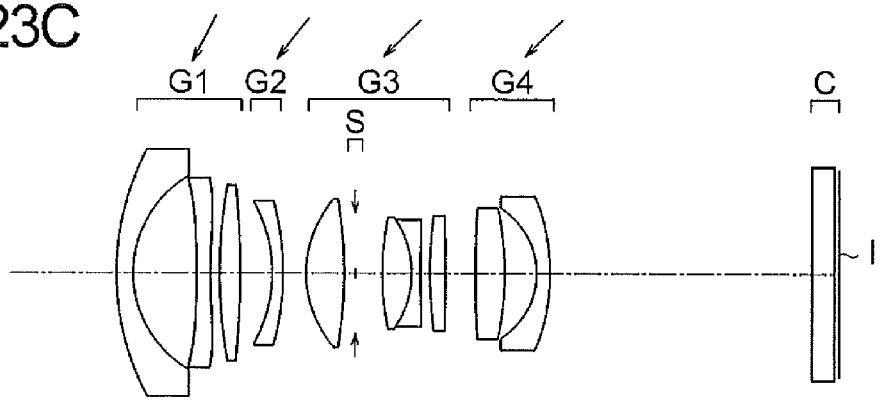

Next, a zoom lens according to an example 6 of the present invention will be described below. FIG. 21A, FIG. 21B, and FIG. 21C, and FIG. 23A, FIG. 23B, and FIG. 23C are cross-sectional views along an optical axis showing an optical arrangement of the zoom lens according to the example 6. FIG. 21A, FIG. 21B, and FIG. 21C are cross-sectional views at the time of focusing on an infinite object point, and FIG. 23A, FIG. 23B, and FIG. 23C are cross-sectional views at the time of focusing on an object point at a short distance. Moreover, FIG. 22A to FIG. 22L, and FIG. 24A to FIG. 24L are aberration diagrams of the zoom lens according to the example 6. FIG. 22A to FIG. 22L are aberration diagrams at the time of focusing on the infinite object point, and FIG. 24A to FIG. 24L are aberration diagrams at the time of focusing on the object point at the short distance.

The zoom lens of example 6, as shown in FIG. 21A, FIG. 21B, and FIG. 21C, and FIG. 23A, FIG. 23B, and FIG. 23C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, a biconcave negative lens L2, and a biconvex positive lens L3.

The second lens unit G2 includes a negative meniscus lens L4 having a convex surface directed toward an image side.

The third lens unit G3 includes a biconvex positive lens L5, a biconvex positive lens L6, a biconcave negative lens L7, and a biconvex positive lens L8. Here, the biconvex positive lens L6 and the biconcave negative lens L7 are cemented.

The fourth lens unit G4 includes a biconvex positive lens L9, and a negative meniscus lens L10 having a convex surface directed toward the image side.

Moreover, an aperture stop S is disposed between the negative meniscus lens L4 and the biconvex positive lens L9. The negative meniscus lens L4 is positioned nearest to an image in the second lens unit G2, and the biconvex positive lens L9 is positioned nearest to an object in the fourth lens unit G4. More specifically, the aperture stop S is disposed between the biconvex positive lens L5 and the biconvex positive lens L6.

At the time of zooming from a wide angle end to a telephoto end, distances between the lens units change. A distance between the first lens unit G1 and the second lens unit G2 widens once and then narrows. A distance between the second lens unit G2 and the third lens unit G3 narrows.

A distance between the third lens unit G3 and the fourth lens unit G4 widens once and then narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L4 moves toward the object side.

An aspheric surface is provided to a total of six surfaces namely, both surfaces of the biconcave negative lens L2, both surfaces of the biconvex positive lens L5, and both surfaces of the negative meniscus lens L10.

Figure 25A:
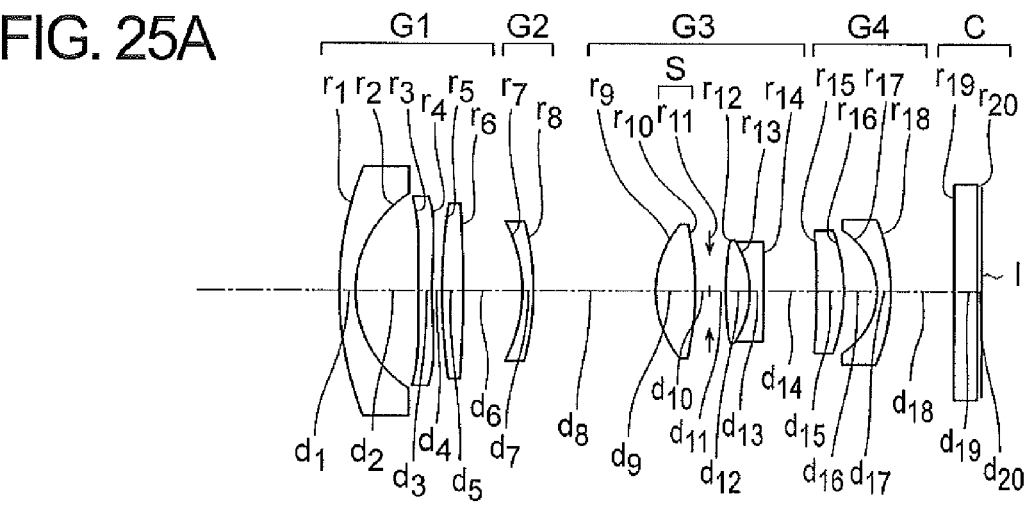
FIG. 25A, FIG. 25B, and FIG. 25C are cross-sectional views along an optical axis showing an optical arrangement of a zoom lens according to an example 7 at the time of focusing on an infinite object point, where.
Figure 25B:
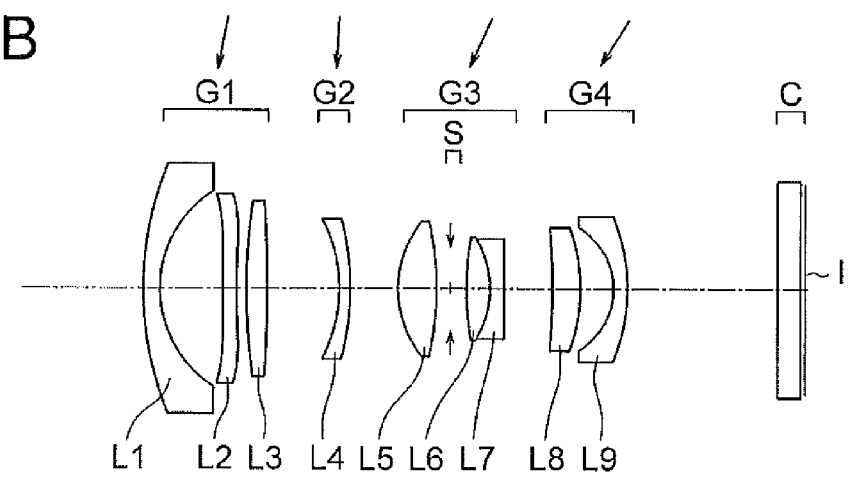
Figure 25C:
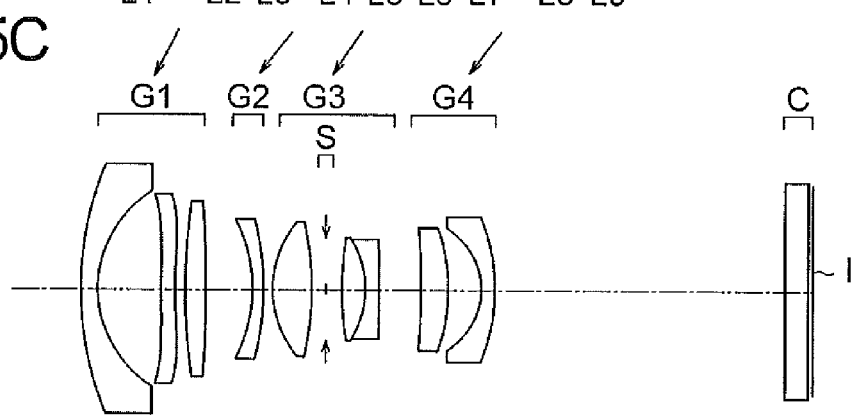
Figure 27A:
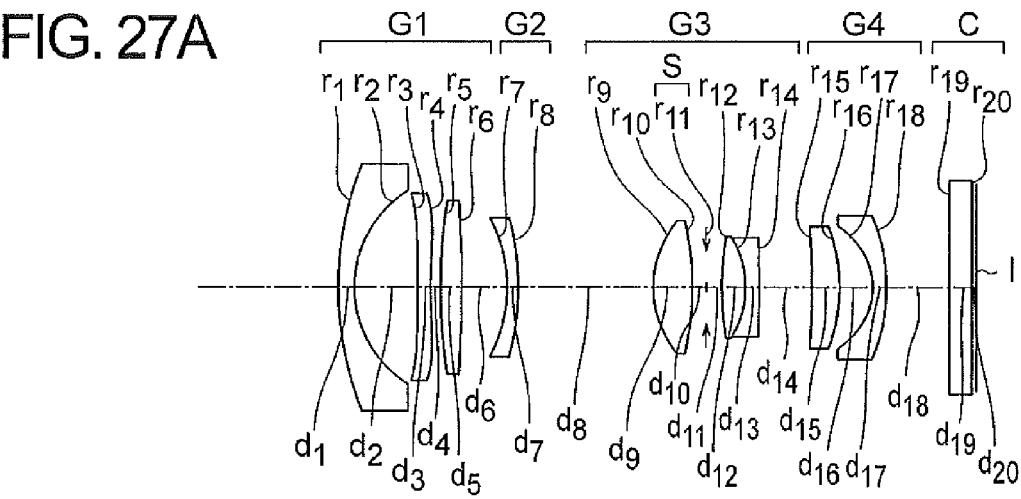
FIG. 27A, FIG. 27B, and FIG. 27C are cross-sectional views along an optical axis showing an optical arrangement of the zoom lens according to the example 7 at the time of focusing on an object point at a short distance, where.
Figure 27B:
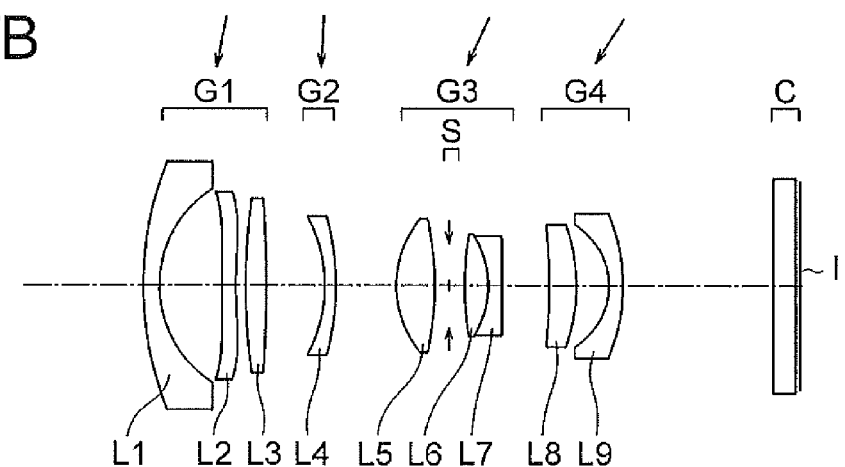
Figure 27C:
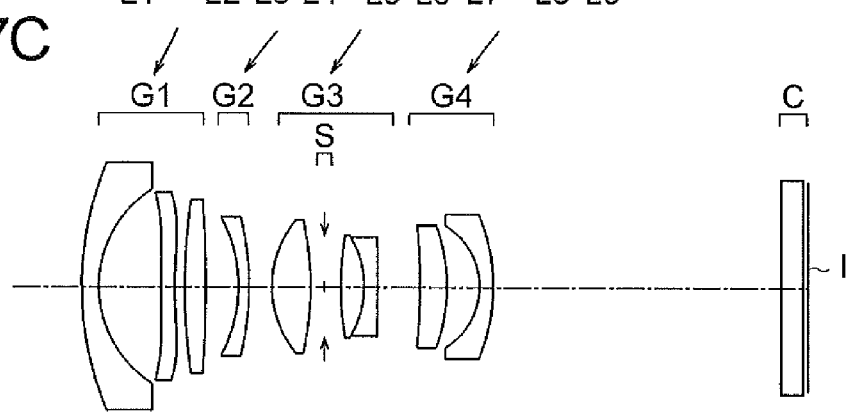

Next, a zoom lens according to an example 7 of the present invention will be described below. FIG. 25A, FIG. 25B, and FIG. 25C, and FIG. 27A, FIG. 27B, and FIG. 27C are cross-sectional views along an optical axis showing an optical arrangement of the zoom lens according to the example 7. FIG. 25A, FIG. 25B, and FIG. 25C are cross-sectional views at the time of focusing on an infinite object point, and FIG. 27A, FIG. 27B, and FIG. 27C are cross-sectional views at the time of focusing on an object point at a short distance. Moreover, FIG. 26A to FIG. 26L, and FIG. 28A to FIG. 28L are aberration diagrams of the zoom lens according to the example 7. FIG. 26A to FIG. 26L are aberration diagrams at the time of focusing on the infinite object point, and FIG. 28A to FIG. 28L are aberration diagrams at the time of focusing on the object point at the short distance.

The zoom lens of the example 7, as shown in FIG. 25A, FIG. 25B, and FIG. 25C, and FIG. 27A, FIG. 27B, and FIG. 27C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, a negative meniscus lens L2 having a convex surface directed toward the object side, and a biconvex positive lens L3.

The second lens unit G2 includes a negative meniscus lens L4 having a convex surface directed toward an image side.

The third lens unit G3 includes a biconvex positive lens L5, a biconvex positive lens L6, and a negative meniscus lens L7 having a convex surface directed toward the image side. Here, the biconvex positive lens L6 and the negative meniscus lens L7 are cemented.

The fourth lens unit G4 includes a positive meniscus lens L8 having a convex surface directed toward the image side, and a negative meniscus lens L9 having a convex surface directed toward the image side.

Moreover, the aperture stop S is disposed between the negative meniscus lens L4 and the positive meniscus lens L8. The negative meniscus lens L4 is positioned nearest to an image in the second lens unit G2, and the positive meniscus lens L8 is disposed nearest to an object in the fourth lens unit G4. More specifically, the aperture stop S is disposed between the biconvex positive lens L5 and the biconvex positive lens L6.

At the time of zooming from a wide angle end to a telephoto end, distances between the lens units change. A distance between the first lens unit G1 and the second lens unit G2 widens once and then narrows. A distance between the second lens unit G2 and the third lens unit G3 narrows. A distance between the third lens unit G3 and the fourth lens unit G4 narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L4 moves toward the object side.

An aspheric surface is provided to a total of six surfaces namely, both surfaces of the negative meniscus lens L2, both surfaces of the biconvex positive lens L5, and both surfaces of the negative meniscus lens L9.

Figure 29A:
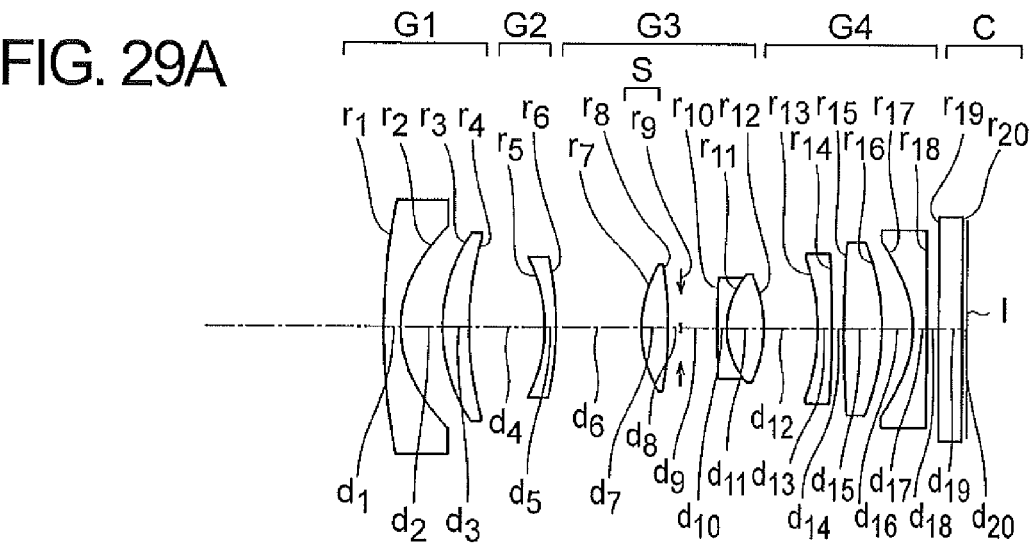
FIG. 29A, FIG. 29B, and FIG. 29C are cross-sectional views along an optical axis showing an optical arrangement of a zoom lens according to an example 8 at the time of focusing on an infinite object point, where.
Figure 29B:
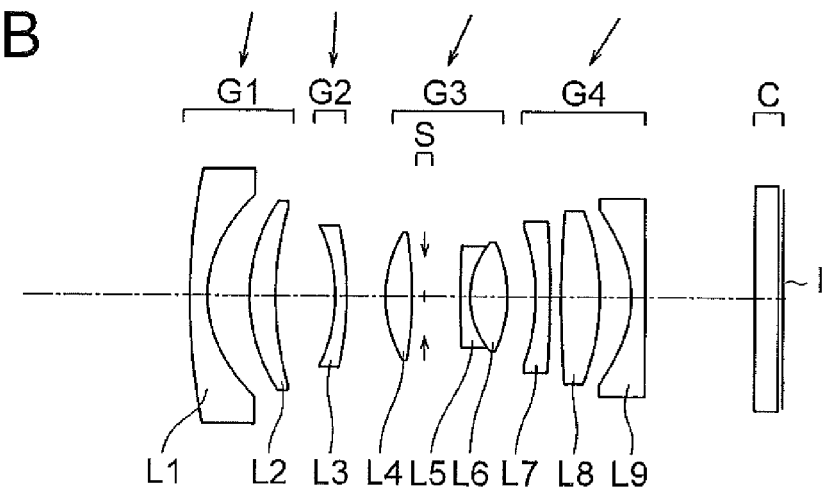
Figure 29C:
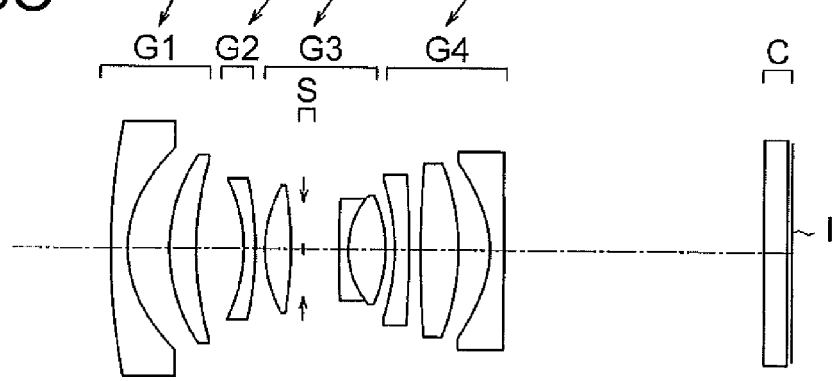
Figure 31A:
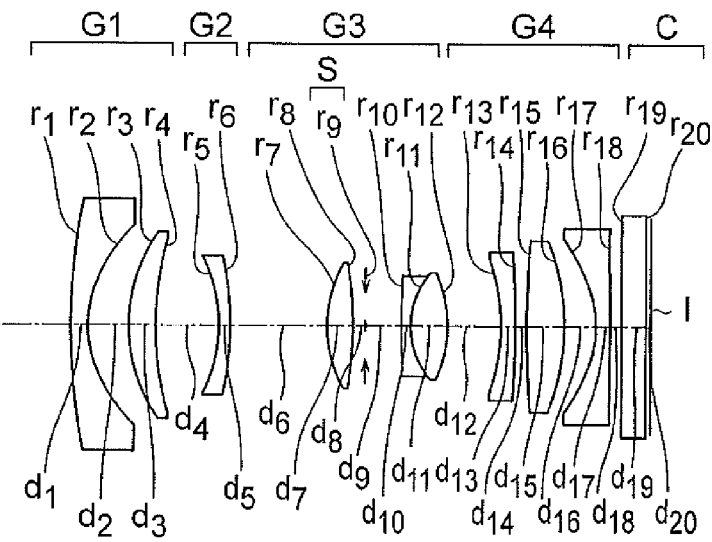
FIG. 31A, FIG. 31B, and FIG. 31C are cross-sectional views along an optical axis showing an optical arrangement of the zoom lens according to the example 8 at the time of focusing on an object point at a short distance, where.
Figure 31B:
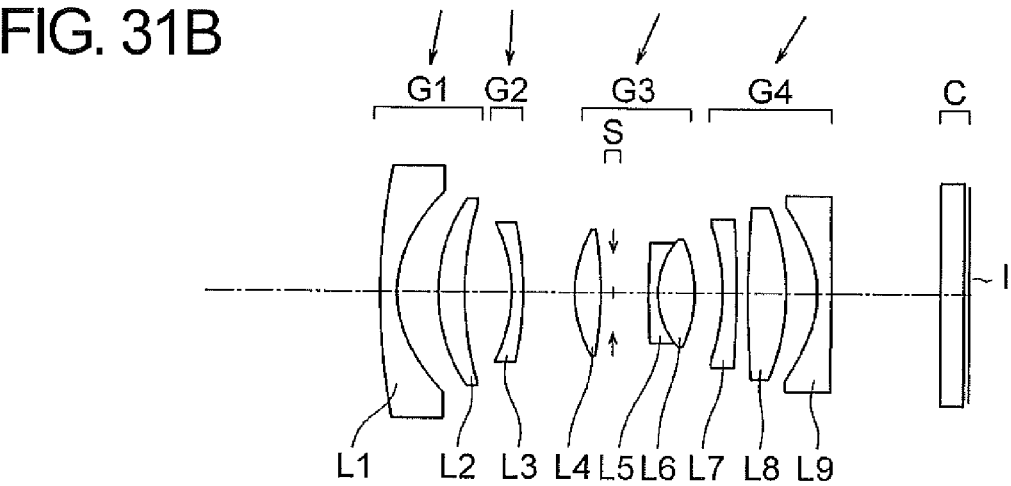
Figure 31C:
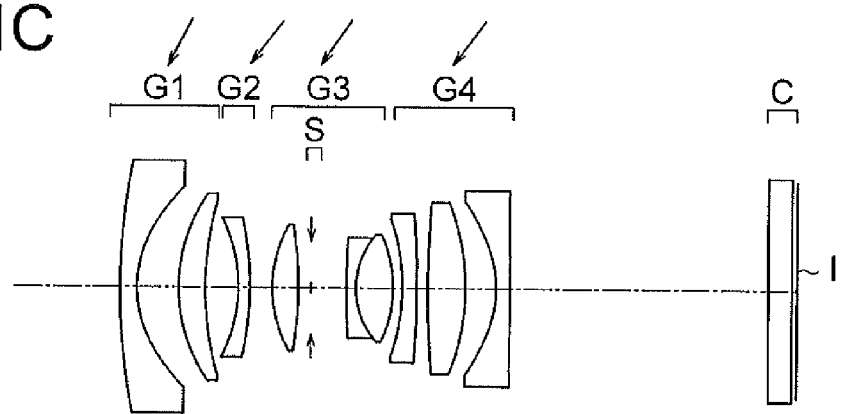

Next, a zoom lens according to an example 8 of the present invention will be described below. FIG. 29A, FIG. 29B, and FIG. 29C, and FIG. 31A, FIG. 31B, and FIG. 31C are cross-sectional views along an optical axis showing an optical arrangement of the zoom lens according to the example 8. FIG. 29A, FIG. 29B, and FIG. 29C are cross-sectional views at the time of focusing on an infinite object point, and FIG. 31A, FIG. 31B, and FIG. 31C are cross-sectional views at the time of focusing on an object point at a short distance. Moreover, FIG. 30A to FIG. 30L, and FIG. 32A to FIG. 32L are aberration diagrams of the zoom lens according to the example 8. FIG. 30A to FIG. 30L are aberration diagrams at the time of focusing on the infinite object point, and FIG. 32A to FIG. 32L are aberration diagrams at the time of focusing on the object point at the short distance.

The zoom lens of the example 8, as shown in FIG. 29A, FIG. 29B, and FIG. 29C, and FIG. 31A, FIG. 31B, and FIG. 31C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, and a positive meniscus lens L2 having a convex surface directed toward the object side.

The second lens unit G2 includes a negative meniscus lens L3 having a convex surface directed toward an image side.

The third lens unit G3 includes a biconvex positive lens L4, a negative meniscus lens L5 having a convex surface directed toward the object side, and a biconvex positive lens L6. Here, the negative meniscus lens L5 and the biconvex positive lens L6 are cemented.

The fourth lens unit G4 includes a negative meniscus lens L7 having a convex surface directed toward the image side, a biconvex positive lens L8, and a negative meniscus lens L9 having a convex surface directed toward the image side.

Moreover, an aperture stop S is disposed between the negative meniscus lens L3 and the negative meniscus lens L7. The negative meniscus lens L3 is positioned nearest to an image in the second lens unit G2, and the negative meniscus lens L7 is positioned nearest to an object in the fourth lens unit G4. More specifically, the aperture stop S is disposed between the biconvex positive lens L4 and the negative meniscus lens L5.

At the time of zooming from a wide angle end to a telephoto end, distances between the lens units change. A distance between the first lens unit G1 and the second lens unit G2 narrows. A distance between the second lens unit G2 and the third lens unit G3 narrows. A distance between the third lens unit G3 and the fourth lens unit G4 narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L3 moves toward the object side.

An aspheric surface is provided to a total of five surfaces namely, an image-side surface of the negative meniscus lens L1, both surfaces of the biconvex positive lens L4, and both surfaces of the negative meniscus lens L9.

Figure 33A:
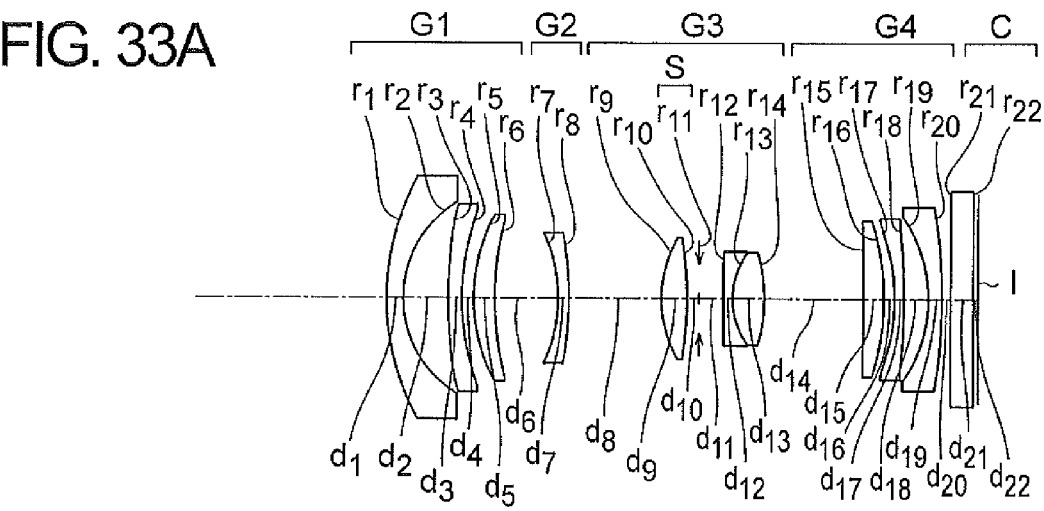
FIG. 33A, FIG. 33B, and FIG. 33C are cross-sectional views along an optical axis showing an optical arrangement of a zoom lens according to an example 9 at the time of focusing on an infinite object point, where.
Figure 33B:
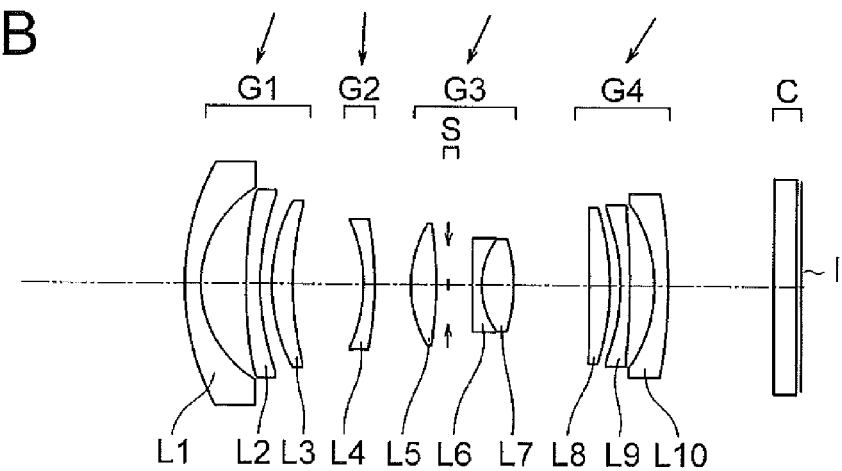
Figure 33C:
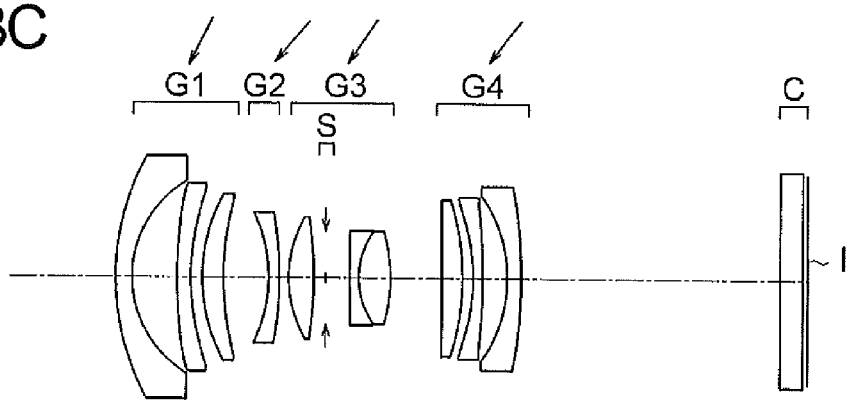
Figure 35A:
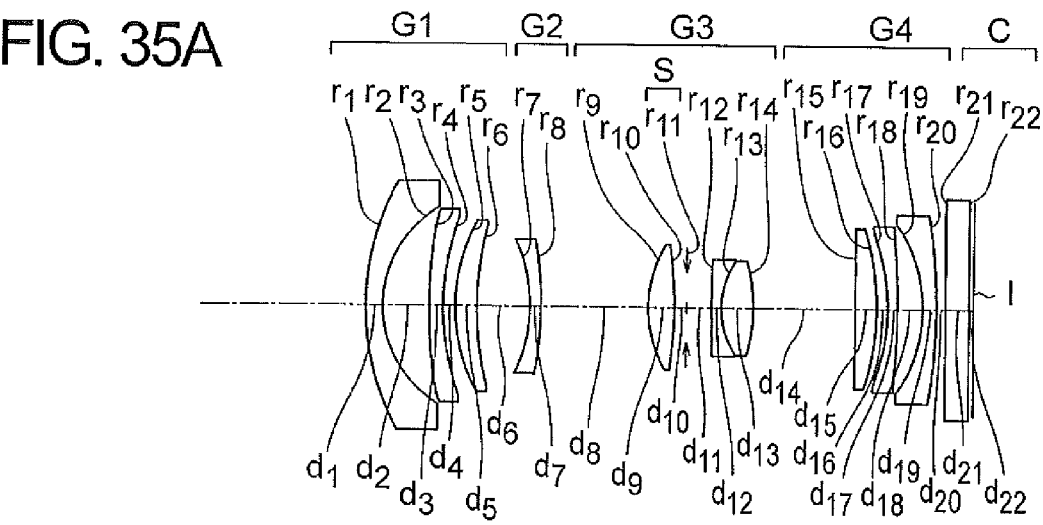
FIG. 35A, FIG. 35B, and FIG. 35C are cross-sectional views along an optical axis showing an optical arrangement of the zoom lens according to the example 9 at the time of focusing on an object point at a short distance, where.
Figure 35B:
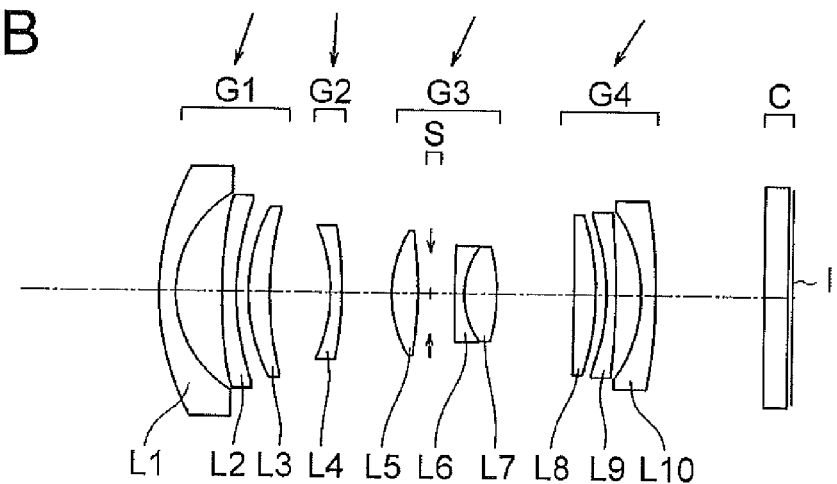
Figure 35C:
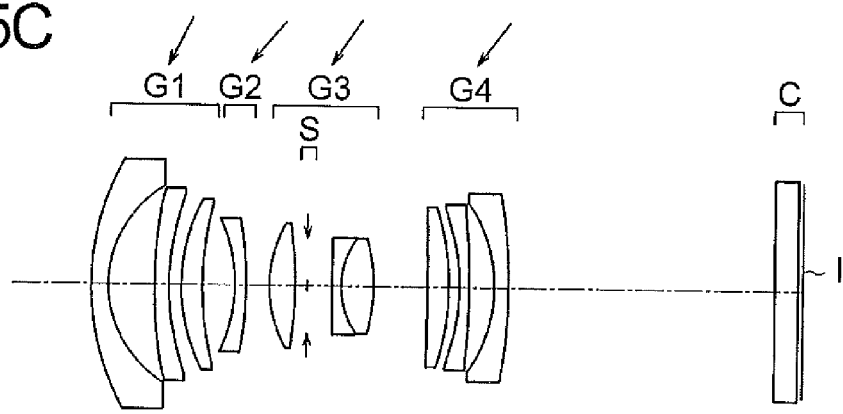

Next, a zoom lens according to an example 9 of the present invention will be described below. FIG. 33A, FIG. 33B, and FIG. 33C, and FIG. 35A, FIG. 35B, and FIG. 35C are cross-sectional views along an optical axis showing an optical arrangement of the zoom lens according to the example 9. FIG. 33A, FIG. 33B, and FIG. 33C are cross-sectional views at the time of focusing on an infinite object point, and FIG. 35A, FIG. 35B, and FIG. 35C are cross-sectional views at the time of focusing on an object point at a short distance. Moreover, FIG. 34A to FIG. 34L, and FIG. 36A to FIG. 36L are aberration diagrams of the zoom lens according to the example 9. FIG. 34A to FIG. 34L are aberration diagrams at the time of focusing on the infinite object point, and FIG. 36A to FIG. 36L are aberration diagrams at the time of focusing on the object point at the short distance.

The zoom lens of the example 9, as shown in FIG. 33A, FIG. 33B, and FIG. 33C, and FIG. 35A, FIG. 35B, and FIG. 35C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, a negative meniscus lens L2 having a convex surface directed toward the object side, and positive meniscus lens L3 having a convex surface directed toward the object side.

The second lens unit G2 includes a negative meniscus lens L4 having a convex surface directed toward an image side.

The third lens unit G3 includes a biconvex positive lens L5, a negative meniscus lens L6 having a convex surface directed toward the object side, and a biconvex positive lens L7. Here, the negative meniscus lens L6 and the biconvex positive lens L7 are cemented.

The fourth lens unit G4 includes a positive meniscus lens L8 having a convex surface directed toward the image side, a negative meniscus lens L9 having a convex surface directed toward the image side, and a negative meniscus lens L10 having a convex surface directed toward the image side.

Moreover, an aperture stop S is disposed between the negative meniscus lens L4 and the positive meniscus lens L8. The negative meniscus lens L4 is positioned nearest to an image in the second lens unit G2, and the positive meniscus lens L8 is positioned nearest to an object in the fourth lens unit G4. More specifically, the aperture stop S is disposed between the biconvex positive lens L5 and the negative meniscus lens L6.

At the time of zooming from a wide angle end to a telephoto end, distances between the lens units change. A distance between the first lens unit G1 and the second lens unit G2 widens once and then narrows. A distance between the second lens unit G2 and the third lens unit G3 narrows. A distance between the third lens unit G3 and the fourth lens unit G4 narrows.

Each of the first lens unit G1, the second lens unit G2, the third lens unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L4 moves toward the object side.

An aspheric surface is provided to a total of eight surfaces namely, both surfaces of the negative meniscus lens L2, both surfaces of the biconvex positive lens L5, both surfaces of the negative meniscus lens L9, and both surfaces of the negative meniscus lens L10.

Figure 37A:
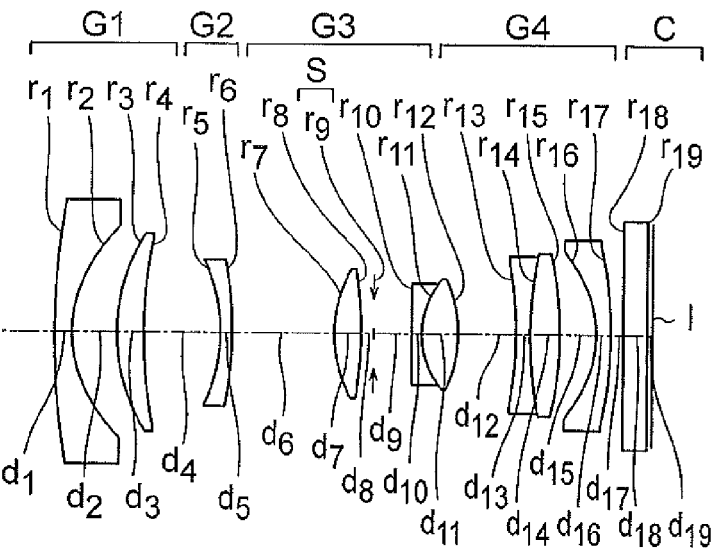
FIG. 37A, FIG. 37B, and FIG. 37C are cross-sectional views along an optical axis showing an optical arrangement of a zoom lens according to an example 10 at the time of focusing on an infinite object point, where.
Figure 37B:
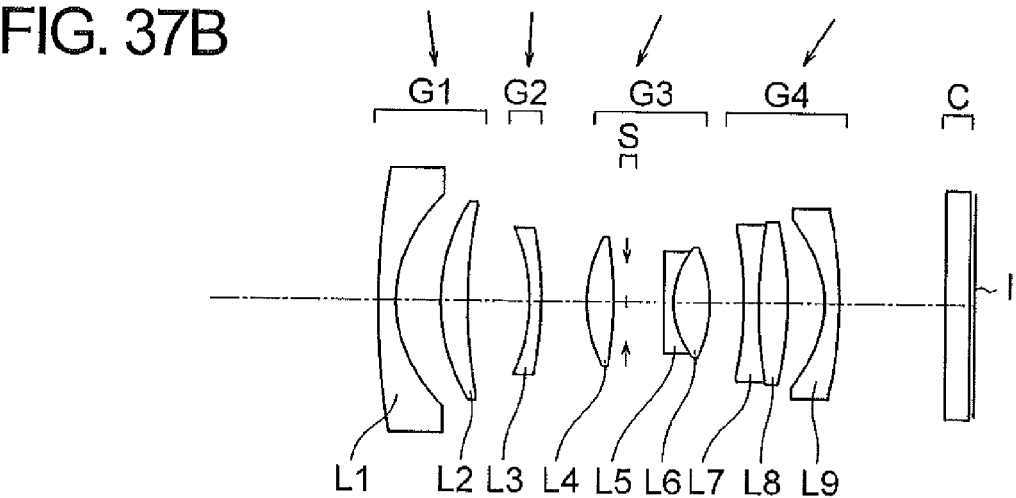
Figure 37C:
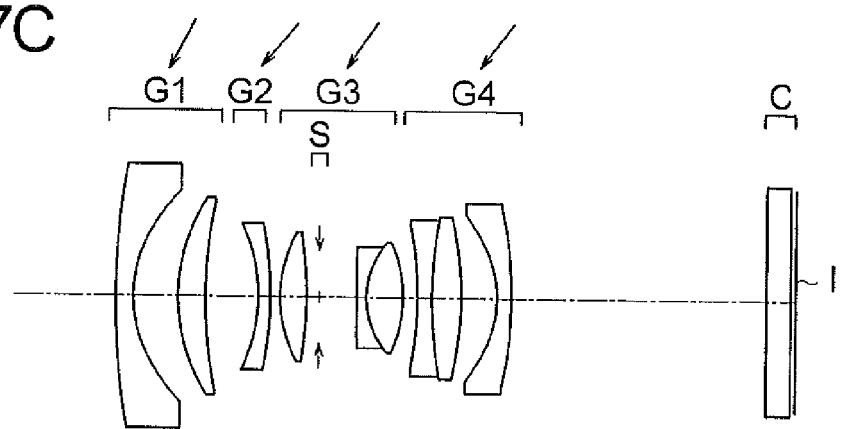
Figure 39A:
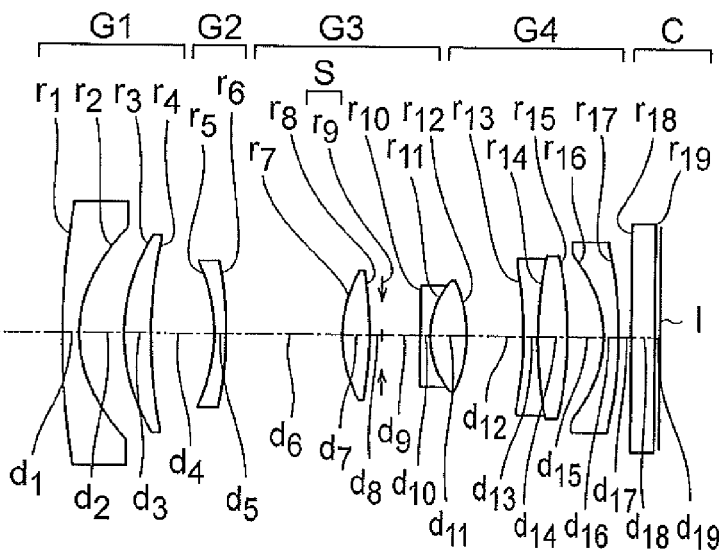
FIG. 39A, FIG. 39B, and FIG. 39C are cross-sectional views along an optical axis showing an optical arrangement of the zoom lens according to the example 10 at the time of focusing on an object point at a short distance, where.
Figure 39B:
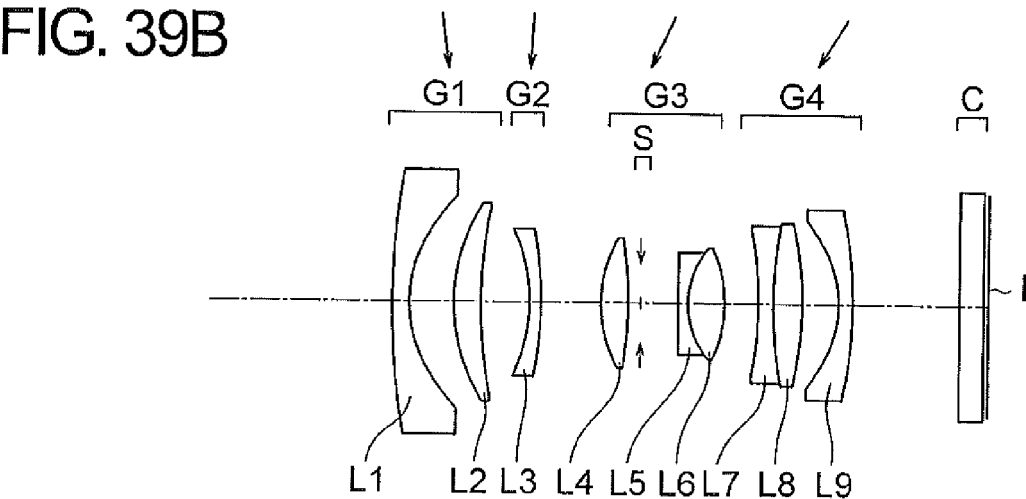
Figure 39C:
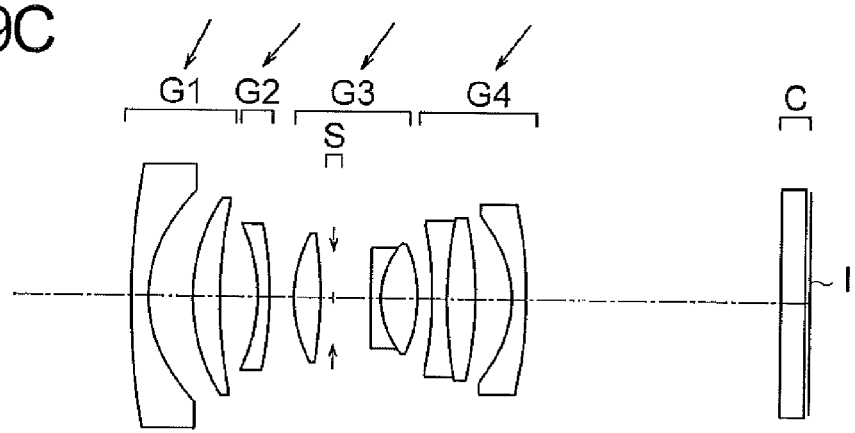

Next, a zoom lens according to an example 10 of the present invention will be described below. FIG. 37A, FIG. 37B, and FIG. 37C, and FIG. 39A, FIG. 39B, and FIG. 39C are cross-sectional views along an optical axis showing an optical arrangement of the zoom lens according to the example 10. FIG. 37A, FIG. 37B, and FIG. 37C are cross-sectional views at the time of focusing on an infinite object point, and FIG. 39A, FIG. 39B, and FIG. 39C are cross-sectional views at the time of focusing on an object point at a short distance. Moreover, FIG. 38A to FIG. 38L, and FIG. 40A to FIG. 40L are aberration diagrams of the zoom lens according to the example 10. FIG. 38A to FIG. 38L are aberration diagrams at the time of focusing on the infinite object point, and FIG. 40A to FIG. 40L are aberration diagrams at the time of focusing on the object point at the short distance.

The zoom lens of the example 10, as shown in FIG. 37A, FIG. 37B, and FIG. 37C, and FIG. 39A, FIG. 39B, and FIG. 39C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side, and a positive meniscus lens L2 having a convex surface directed toward the object side.

The second lens unit G2 includes a negative meniscus lens L3 having a convex surface directed toward an image side.

The third lens unit G3 includes a biconvex positive lens L4, a negative meniscus lens L5 having a convex surface directed toward the object side, and a biconvex positive lens L6. Here, the negative meniscus lens L5 and the biconvex positive lens L6 are cemented.

The fourth lens unit G4 includes a biconcave negative lens L7, a biconvex positive lens L8, and a negative meniscus lens L9 having a convex surface directed toward the image side. Here, the biconcave negative lens L7 and the biconvex positive lens L8 are cemented.

Moreover, an aperture stop S is disposed between the negative meniscus lens L3 and the biconcave negative lens L7. The negative meniscus lens L3 is positioned nearest to an image in the second lens unit G2, and the biconcave negative lens L7 is positioned nearest to an object in the fourth lens unit G4. More specifically, the aperture stop S is disposed between the biconvex positive lens L4 and the negative meniscus lens L5.

At the time of zooming from a wide angle end to a telephoto end, distances between the lens units change. A distance between the first lens unit G1 and the second lens unit G2 narrows. A distance between the second lens unit G2 and the third lens unit G3 narrows. A distance between the third lens unit G3 and the fourth lens unit G4 narrows.

The first lens unit G1, after moving toward the image side, moves toward the object side. Each of the second lens unit G2, the third lens unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L3 moves toward the object side.

An aspheric surface is provided to a total of five surfaces namely, an image-side surface of the negative meniscus lens L1, both surfaces of the biconvex positive lens L4, and both surfaces of the negative meniscus lens L9.

Figure 41A:
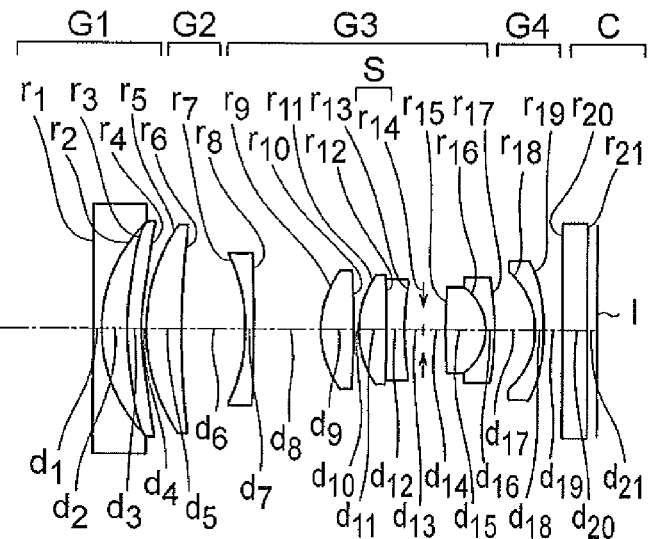
FIG. 41A, FIG. 41B, and FIG. 41C are cross-sectional views along an optical axis showing an optical arrangement of a zoom lens according to an example 11 at the time of focusing on an infinite object point, where.
Figure 41B:
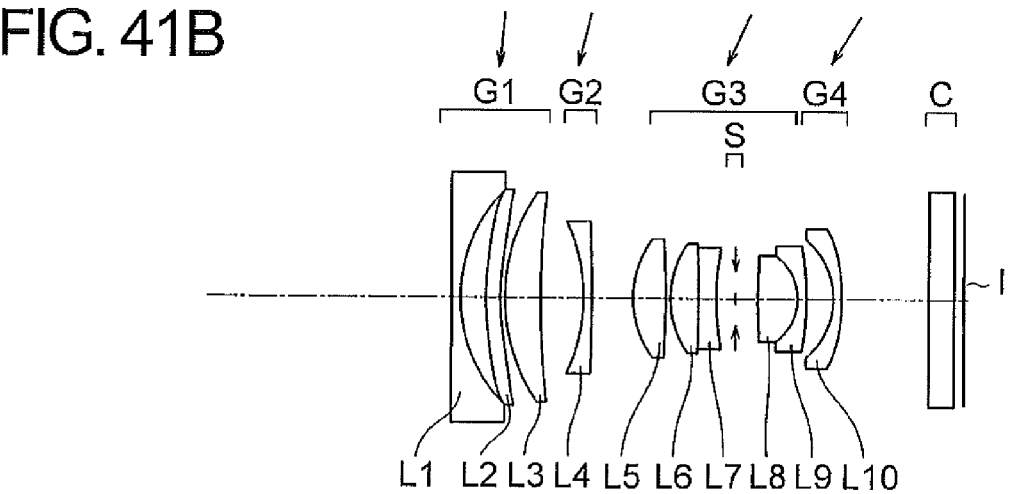
Figure 41C:
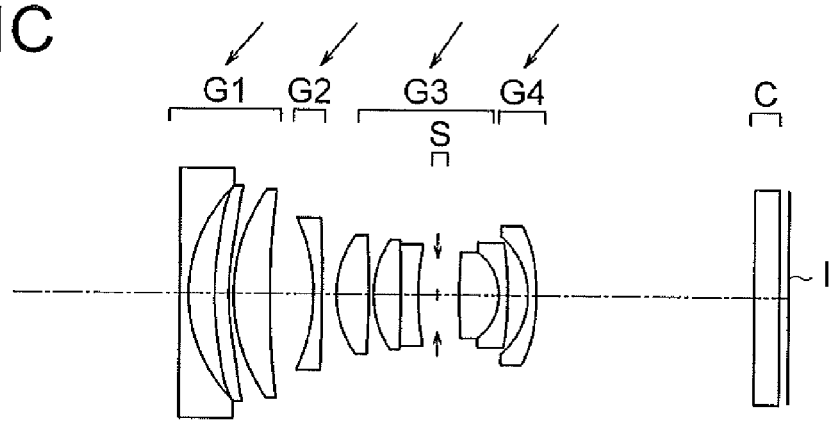
Figure 43A:
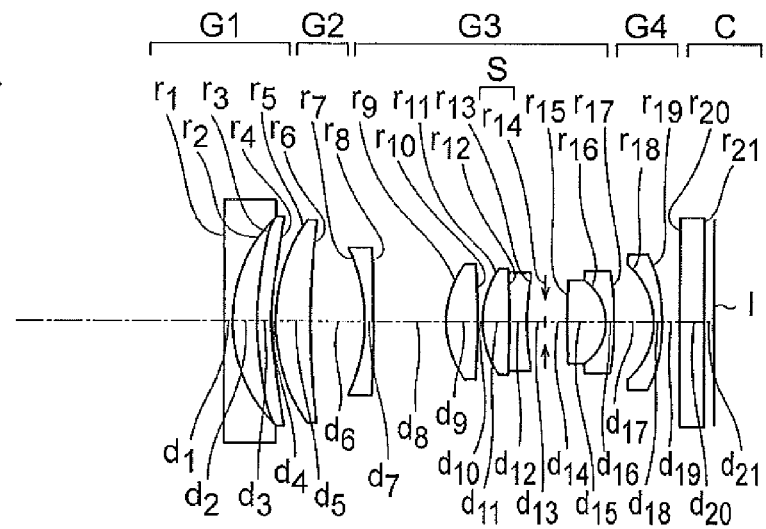
FIG. 43A, FIG. 43B, and FIG. 43C are cross-sectional views along an optical axis showing an optical arrangement of the zoom lens according to the example 11 at the time of focusing on an object point at a short distance, where.
Figure 43B:
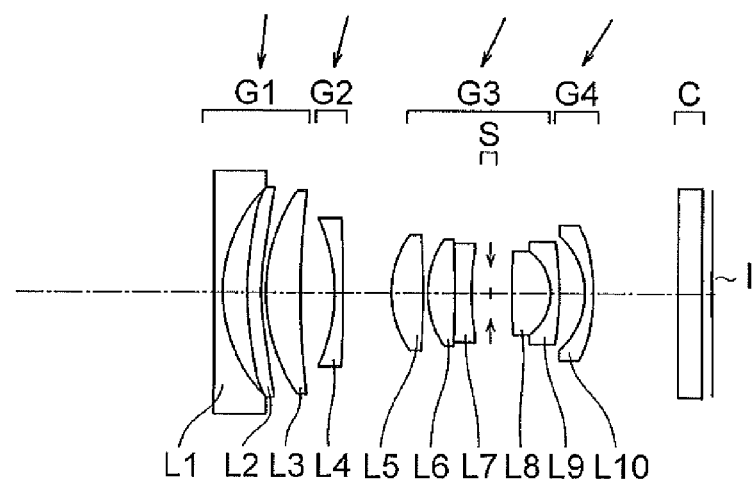
Figure 43C:
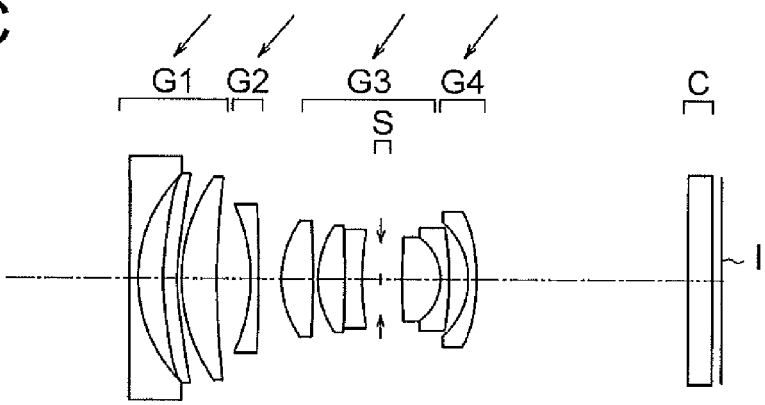
Figures 44A, 44B, 44C, 44D:
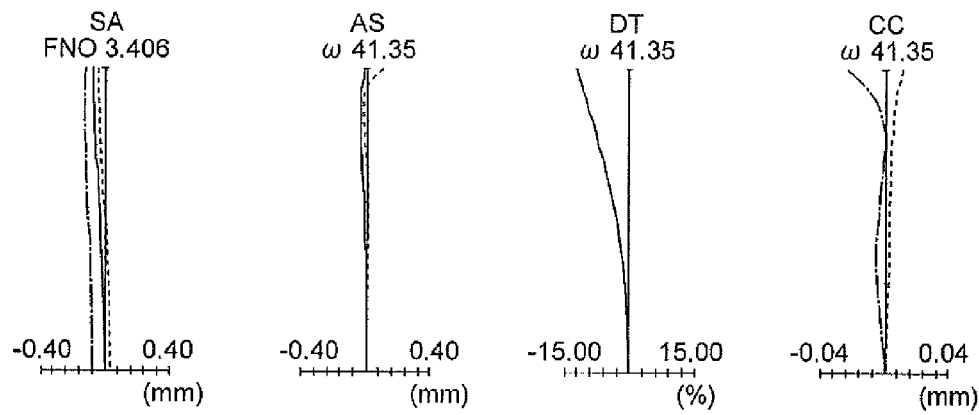
FIG. 44A, FIG. 44B, FIG. 44C, FIG. 44D, FIG. 44E, FIG. 44F, FIG. 44G, FIG. 44H, FIG. 44I, FIG. 44J, FIG. 44K, and FIG. 44L (hereinafter, 'FIG. 44A to FIG. 44L') are diagrams showing a spherical aberration (SA), an astigmatism (AS), a distortion (DT), and a chromatic aberration of magnification (CC) of the zoom lens according to the example 11 at the time of focusing on an object point at a short distance, where.
Figures 44E, 44F, 44G, 44H:
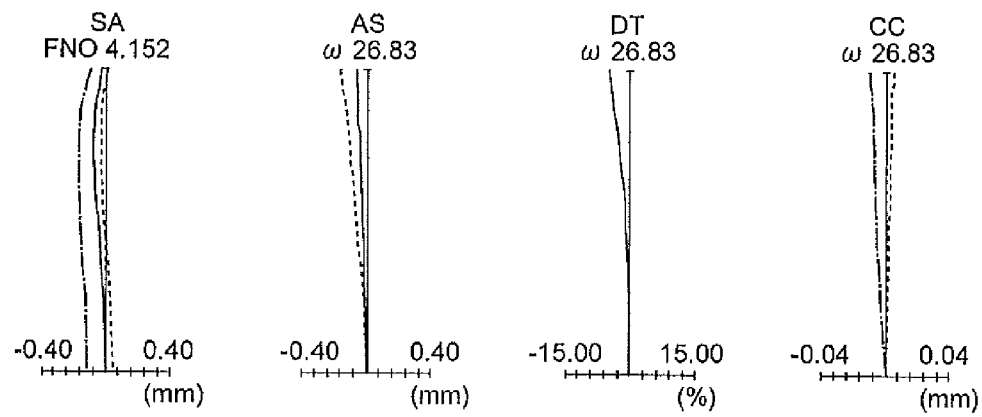
Figures 44I, 44J, 44K, 44L:
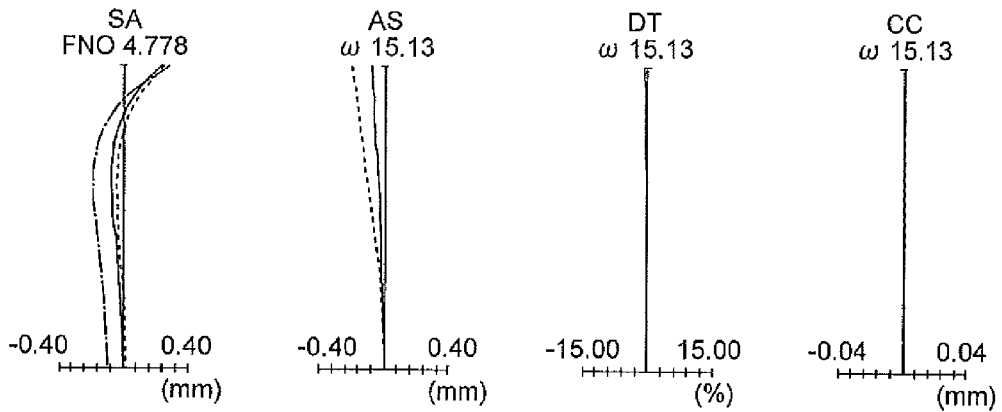

Next, a zoom lens according to an example 11 of the present invention will be described below. FIG. 41A, FIG. 41B, and FIG. 47C, and FIG. 43A, FIG. 43B, and FIG. 43C are cross-sectional views along an optical axis showing an optical arrangement of the zoom lens according to the example 11. FIG. 41A, FIG. 41B, and FIG. 41C are cross-sectional views at the time of focusing on an infinite object point, and FIG. 43A, FIG. 43B, and FIG. 43C are cross-sectional views at the time of focusing on an object point at a short distance. Moreover, FIG. 42A to FIG. 42L, and FIG. 44A to FIG. 44L are aberration diagrams of the zoom lens according to the example 11. FIG. 42A to FIG. 42L are aberration diagrams at the time of focusing on the infinite object point, and FIG. 44A to FIG. 44L are aberration diagrams at the time of focusing on the object point at the short distance.

The zoom lens of the example 11, as shown in FIG. 41A, FIG. 41B, and FIG. 41C, and FIG. 43A, FIG. 43B, and FIG. 43C, includes in order from an object side, a first lens unit G1 having a negative refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a biconcave negative lens L1, a negative meniscus lens L2 having a convex surface directed toward the object side, and a positive meniscus lens L3 having a convex surface directed toward the object side.

The second lens unit G2 includes a negative meniscus lens L4 having a convex surface directed toward an image side.

The third lens unit G3 includes a biconvex positive lens L5, a biconvex positive lens L6, a biconcave negative lens L7, a biconvex positive lens L8, and a negative meniscus lens L9 having a convex surface directed toward the image side. Here, the biconvex positive lens L6 and the biconcave negative lens L7 are cemented. Moreover, the biconvex positive lens L8 and the negative meniscus lens L9 are cemented.

The fourth lens unit G4 includes a negative meniscus lens L10 having a convex surface directed toward the image side.

Moreover, an aperture stop S is disposed between the negative meniscus lens L4 and the negative meniscus lens L10. The negative meniscus lens L4 is positioned nearest to an image in the second lens unit G2, and the negative meniscus lens L10 is positioned nearest to an object in the fourth lens unit G4. More specifically, the aperture stop S is disposed between the biconcave negative lens L7 and the biconvex positive lens L8.

At the time of zooming from a wide angle end to a telephoto end, distances between the lens units change. A distance between the first lens unit G1 and the second lens unit G2 narrows once and then widens. A distance between the second lens unit G2 and the third lens unit G3 narrows. A distance between the third lens unit G3 and the fourth lens unit G4 narrows.

More elaborately, each of the first lens unit G1, the second lens unit G2, the third lend unit G3, and the fourth lens unit G4 moves toward the object side. The aperture stop S moves toward the object side together with the third lens unit G3.

Moreover, focusing on an object is carried out by moving the second lens unit G2. At the time of focusing from the infinite object point to the object point at the short distance, the negative meniscus lens L4 moves toward the object side.

An aspheric surface is provided to a total of seven surfaces namely, both surfaces of the negative meniscus lens L2, an object-side surface of the negative meniscus lens L4, both surfaces of the biconvex positive lens L5, an object-side surface of the biconvex positive lens L8, and an image-side surface of the negative meniscus lens L10.

Next, numerical data of optical components comprising the zoom lens of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, * denotes an aspheric surface. Moreover, in zoom data, WE denotes a wide angle end, ST denotes an intermediate focal length state, TE denotes a telephoto end, f denotes a focal length of the overall zoom lens system, Fno. denotes an F number, ω denotes a half angle of view, IH denotes an image height, FB denotes a back focus, f1, f2 . . . is a focal length of each lens unit. The Lens total length is the distance from the frontmost lens surface to the rearmost lens surface plus back focus. Further, FB (back focus) is a unit which is expressed upon air conversion of a distance from the lens backmost surface to a paraxial image surface. Moreover, the numerical data are data at the time of focusing on an infinite object point.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 28.100 | 1.80 | 1.83481 | 42.71 |
| 2 | 11.956 | 4.92 | | |
| 3* | 59.823 | 1.50 | 1.59201 | 67.02 |
| 4* | 28.155 | 1.02 | | |
| 5 | 19.626 | 2.30 | 1.92286 | 20.88 |
| 6 | 32.237 | Variable | | |
| 7 | −17.018 | 1.20 | 1.77250 | 49.60 |
| 8 | −39.471 | Variable | | |
| 9* | 13.205 | 2.80 | 1.72903 | 54.04 |
| 10* | −31.856 | 1.30 | | |
| 11(Stop) | ∞ | 3.06 | | |
| 12 | 370.897 | 1.00 | 1.90366 | 31.32 |
| 13 | 8.966 | 3.28 | 1.49700 | 81.54 |
| 14 | −18.854 | Variable | | |
| 15 | −301.296 | 3.10 | 1.84666 | 23.78 |
| 16 | −26.181 | 2.21 | | |
| 17* | −14.296 | 1.50 | 1.53071 | 55.69 |
| 18* | 67.009 | Variable | | |
| 19 | ∞ | 2.50 | 1.51633 | 64.14 |
| 20 | ∞ | 0.50 | | |
| Image plane ∞ (Image pickup surface) | | | | |

| Aspherical surface data |
|---|

3rd surface k = 0.000
A4 = −9.88881e−06, A6 = 5.72619e−08, A8 = 1.12416e−09

4th surface k = 0.000
A4 = −4.01230e−05

9th surface k = 0.000
A4 = −6.44677e−05, A6 = 1.38804e−07

10th surface k = 0.225
A4 = 5.60522e−05, A6 = 9.01000e−08

17th surface k = 0.000
A4 = −2.08357e−05

18th surface k = 0.000
A4 = −5.30001e−05

| Zoom data Zoom ratio 2.88 | | | |
|---|---|---|---|
| | WE | ST | TE |
| f | 14.22 | 23.81 | 40.98 |
| Fno. | 3.50 | 4.60 | 5.71 |
| 2ω | 81.99 | 51.31 | 30.48 |
| IH | 11.15 | 11.15 | 11.15 |
| FB(in air) | 3.14 | 14.41 | 32.82 |
| Lens total length(in air) | 62.77 | 67.09 | 74.98 |
| d6 | 6.98 | 9.00 | 4.85 |
| d8 | 9.12 | 3.17 | 1.00 |
| d14 | 12.54 | 9.53 | 5.31 |
| d18 | 1.00 | 12.27 | 30.70 |

| Unit focal length | | | |
|---|---|---|---|
| f1 = −35.04 | f2 = −39.65 | f3 = 15.58 | f4 = −78.98 |

Example 2

Unit mm

Surface data

| Surface no. | r | d | nd | vd |
|---|---|---|---|---|
| Object plane | ∞ | ∞ | | |
| 1 | 72.804 | 1.80 | 1.80139 | 45.45 |
| 2* | 12.967 | 4.60 | | |
| 3 | 19.000 | 2.79 | 1.92286 | 20.88 |
| 4 | 31.480 | Variable | | |
| 5 | −16.500 | 1.20 | 1.77250 | 49.60 |
| 6 | −40.249 | Variable | | |
| 7* | 13.595 | 2.80 | 1.72903 | 54.04 |
| 8* | −31.549 | 1.30 | | |
| 9(Stop) | ∞ | 3.00 | | |
| 10 | 360.334 | 1.00 | 1.90366 | 31.32 |
| 11 | 9.242 | 3.49 | 1.49700 | 81.54 |
| 12 | −16.916 | Variable | | |
| 13 | −41.552 | 3.50 | 1.84666 | 23.78 |
| 14 | −17.376 | 2.73 | | |
| 15* | −9.558 | 1.50 | 1.58313 | 59.46 |
| 16* | −40.884 | Variable | | |
| 17 | ∞ | 2.50 | 1.51633 | 64.14 |
| 18 | ∞ | 0.50 | | |
| Image plane (Image pickup surface) | ∞ | | | |

Aspherical surface data

2nd surface k = 0.000
A4 = −2.14746e−05, A6 = −2.22199e−07, A8 = 7.61955e−10,
A10 = −7.50212e−12, A12 = −5.57614e−14

7th surface k = 0.000
A4 = −4.44026e−05, A6 = −9.99398e−08

8th surface k = 0.225
A4 = 7.59660e−05, A6 = −1.99448e−07

15th surface k = 0.000
A4 = 2.11485e−04, A6 = −1.33603e−06, A8 = 2.02084e−09,
A10 = 4.41446e−10

16th surface k = 0.000
A4 = 9.66989e−05, A6 = −1.84982e−06, A8 = 5.04395e−09,
A10 = 1.19975e−10

Zoom data
Zoom ratio 2.88

| | WE | ST | TE |
|---|---|---|---|
| f | 14.28 | 24.26 | 41.16 |
| Fno. | 3.60 | 4.50 | 5.80 |
| 2ω | 82.10 | 51.31 | 30.68 |
| IH | 11.15 | 11.15 | 11.15 |
| FB(in air) | 3.26 | 16.37 | 31.94 |
| Lens total length(in air) | 61.37 | 65.77 | 73.43 |
| d4 | 7.51 | 8.71 | 4.83 |
| d6 | 9.32 | 3.60 | 1.00 |
| d12 | 11.57 | 7.39 | 5.95 |
| d16 | 1.11 | 14.19 | 29.80 |

Unit focal length

| f1 = −38.10 | f2 = −37.01 | f3 = 15.48 | f4 = −71.02 |
|---|---|---|---|

Example 3

Unit mm

Surface data

| Surface no. | r | d | nd | vd |
|---|---|---|---|---|
| Object plane | ∞ | ∞ | | |
| 1 | 34.370 | 1.80 | 1.77250 | 49.60 |
| 2 | 12.744 | 5.60 | | |
| 3* | −251.781 | 1.50 | 1.55332 | 71.68 |
| 4* | 79.464 | 1.00 | | |
| 5 | 25.856 | 2.30 | 1.84666 | 23.78 |
| 6 | 64.550 | Variable | | |
| 7 | −16.300 | 1.20 | 1.81600 | 46.62 |
| 8 | −32.540 | Variable | | |
| 9* | 19.730 | 3.33 | 1.72903 | 54.04 |
| 10* | −37.030 | 1.00 | | |
| 11(Stop) | ∞ | 2.06 | | |
| 12 | 36.606 | 4.00 | 1.49700 | 81.54 |
| 13 | −16.554 | 1.65 | 1.90366 | 31.32 |
| 14 | −45.819 | 2.89 | | |
| 15 | 47.545 | 1.80 | 1.91082 | 35.25 |
| 16 | 9.909 | 4.37 | 1.55332 | 71.68 |
| 17 | −360.304 | Variable | | |
| 18 | 54.132 | 2.50 | 1.84666 | 23.78 |
| 19 | −57.224 | 3.61 | | |
| 20* | −12.750 | 1.50 | 1.59201 | 67.02 |
| 21* | −201.535 | Variable | | |
| 22 | ∞ | 2.50 | 1.51633 | 64.14 |
| 23 | ∞ | 0.50 | | |
| Image plane (Image pickup surface) | ∞ | | | |

Aspherical surface data

3rd surface k = 0.000
A4 = 6.76209e−05, A6 = −4.80755e−07, A8 = 1.22796e−09

4th surface k = 0.000
A4 = 3.36897e−05, A6 = −5.57368e−07, A8 = 1.95323e−10,
A10 = 2.28200e−12

9th surface k = 0.000
A4 = −2.29537e−05, A6 = −5.48437e−08, A8 = 3.39990e−10

10th surface k = 0.225
A4 = 1.45533e−05, A6 = −9.37758e−08, A8 = 4.00510e−10

20th surface k = 0.000
A4 = 1.11261e−04, A6 = −9.24608e−07, A8 = 8.11609e−09

21th surface k = 0.000
A4 = 6.21375e−05, A6 = −9.20195e−07, A8 = 3.74090e−09

Zoom data
Zoom ratio 2.88

| | WE | ST | TE |
|---|---|---|---|
| f | 14.29 | 23.37 | 41.15 |
| Fno. | 2.90 | 3.60 | 4.90 |
| 2ω | 81.34 | 51.85 | 30.34 |
| IH | 11.15 | 11.15 | 11.15 |
| FB(in air) | 3.17 | 11.37 | 26.18 |
| Lens total length(in air) | 70.54 | 72.44 | 79.13 |
| d6 | 6.54 | 8.06 | 5.11 |
| d8 | 11.76 | 4.77 | 1.00 |
| d17 | 6.96 | 6.13 | 4.74 |
| d21 | 1.00 | 9.21 | 24.05 |

-continued

Unit mm

Unit focal length f1 = −43.37   f2 = −41.40   f3 = 17.16   f4 = −130.01

Example 4

Unit mm

Surface data

| Surface no. | r | d | nd | νd |
|---|---|---|---|---|
| Object plane | ∞ | ∞ | | |
| 1 | 39.337 | 1.80 | 1.77250 | 49.60 |
| 2 | 12.850 | 5.00 | | |
| 3* | −251.781 | 1.50 | 1.55332 | 71.68 |
| 4* | 79.464 | 1.00 | | |
| 5 | 19.094 | 2.30 | 1.84666 | 23.78 |
| 6 | 32.978 | Variable | | |
| 7 | −17.670 | 1.20 | 1.81600 | 46.62 |
| 8 | −28.232 | Variable | | |
| 9* | 19.730 | 2.99 | 1.72903 | 54.04 |
| 10* | −43.582 | 1.00 | | |
| 11(Stop) | ∞ | 1.58 | | |
| 12 | 33.023 | 4.00 | 1.49700 | 81.54 |
| 13 | −16.554 | 3.17 | 1.90366 | 31.32 |
| 14 | −45.819 | 2.57 | | |
| 15 | 59.459 | 1.28 | 1.91082 | 35.25 |
| 16 | 9.909 | 4.37 | 1.55332 | 71.68 |
| 17 | −240.472 | Variable | | |
| 18 | 93.686 | 2.50 | 1.84666 | 23.78 |
| 19 | −37.462 | 3.27 | | |
| 20* | −12.070 | 1.50 | 1.59201 | 67.02 |
| 21* | −201.535 | Variable | | |
| 22 | ∞ | 2.50 | 1.51633 | 64.14 |
| 23 | ∞ | 0.50 | | |
| Image plane ∞ (Image pickup surface) | | | | |

Aspherical surface data

3rd surface k = 0.000
A4 = 1.29554e−04, A6 = −6.46568e−07, A8 = 1.33383e−09
4th surface k = 0.000
A4 = 1.11794e−04, A6 = −7.06399e−07, A8 = 4.24412e−10,
A10 = −1.26386e−12
9th surface k = 0.000
A4 = −1.44277e−05, A6 = −8.62921e−08, A8 = 1.95201e−10
10th surface k = 0.225
A4 = 1.32966e−05, A6 = −1.06036e−07, A8 = 2.60465e−10
20th surface k = 0.000
A4 = 1.25647e−04, A6 = −1.17364e−06, A8 = 1.24150e−08
21th surface k = 0.000
A4 = 6.95078e−05, A6 = −1.11626e−06, A8 = 6.08212e−09

-continued

Unit mm

Zoom data
Zoom ratio 2.88

| | WE | ST | TE |
|---|---|---|---|
| f | 14.28 | 24.26 | 41.16 |
| Fno. | 3.50 | 4.00 | 5.30 |
| 2ω | 81.60 | 50.03 | 30.26 |
| IH | 11.15 | 11.15 | 11.15 |
| FB(in air) | 3.46 | 11.92 | 26.49 |
| Lens total length(in air) | 74.16 | 72.39 | 79.14 |
| d6 | 8.14 | 7.37 | 6.19 |
| d8 | 14.03 | 5.67 | 1.00 |
| d17 | 7.51 | 6.41 | 4.44 |
| d21 | 1.30 | 9.75 | 24.35 |

Unit focal length f1 = −37.74   f2 = −61.00   f3 = 18.55   f4 = −106.18

Example 5

Unit mm

Surface data

| Surface no. | r | d | nd | νd |
|---|---|---|---|---|
| Object plane | ∞ | ∞ | | |
| 1 | 45.216 | 1.80 | 1.77250 | 49.60 |
| 2 | 11.070 | 4.90 | | |
| 3* | 203.022 | 1.60 | 1.55332 | 71.68 |
| 4* | 93.893 | 1.16 | | |
| 5 | 25.426 | 2.30 | 1.84666 | 23.78 |
| 6 | 146.645 | Variable | | |
| 7 | −16.572 | 1.20 | 1.80139 | 45.45 |
| 8 | −45.357 | Variable | | |
| 9* | 24.846 | 2.31 | 1.72903 | 54.04 |
| 10* | −39.549 | 1.00 | | |
| 11(Stop) | ∞ | 5.00 | | |
| 12 | 33.616 | 4.00 | 1.49700 | 81.54 |
| 13 | −14.355 | 1.65 | 1.90366 | 31.32 |
| 14 | −41.305 | 2.96 | | |
| 15 | 129.146 | 1.80 | 1.91082 | 35.25 |
| 16 | 12.853 | 4.67 | 1.55332 | 71.68 |
| 17 | −28.704 | Variable | | |
| 18 | 137.351 | 3.40 | 1.84666 | 23.78 |
| 19 | −31.007 | 4.19 | | |
| 20* | −13.750 | 1.50 | 1.62263 | 58.16 |
| 21* | −2327.054 | Variable | | |
| 22 | ∞ | 3.50 | 1.51633 | 64.14 |
| 23 | ∞ | 0.50 | | |
| Image plane ∞ (Image pickup surface) | | | | |

Aspherical surface data

3rd surface k = 0.000
A4 = 2.07303e−04, A6 = −3.20667e−07, A8 = 2.39609e−09
4th surface k = 0.000
A4 = 1.39527e−04, A6 = −6.16173e−07, A8 = 2.49705e−09,
A10 = −3.45905e−11
9th surface k = 0.000
A4 = 1.55980e−06, A6 = 1.78197e−07, A8 = −3.06591e−09

-continued

Unit mm

10th surface k = 0.225
A4 = 1.93346e−05, A6 = 1.91510e−07, A8 = −3.33733e−09

20th surface k = 0.000
A4 = 9.92179e−05, A6 = 1.35047e−07, A8 = 2.28183e−09

21th surface k = 0.000
A4 = 4.45480e−05, A6 = −1.69796e−07, A8 = 1.99574e−09

Zoom data
Zoom ratio 2.88

|  | WE | ST | TE |
|---|---|---|---|
| f | 14.28 | 24.29 | 41.18 |
| Fno. | 3.50 | 4.00 | 5.30 |
| 2ω | 81.43 | 50.31 | 30.52 |
| IH | 11.15 | 11.15 | 11.15 |
| FB(in air) | 3.82 | 16.87 | 34.87 |
| Lens total length(in air) | 78.04 | 79.73 | 90.82 |
| d6 | 6.51 | 6.21 | 4.88 |
| d8 | 12.17 | 5.11 | 1.00 |
| d17 | 10.11 | 6.12 | 4.65 |
| d21 | 1.00 | 14.00 | 32.05 |

Unit focal length

| f1 = −53.66 | f2 = −33.20 | f3 = 19.96 | f4 = −196.45 |
|---|---|---|---|

Example 6

Unit mm
Surface data

| Surface no. | r | d | nd | vd |
|---|---|---|---|---|
| Object plane | ∞ | ∞ | | |
| 1 | 30.067 | 1.80 | 1.77250 | 49.60 |
| 2 | 12.600 | 7.00 | | |
| 3* | −108.026 | 1.50 | 1.55332 | 71.68 |
| 4* | 57.743 | 1.00 | | |
| 5 | 54.274 | 2.30 | 1.84666 | 23.78 |
| 6 | −102.209 | Variable | | |
| 7 | −16.415 | 1.20 | 1.88300 | 40.76 |
| 8 | −30.815 | Variable | | |
| 9* | 12.026 | 4.30 | 1.59282 | 68.63 |
| 10* | −42.780 | 1.21 | | |
| 11(Stop) | ∞ | 3.02 | | |
| 12 | 30.924 | 3.27 | 1.49700 | 81.54 |
| 13 | −10.731 | 1.00 | 1.90366 | 31.32 |
| 14 | 167.798 | 1.00 | | |
| 15 | 50.330 | 1.70 | 1.65844 | 50.88 |
| 16 | −456.178 | Variable | | |
| 17 | 120.257 | 3.20 | 1.84666 | 23.78 |
| 18 | −36.841 | 3.59 | | |
| 19* | −8.537 | 1.50 | 1.59201 | 67.02 |
| 20* | −25.340 | Variable | | |
| 21 | ∞ | 2.50 | 1.51633 | 64.14 |
| 22 | ∞ | 0.50 | | |
| Image plane(Image pickup surface) | ∞ | | | |

Aspherical surface data

3rd surface k = 0.000
A4 = −3.42284e−05

-continued

Unit mm

4th surface k = 0.000
A4 = −7.77258e−05, A6 = −8.33187e−08

9th surface k = 0.000
A4 = −3.85571e−05, A6 = −6.46107e−08, A8 = −3.72144e−10

10th surface k = 0.225
A4 = 3.04551e−05, A6 = −3.19160e−08, A8 = 3.59046e−10

19th surface k = 0.000
A4 = −7.60348e−05, A6 = 1.75366e−06

20th surface k = 0.000
A4 = −8.01999e−05, A6 = 1.29455e−06, A8 = −1.02918e−08

Zoom data
Zoom ratio 2.88

|  | WE | ST | TE |
|---|---|---|---|
| f | 14.34 | 24.04 | 41.27 |
| Fno. | 2.90 | 3.50 | 4.90 |
| 2ω | 80.90 | 50.40 | 30.40 |
| IH | 11.15 | 11.15 | 11.15 |
| FB(in air) | 8.05 | 16.73 | 31.09 |
| Lens total length(in air) | 69.98 | 73.00 | 79.13 |
| d6 | 6.50 | 9.00 | 5.10 |
| d8 | 13.05 | 4.82 | 1.00 |
| d16 | 3.79 | 3.86 | 3.35 |
| d20 | 5.89 | 14.58 | 28.96 |

Unit focal length

| f1 = −48.17 | f2 = −41.40 | f3 = 17.55 | f4 = −99.23 |
|---|---|---|---|

Example 7

Unit mm
Surface data

| Surface no. | r | d | nd | vd |
|---|---|---|---|---|
| Object plane | ∞ | ∞ | | |
| 1 | 36.778 | 1.80 | 1.74100 | 52.64 |
| 2 | 12.786 | 6.90 | | |
| 3* | 267.178 | 1.50 | 1.59201 | 67.02 |
| 4* | 54.001 | 1.09 | | |
| 5 | 66.351 | 2.30 | 1.92286 | 20.88 |
| 6 | −139.338 | Variable | | |
| 7 | −16.300 | 1.20 | 1.88300 | 40.76 |
| 8 | −30.432 | Variable | | |
| 9* | 11.205 | 4.30 | 1.55332 | 71.68 |
| 10* | −28.851 | 1.51 | | |
| 11(Stop) | ∞ | 1.76 | | |
| 12 | 34.337 | 2.58 | 1.49700 | 81.54 |
| 13 | −10.674 | 1.53 | 1.90366 | 31.32 |
| 14 | −246.597 | Variable | | |
| 15 | −73.126 | 3.00 | 1.84666 | 23.78 |
| 16 | −19.812 | 3.61 | | |
| 17* | −7.811 | 1.50 | 1.53071 | 55.69 |
| 18* | −22.765 | Variable | | |

-continued

| Unit mm | | | | |
|---|---|---|---|---|
| 19 | ∞ | 2.50 | 1.51633 | 64.14 |
| 20 | ∞ | 0.50 | | |
| Image plane(Image pickup surface) | ∞ | | | |

Aspherical surface data

3rd surface k = 0.000
A4 = −7.67800e−05
4th surface k = 0.000
A4 = −1.21024e−04, A6 = −2.48450e−08
9th surface k = 0.000
A4 = −4.84811e−05, A6 = −6.49137e−08, A8 = −1.58708e−09
10th surface k = 0.225
A4 = 4.80665e−05, A6 = −4.37945e−08, A8 = −1.21420e−10
17th surface k = 0.000
A4 = −8.15639e−05, A6 = 5.45068e−07, A8 = 5.55640e−08
18th surface k = 0.000
A4 = −1.02625e−04, A6 = 1.20719e−06, A8 = −1.58771e−09

Zoom data
Zoom ratio 2.88

| | WE | ST | TE |
|---|---|---|---|
| f | 14.39 | 24.24 | 41.42 |
| Fno. | 3.60 | 4.50 | 5.60 |
| 2ω | 80.93 | 50.22 | 30.28 |
| IH | 11.15 | 11.15 | 11.15 |
| FB(in air) | 9.16 | 18.67 | 33.82 |
| Lens total length(in air) | 69.49 | 71.57 | 79.15 |
| d6 | 6.52 | 7.89 | 5.11 |
| d8 | 13.45 | 5.21 | 1.00 |
| d14 | 5.77 | 5.21 | 4.63 |
| d18 | 7.00 | 16.52 | 31.67 |

Unit focal length

| f1 = −48.83 | f2 = −41.40 | f3 = 17.44 | f4 = −130.00 |
|---|---|---|---|

Example 8

| Unit mm | | | | |
|---|---|---|---|---|

Surface data

| Surface no. | r | d | nd | vd |
|---|---|---|---|---|
| Object plane | ∞ | ∞ | | |
| 1 | 69.483 | 1.80 | 1.76802 | 49.24 |
| 2* | 12.316 | 4.40 | | |
| 3 | 17.751 | 2.80 | 1.84666 | 23.78 |
| 4 | 33.966 | Variable | | |
| 5 | −16.500 | 1.20 | 1.88300 | 40.76 |
| 6 | −34.698 | Variable | | |
| 7* | 12.895 | 2.80 | 1.72903 | 54.04 |
| 8* | −32.267 | 1.30 | | |
| 9(Stop) | ∞ | 3.79 | | |
| 10 | 109.180 | 1.00 | 2.00100 | 29.13 |
| 11 | 8.803 | 3.90 | 1.49700 | 81.54 |

-continued

| Unit mm | | | | |
|---|---|---|---|---|
| 12 | −13.725 | Variable | | |
| 13 | −22.021 | 1.50 | 1.51742 | 52.43 |
| 14 | −119.884 | 1.20 | | |
| 15 | 121.348 | 4.00 | 1.84666 | 23.78 |
| 16 | −24.716 | 3.30 | | |
| 17* | −11.793 | 1.50 | 1.61881 | 63.85 |
| 18* | −184.374 | Variable | | |
| 19 | ∞ | 2.50 | 1.51633 | 64.14 |
| 20 | ∞ | 0.50 | | |
| Image plane(Image pickup surface) | ∞ | | | |

Aspherical surface data

2nd surface k = 0.000
A4 = −4.13906e−05, A6 = −8.90550e−08, A8 = −3.97702e−09,
A10 = 3.26580e−11, A12 = −2.31006e−13
7th surface k = 0.000
A4 = −6.61462e−05, A6 = 9.10274e−08
8th surface k = 0.225
A4 = 6.99593e−05, A6 = 1.96900e−08
17th surface k = 0.000
A4 = 8.84124e−05, A6 = 7.38725e−07
18th surface k = 0.000
A4 = 2.08683e−05

Zoom data
Zoom ratio 2.88

| | WE | ST | TE |
|---|---|---|---|
| f | 14.27 | 24.26 | 41.17 |
| Fno. | 3.60 | 4.50 | 5.80 |
| 2ω | 80.71 | 50.25 | 30.36 |
| IH | 11.15 | 11.15 | 11.15 |
| FB(in air) | 3.41 | 13.65 | 29.38 |
| Lens total length(in air) | 60.54 | 61.53 | 70.84 |
| d4 | 8.00 | 6.35 | 4.97 |
| d6 | 9.03 | 4.10 | 1.00 |
| d12 | 5.60 | 2.93 | 1.00 |
| d18 | 1.26 | 11.48 | 27.23 |

Unit focal length

| f1 = −43.96 | f2 = −36.77 | f3 = 15.00 | f4 = −42.41 |
|---|---|---|---|

Example 9

| Unit mm | | | | |
|---|---|---|---|---|

Surface data

| Surface no. | r | d | nd | vd |
|---|---|---|---|---|
| Object plane | ∞ | ∞ | | |
| 1 | 28.100 | 1.80 | 1.83481 | 42.71 |
| 2 | 12.405 | 4.96 | | |
| 3* | 59.606 | 1.50 | 1.59201 | 67.02 |
| 4* | 25.757 | 1.30 | | |
| 5 | 19.535 | 2.30 | 1.92286 | 20.88 |
| 6 | 34.350 | Variable | | |
| 7 | −17.018 | 1.20 | 1.77250 | 49.60 |

-continued

Unit mm

| | | | | |
|---|---|---|---|---|
| 8 | -40.147 | Variable | | |
| 9* | 12.875 | 2.80 | 1.72903 | 54.04 |
| 10* | -36.095 | 1.30 | | |
| 11(Stop) | ∞ | 2.65 | | |
| 12 | 269.966 | 1.00 | 1.90366 | 31.32 |
| 13 | 8.754 | 3.48 | 1.49700 | 81.54 |
| 14 | -18.725 | Variable | | |
| 15 | -413.167 | 2.28 | 1.84666 | 23.78 |
| 16 | -28.161 | 1.15 | | |
| 17* | -22.828 | 1.02 | 1.53071 | 55.69 |
| 18* | -104.075 | 2.70 | | |
| 19* | -16.557 | 1.50 | 1.55332 | 71.68 |
| 20* | -63.534 | Variable | | |
| 21 | ∞ | 2.50 | 1.51633 | 64.14 |
| 22 | ∞ | 0.50 | | |
| Image plane(Image pickup surface) | ∞ | | | |

Aspherical surface data

3rd surface k = 0.000
A4 = 5.87273e-06, A6 = -7.35826e-09, A8 = 1.36027e-09

4th surface k = 0.000
A4 = -2.28093e-05

9th surface k = 0.000
A4 = -5.55585e-05, A6 = 3.87032e-08

10th surface k = 0.225
A4 = 6.03921e-05, A6 = -5.91200e-09

17th surface k = 0.000
A4 = -1.57432e-05, A6 = -5.18335e-07, A8 = 1.40203e-08

18th surface k = 0.000
A4 = -1.91152e-05, A6 = -1.12919e-06, A8 = 1.74449e-08

19th surface k = 0.000
A4 = 4.72418e-06, A6 = -8.53043e-07, A8 = 1.66384e-08,
A10 = -1.25167e-10

20th surface k = 0.000
A4 = -5.41806e-06, A6 = -1.16285e-07, A8 = 9.74462e-10

Zoom data
Zoom ratio 2.88

| | WE | ST | TE |
|---|---|---|---|
| f | 14.27 | 23.84 | 41.08 |
| Fno. | 3.60 | 4.50 | 5.80 |
| 2ω | 81.69 | 51.41 | 30.46 |
| IH | 11.15 | 11.15 | 11.15 |
| FB(in air) | 3.15 | 13.77 | 30.54 |
| Lens total length(in air) | 64.08 | 66.83 | 75.14 |
| d6 | 7.00 | 7.82 | 4.93 |
| d8 | 10.16 | 4.04 | 1.00 |
| d14 | 10.84 | 8.26 | 5.73 |
| d20 | 1.00 | 11.61 | 28.40 |

Unit focal length

| f1 = -38.92 | f2 = -39.12 | f3 = 15.99 | f4 = -79.68 |
|---|---|---|---|

Example 10

Unit mm

Surface data

| Surface no. | r | d | nd | vd |
|---|---|---|---|---|
| Object plane | ∞ | ∞ | | |
| 1 | 78.813 | 1.80 | 1.80139 | 45.45 |
| 2* | 13.169 | 4.60 | | |
| 3 | 19.214 | 2.80 | 1.84666 | 23.78 |
| 4 | 48.038 | Variable | | |
| 5 | -17.786 | 1.20 | 1.91082 | 35.25 |
| 6 | -40.182 | Variable | | |
| 7* | 13.148 | 2.80 | 1.76802 | 49.24 |
| 8* | -34.628 | 1.30 | | |
| 9(Stop) | ∞ | 3.93 | | |
| 10 | 411.390 | 1.00 | 2.00069 | 25.46 |
| 11 | 8.896 | 3.76 | 1.49700 | 81.54 |
| 12 | -14.095 | Variable | | |
| 13 | -39.406 | 1.50 | 1.68893 | 31.16 |
| 14 | 44.612 | 3.00 | 1.95906 | 17.47 |
| 15 | -37.129 | 3.76 | | |
| 16* | -11.595 | 1.50 | 1.59282 | 68.63 |
| 17* | -47.504 | Variable | | |
| 18 | ∞ | 2.50 | 1.51633 | 64.14 |
| 19 | ∞ | 0.50 | | |
| Image plane(Image pickup surface) | ∞ | | | |

Aspherical surface data

2nd surface k = 0.000
A4 = -3.52816e-05, A6 = -6.34338e-08, A8 = -2.46277e-09,
A10 = 1.72457e-11, A12 = -1.08367e-13

7th surface k = 0.000
A4 = -5.81010e-05, A6 = 3.19578e-08

8th surface k = 0.225
A4 = 6.40243e-05, A6 = -3.56726e-08

16th surface k = 0.000
A4 = 5.29931e-05, A6 = 6.88364e-07, A8 = -2.67817e-08,
A10 = 3.71008e-10

17th surface k = 0.000
A4 = 4.58918e-06, A6 = -1.11760e-08, A8 = -1.24470e-08,
A10 = 1.24055e-10

Zoom data
Zoom ratio 2.89

| | WE | ST | TE |
|---|---|---|---|
| f | 14.26 | 24.25 | 41.16 |
| Fno. | 3.60 | 4.50 | 5.80 |
| 2ω | 80.55 | 50.12 | 30.26 |
| IH | 11.15 | 11.15 | 11.15 |
| FB(in air) | 3.43 | 13.12 | 28.39 |
| Lens total length(in air) | 60.84 | 60.72 | 69.29 |
| d4 | 7.98 | 6.49 | 5.45 |
| d6 | 10.58 | 4.67 | 1.00 |
| d12 | 5.90 | 3.48 | 1.50 |
| d17 | 1.29 | 10.96 | 26.24 |

Unit focal length

| f1 = -56.47 | f2 = -35.96 | f3 = 15.33 | f4 = -45.58 |
|---|---|---|---|

Example 11

| Unit mm | | | | |
|---|---|---|---|---|
| Surface data | | | | |
| Surface no. | r | d | nd | vd |
| Object plane | ∞ | ∞ | | |
| 1 | −2726.891 | 0.90 | 1.90366 | 31.32 |
| 2 | 15.819 | 2.69 | | |
| 3* | 27.627 | 1.50 | 1.63493 | 23.89 |
| 4* | 22.941 | 0.50 | | |
| 5 | 19.277 | 3.73 | 1.92286 | 18.90 |
| 6 | 87.882 | Variable | | |
| 7* | −19.280 | 0.90 | 1.74320 | 49.34 |
| 8 | −184.609 | Variable | | |
| 9* | 10.299 | 3.44 | 1.55332 | 71.68 |
| 10* | −64.569 | 0.50 | | |
| 11 | 10.263 | 2.87 | 1.49700 | 81.61 |
| 12 | −121.831 | 1.85 | 1.92286 | 20.88 |
| 13 | 27.398 | 2.00 | | |
| 14(Stop) | ∞ | 2.29 | | |
| 15* | 45.390 | 4.17 | 1.68893 | 31.07 |
| 16 | −5.500 | 0.90 | 1.88300 | 40.76 |
| 17 | −34.045 | Variable | | |
| 18 | −8.200 | 0.90 | 1.69350 | 53.21 |
| 19* | −23.053 | Variable | | |
| 20 | ∞ | 2.60 | 1.51633 | 64.14 |
| 21 | ∞ | 1.00 | | |
| Image plane(Image pickup surface) | ∞ | | | |

Aspherical surface data

3rd surface k = 0.000
A4 = −1.23995e−04, A6 = 5.77691e−07, A8 = 1.52530e−09

4th surface k = 0.000
A4 = −1.75020e−04, A6 = 6.47788e−07

7th surface k = 0.000
A4 = −4.21206e−05, A6 = 3.76411e−07

9th surface k = 0.000
A4 = −4.55210e−05, A6 = −2.56087e−07

10th surface k = 0.000
A4 = 7.87123e−05, A6 = 9.15992e−08

15th surface k = 0.000
A4 = −1.75655e−04, A6 = −4.87369e−06, A8 = 9.86936e−08,
A10 = −1.22946e−09

19th surface k = 0.000
A4 = −1.08708e−04, A6 = −5.60085e−07

| Zoom data Zoom ratio 2.86 | | | |
|---|---|---|---|
| | WE | ST | TE |
| f | 14.49 | 23.16 | 41.46 |
| Fno. | 3.63 | 4.60 | 5.78 |
| 2ω | 79.99 | 52.76 | 29.86 |
| IH | 11.00 | 11.00 | 11.00 |
| FB(in air) | 4.71 | 11.86 | 25.32 |
| Lens total length(in air) | 51.70 | 52.56 | 62.60 |
| d6 | 6.67 | 4.55 | 4.59 |
| d8 | 6.97 | 4.28 | 1.50 |

| Unit mm | | | |
|---|---|---|---|
| d17 | 4.21 | 2.74 | 2.05 |
| d19 | 1.93 | 9.09 | 22.62 |
| Unit focal length | | | |
| f1 = −54.40 | f2 = −29.03 | f3 = 11.97 | f4 = −18.82 |

Next, the values of conditional expressions (1) to (12) in each example are shown below.

| Conditional expression | Example1 | Example2 | Example3 | Example4 |
|---|---|---|---|---|
| (1)$|S_t|$ | 5.22 | 5.33 | 4.48 | 2.93 |
| (2)$D_{aiw}/(\tan\omega_t \times f_t)$ | 2.75 | 2.74 | 3.17 | 3.24 |
| (3)$\beta_{Iw}$ | 0.98 | 1.03 | 0.90 | 0.93 |
| (4)$(\beta_{It}/\beta_{Iw})/(f_t/f_w)$ | 0.48 | 0.48 | 0.42 | 0.43 |
| (5)$(\beta_{2t}/\beta_{2w})$ | 1.02 | 1.03 | 1.01 | 1.02 |
| (6)$EXP_w/(\tan\omega_t \times f_t)$ | 1.92 | 1.64 | 1.93 | 1.80 |
| (7)$(r_{ff} + r_{fb})/(r_{ff} − r_{fb})$ | −2.52 | −2.39 | −3.01 | −4.35 |
| (8)$f_2/f_w$ | −2.79 | −2.59 | −2.90 | −4.27 |
| (9)$f_1/f_w$ | 2.46 | −2.67 | −3.03 | −2.64 |
| (10)$(r_{lf} + r_{lb})/(r_{lf} − r_{lb})$ | −0.65 | −1.61 | −1.14 | −1.13 |
| (11)$|r_{lf}|$ | 14.296 | 9.558 | 12.750 | 12.070 |
| (11)$|r_{lb}|$ | 67.009 | 40.884 | 201.535 | 201.535 |
| (12)$D_{1L}/D_{1a}$ | 0.94 | 1.00 | 0.85 | 0.93 |

| Conditional expression | Example5 | Example6 | Example7 | Example8 |
|---|---|---|---|---|
| (1)$|S_t|$ | 5.97 | 4.49 | 4.52 | 4.85 |
| (2)$D_{aiw}/(\tan\omega_t \times f_t)$ | 3.94 | 2.76 | 2.66 | 2.69 |
| (3)$\beta_{Iw}$ | 0.87 | 0.99 | 1.00 | 1.09 |
| (4)$(\beta_{It}/\beta_{Iw})/(f_t/f_w)$ | 0.41 | 0.43 | 0.41 | 0.54 |
| (5)$(\beta_{2t}/\beta_{2w})$ | 1.01 | 1.01 | 1.01 | 1.03 |
| (6)$EXP_w/(\tan\omega_t \times f_t)$ | 2.23 | 1.94 | 2.00 | 1.67 |
| (7)$(r_{ff} + r_{fb})/(r_{ff} − r_{fb})$ | −2.15 | −3.28 | −3.31 | −2.81 |
| (8)$f_2/f_w$ | −2.33 | −2.89 | −2.88 | −2.58 |
| (9)$f_1/f_w$ | −3.76 | −3.36 | −3.39 | −3.08 |
| (10)$(r_{lf} + r_{lb})/(r_{lf} − r_{lb})$ | −1.01 | −2.02 | −2.04 | −1.14 |
| (11)$|r_{lf}|$ | 13.750 | 8.537 | 7.811 | 11.793 |
| (11)$|r_{lb}|$ | 2327.054 | 25.340 | 22.765 | 184.374 |
| (12)$D_{1L}/D_{1a}$ | 0.94 | 0.70 | 0.70 | 1.05 |

| Conditional expression | Example9 | Example10 | Example11 |
|---|---|---|---|
| (1)$|S_t|$ | 4.96 | 4.39 | 6.34 |
| (2)$D_{aiw}/(\tan\omega_t \times f_t)$ | 2.74 | 2.57 | 1.63 |
| (3)$\beta_{Iw}$ | 1.00 | 1.08 | 1.30 |
| (4)$(\beta_{It}/\beta_{Iw})/(f_t/f_w)$ | 0.47 | 0.52 | 0.65 |
| (5)$(\beta_{2t}/\beta_{2w})$ | 1.02 | 1.02 | 1.02 |
| (6)$EXP_w/(\tan\omega_t \times f_t)$ | 1.79 | 1.73 | 1.05 |
| (7)$(r_{ff} + r_{fb})/(r_{ff} − r_{fb})$ | −2.47 | −2.59 | −1.23 |
| (8)$f_2/f_w$ | −2.74 | −2.52 | −2.00 |
| (9)$f_1/f_w$ | −2.73 | −3.96 | −3.75 |
| (10)$(r_{lf} + r_{lb})/(r_{lf} − r_{lb})$ | −1.70 | −1.65 | −2.10 |
| (11)$|r_{lf}|$ | 16.557 | 11.595 | 8.200 |
| (11)$|r_{lb}|$ | 63.534 | 47.504 | 23.053 |
| (12)$D_{1L}/D_{1a}$ | 0.89 | 1.00 | 1.92 |

Figure 45:
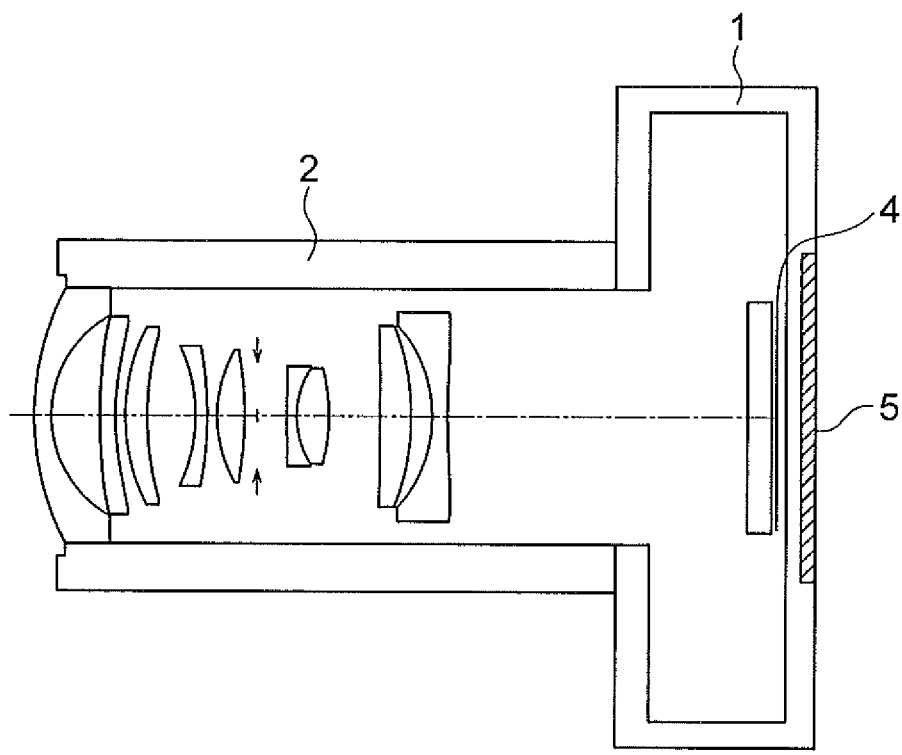
FIG. 45 is a cross-sectional view of a compact camera in which, the zoom lens according to the present examples has been used.

FIG. 45 is a cross-sectional view of a compact camera as an electronic image pickup apparatus. In FIG. 45, a photographic optical system 2 is disposed inside a lens barrel of a compact camera 1. Moreover, an image pickup element surface 4 and a back monitor 5 are disposed in a body. As an image pickup element, an element such as a small-size CCD (charge coupled device) or a CMOS (complementary metal-oxide semiconductor) is to be used.

Here, it is possible to let the photographic optical system 2 to be detachable from a single-lens mirrorless camera by providing a mounting portion to the lens barrel. As the mounting portion, for example, a screw type mount or bayonet type mount could be used.

Moreover, as the photographic optical system 2 of the compact camera 1, the zoom lens described in any one of the examples from the first example to the eleventh example is to be used for instance.

Figure 46:
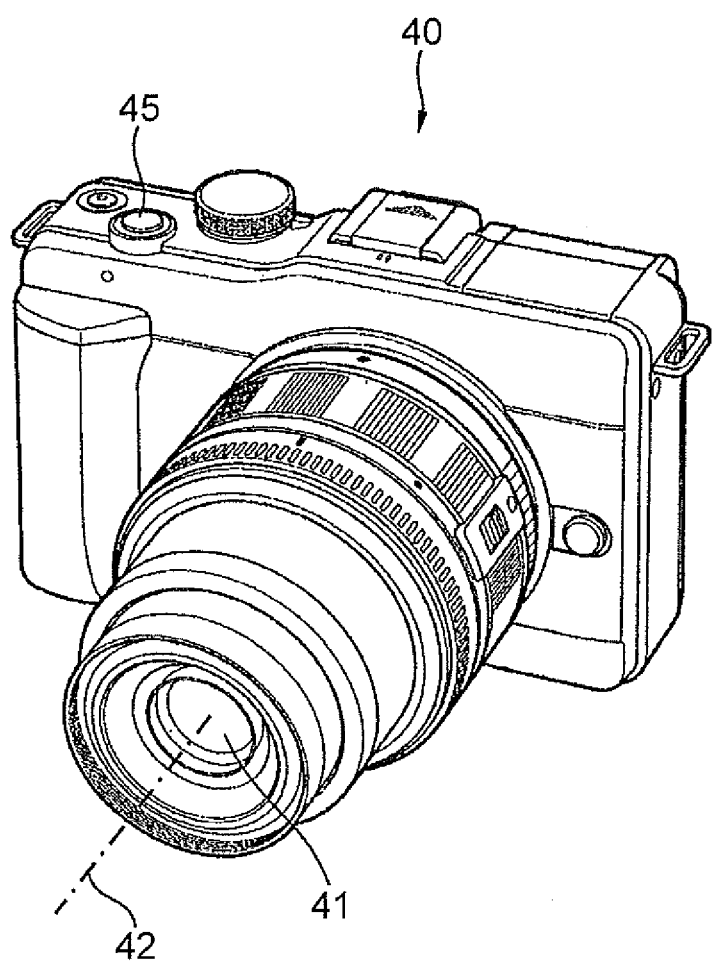
FIG. 46 is a front perspective view showing an appearance of a digital camera according to the present examples.
Figure 47:
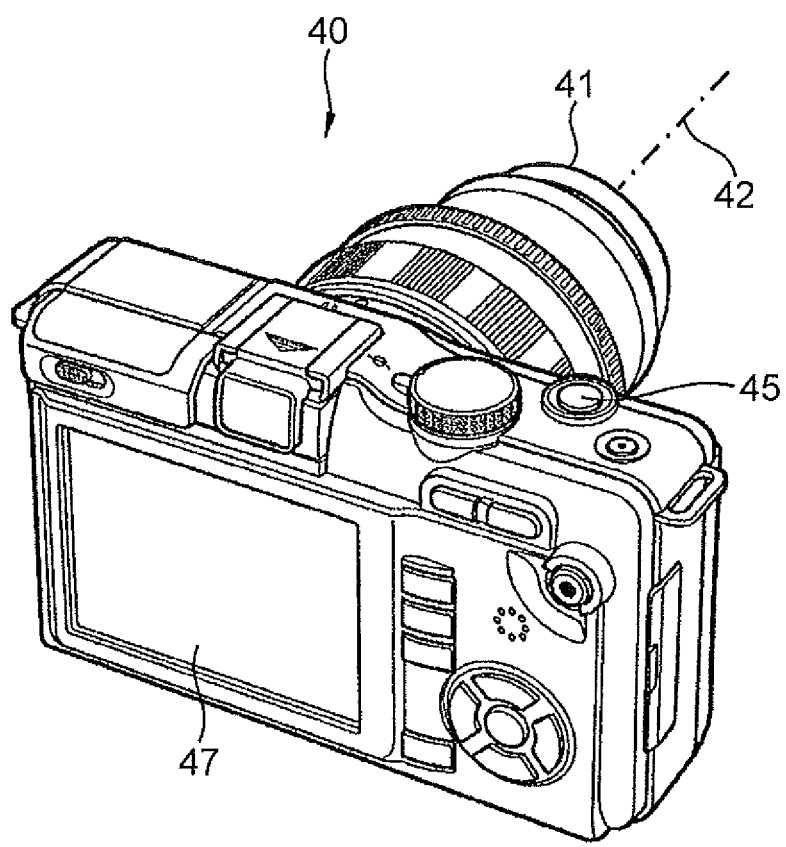
FIG. 47 is a rear perspective view of the digital camera in FIG. 46.

FIG. 46 and FIG. 47 are conceptual diagrams of an arrangement of the image pickup apparatus according to the present invention. FIG. 46 is a front perspective view showing an appearance of a digital camera 40 as the image pickup apparatus, and FIG. 47 is a rear perspective view of the digital camera 40. The zoom lens according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example, for instance. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 48 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section 19 for example.

As shown in FIG. 48, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the zoom lens according to the present invention as the photographic optical system 41, it is possible to let the digital camera 40 configured to be an image pickup apparatus in which various aberrations are corrected favorably and the overall length of the optical system is short, even in a case in which an image pickup element of a large size is used.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit. In each of the examples described above, it is possible to make an arrangement such that the zoom lens includes four lens units practically.

According to the present invention, it is possible to provide a zoom lens in which various aberrations are corrected favorably and the overall length of the optical system is short, even in a case in which an image pickup element of a large size is used, and an image pickup apparatus using such zoom lens.

The present invention is suitable for a zoom lens in which various aberrations are corrected favorably and the overall length of the optical system is short, even in a case in which, an image pickup element of a large size is used, and is suitable for an image pickup element using such zoom lens.

What is claimed is:

1. A zoom lens comprising in order from an object side:
a first lens unit having a negative refractive power;
a second lens unit having a negative refractive power;

a lens unit having a positive refractive power; and
a rearmost lens unit having a negative refractive power, wherein
the total number of lens units in the zoom lens is four, and
at the time of zooming, distances between the lens units change, and
at the time of focusing from an infinite object point to an object point at a short distance, only the second lens unit moves, and
the second lens unit comprises one negative lens, and
the total number of lenses in the second lens unit is one, and
the negative lens is a meniscus lens having a convex surface directed toward an image side, and
at the time of focusing from the infinite object point to an object point at a short distance, the negative lens moves toward the object side, and
the following conditional expressions are satisfied:

$$2.00<|S_f|<8.00$$

$$-6.00<(r_{ff}+r_{fb})/(r_{ff}-r_{fb})<-1.00$$

where, $$S_f=(1-\beta_{2t}\times\beta_{2t})\times\beta_{ct}\times\beta_{ct},$$

$\beta_{2t}$ denotes a lateral magnification of the second lens unit,
$\beta_{ct}$ denotes a combined lateral magnification of all the lens units positioned on the image side of the second lens unit,
both $\beta_{2t}$ and $\beta_{ct}$ are a lateral magnification at the time of focusing on the infinite object point at a telephoto end,
$r_{ff}$ denotes a radius of curvature of an object-side lens surface of the negative lens, and
$r_{fb}$ denotes a radius of curvature of an image-side lens surface of the negative lens.

2. A zoom lens comprising in order from an object side:
a first lens unit having a negative refractive power;
a second lens unit having a negative refractive power;
a lens unit having a positive refractive power; and
a rearmost lens unit having a negative refractive power, wherein
the total number of lens units in the zoom lens is four, and
at the time of zooming, distances between the lens units change, and
at the time of focusing from an infinite object point to an object point at a short distance, only the second lens unit moves, and
the following conditional expressions are satisfied:

$$2.00<|S_f|<8.00$$

$$0.30<D_{1L}/D_{1a}<4.00$$

where, $$S_f=(1-\beta_{2t}\times\beta_{2t})\times\beta_{ct}\times\beta_{ct},$$

$\beta_{2t}$ denotes a lateral magnification of the second lens unit,
$\beta_{ct}$ denotes a combined lateral magnification of all the lens units positioned on the image side of the second lens unit,
both $\beta_{2t}$ and $\beta_{ct}$ are a lateral magnification at the time of infinite object point focusing at a telephoto end,
$D_{1L}$ denotes a sum total of a lens thickness on an optical axis of the first lens unit, and
$D_{1a}$ denotes a sum total of an air space on the optical axis in the first lens unit.

3. The zoom lens according to claim 1, comprising:
an aperture stop, wherein
the aperture stop is disposed between two lenses, and
one of the two lenses is positioned nearest to an image in the second lens unit, and the remaining of the two lenses is positioned nearest to an object in the rearmost lens unit, and
at the time of zooming from a wide angle end to a telephoto end, the aperture stop moves toward the object side.

4. The zoom lens according to claim 3, wherein the following conditional expression is satisfied:

$$1.00<D_{aiw}/(\tan\omega_t\times f_t)<5.00$$

where,
$D_{aiw}$ denotes a distance between the aperture stop and an image plane at the wide angle end,
$\omega_t$ denotes a half angle of view at the telephoto end, and
$f_t$ denotes a focal length of the overall zoom lens system at the telephoto end.

5. The zoom lens according to claim 1, wherein the following conditional expression is satisfied:

$$0.70<\beta_{1w}<2.00$$

where,
$\beta_{1w}$ denotes a lateral magnification of the rearmost lens unit at the time of infinite object point focusing at the wide angle end.

6. The zoom lens according to claim 1, wherein the following conditional expression is satisfied:

$$0.20<(\beta_{1t}/\beta_{1w})/(f_t/f_w)<0.90$$

where,
$\beta_{1t}$ denotes a lateral magnification of the rearmost lens unit at the telephoto end,
$\beta_{1w}$ denotes a lateral magnification of the rearmost lens unit at the wide angle end, and both $\beta_{1t}$ and $\beta_{1w}$ are lateral magnification at the time of infinite object point focusing,
$f_t$ denotes a focal length of the overall zoom lens system at the telephoto end, and
$f_w$ denotes a focal length of the overall zoom lens system at the wide angle end.

7. The zoom lens according to claim 1, wherein the following conditional expression is satisfied:

$$0.94<(\beta_{2t}/\beta_{2w})<1.09$$

where,
$\beta_{2t}$ denotes the lateral magnification of the second lens unit at the telephoto end, and
$\beta_{2w}$ denotes a lateral magnification of the second lens unit at the wide angle end, and both $\beta_{2t}$ and $\beta_{2w}$ are lateral magnification at the time of infinite object point focusing.

8. The zoom lens according to claim 1, wherein the following conditional expression is satisfied:

$$0.80<EXP_w/(\tan\omega_t\times f_t)<3.00$$

where,
$EXP_w$ denotes a distance between the image plane and an exit pupil at the wide angle end,
$\omega_t$ denotes a half angle of view at the telephoto end, and
$f_t$ denotes a focal length of the overall zoom lens system at the telephoto end.

9. The zoom lens according to claim 2, wherein
the second lens unit includes one negative lens, and
the total number of lenses in the second lens unit is one.

10. The zoom lens according to claim 9, wherein
the negative lens is a meniscus lens having a convex surface directed toward an image side, and
at the time of focusing from the infinite object point to the object point at the short distance, the negative lens moves toward the object side, and
the following conditional expression is satisfied:

$-6.00 < (r_{ff} + r_{fb})/(r_{ff} - r_{fb}) < -1.00$ where,
$r_{ff}$ denotes a radius of curvature of the object-side lens surface of the negative lens, and
$r_{fb}$ denotes a radius of curvature of the image-side lens surface of the negative lens.

11. A zoom lens comprising in order from an object side:
a first lens unit having a negative refractive power;
a second lens unit having a negative refractive power;
a lens unit having a positive refractive power; and
a rearmost lens unit having a negative refractive power, wherein
the total number of lens units in the zoom lens is four, and
at the time of zooming, distances between lens units change, and
the following conditional expressions are satisfied:

$-5.50 < f_2/f_w < -1.00$ $0.30 < D_{1L}/D_{1a} < 4.00$ where,
$f_2$ denotes a focal length of the second lens unit,
$f_w$ denotes a focal length of the overall zoom lens system at a wide angle end,
$D_{1L}$ denotes a sum total of a lens thickness on an optical axis of the first lens unit, and
$D_{1a}$ denotes a sum total of an air space on the optical axis in the first lens unit.

12. The zoom lens according to claim 1, wherein the following conditional expression is satisfied:

$-6.00 < f_1/f_w < -1.00$ where,
$f_1$ denotes a focal length of the first lens unit, and
$f_w$ denotes a focal length of the overall zoom lens system at the wide angle end.

13. A zoom lens comprising in order from an object side:
a first lens unit having a negative refractive power;
a second lens unit having a negative refractive power;
a lens unit having a positive refractive power; and
a rearmost lens unit having a negative refractive power, wherein
the total number of lens units in the zoom lens is four, and
at the time of zooming, distances between the lens units change, and
a lens nearest to an image in the rearmost lens unit, and the first lens unit, satisfy the following conditional expressions:

$-3.00 < (r_{1f} + r_{1b})/(r_{1f} - r_{1b}) < -0.30$ $|r_{1f}| < |r_{1b}|$ $0.30 < D_{1L}/D_{1a} < 4.00$ where,
$r_{1f}$ denotes a radius of curvature of an object-side lens surface of a lens positioned nearest to the image in the rearmost lens unit,
$r_{1b}$ denotes a radius of curvature of an image-side lens surface of a lens positioned nearest to the image in the rearmost lens unit,
$D_{1L}$ denotes a sum total of a lens thickness on an optical axis of the first lens unit, and
$D_{1a}$ denotes a sum total of an air space on the optical axis in the first lens unit.

14. The zoom lens according to claim 1, wherein at the time of zooming from a wide angle end to a telephoto end, the rearmost lens unit moves toward the object side.

15. The zoom lens according to claim 1, wherein the following conditional expression is satisfied:

$0.30 < D_{1L}/D_{1a} < 4.00$ where,
$D_{1L}$ denotes a sum total of a lens thickness on an optical axis of the first lens unit, and
$D_{1a}$ denotes a sum total of an air space on the optical axis in the first lens unit.

16. The zoom lens according to claim 1, wherein
the first lens unit comprises at least one negative lens and one positive lens, and
the total number of positive lenses in the first lens unit is one.

17. A zoom lens comprising in order from an object side:
a first lens unit having a negative refractive power;
a second lens unit having a negative refractive power;
a lens unit having a positive refractive power; and
a rearmost lens unit having a negative refractive power, wherein
the zoom lens further includes an aperture stop, and
the total number of lens units in the zoom lens is four, and
the lens unit having a positive refractive power is a third lens unit, and
spaces between lenses in the third lens unit are kept unchanged during zooming, and
the rearmost lens unit is a fourth lens unit, and
the aperture stop is disposed in the third lens unit, and
the zoom lens includes at least one aspheric lens, and
at the time of zooming, distances between the lens units change, and
the following conditional expression is satisfied:

$0.30 < D_{1L}/D_{1a} < 4.00$ where,
$D_{1L}$ denotes a sum total of a lens thickness on an optical axis of the first lens unit, and
$D_{1a}$ denotes a sum total of an air space on the optical axis in the first lens unit.

18. An image pickup apparatus comprising:
a zoom lens according to claim 1; and
an image pickup element having an image pickup surface.

* * * * *